Figure 26:
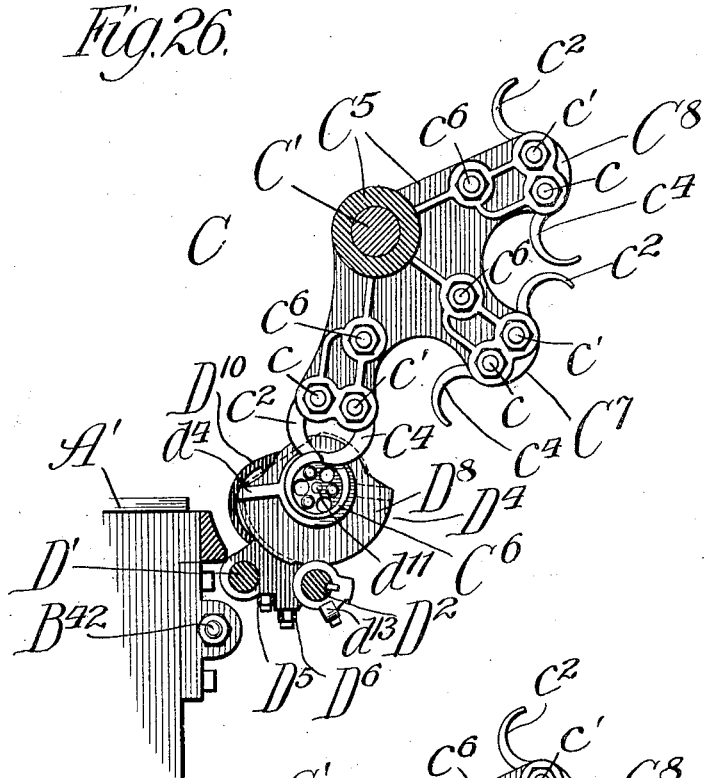

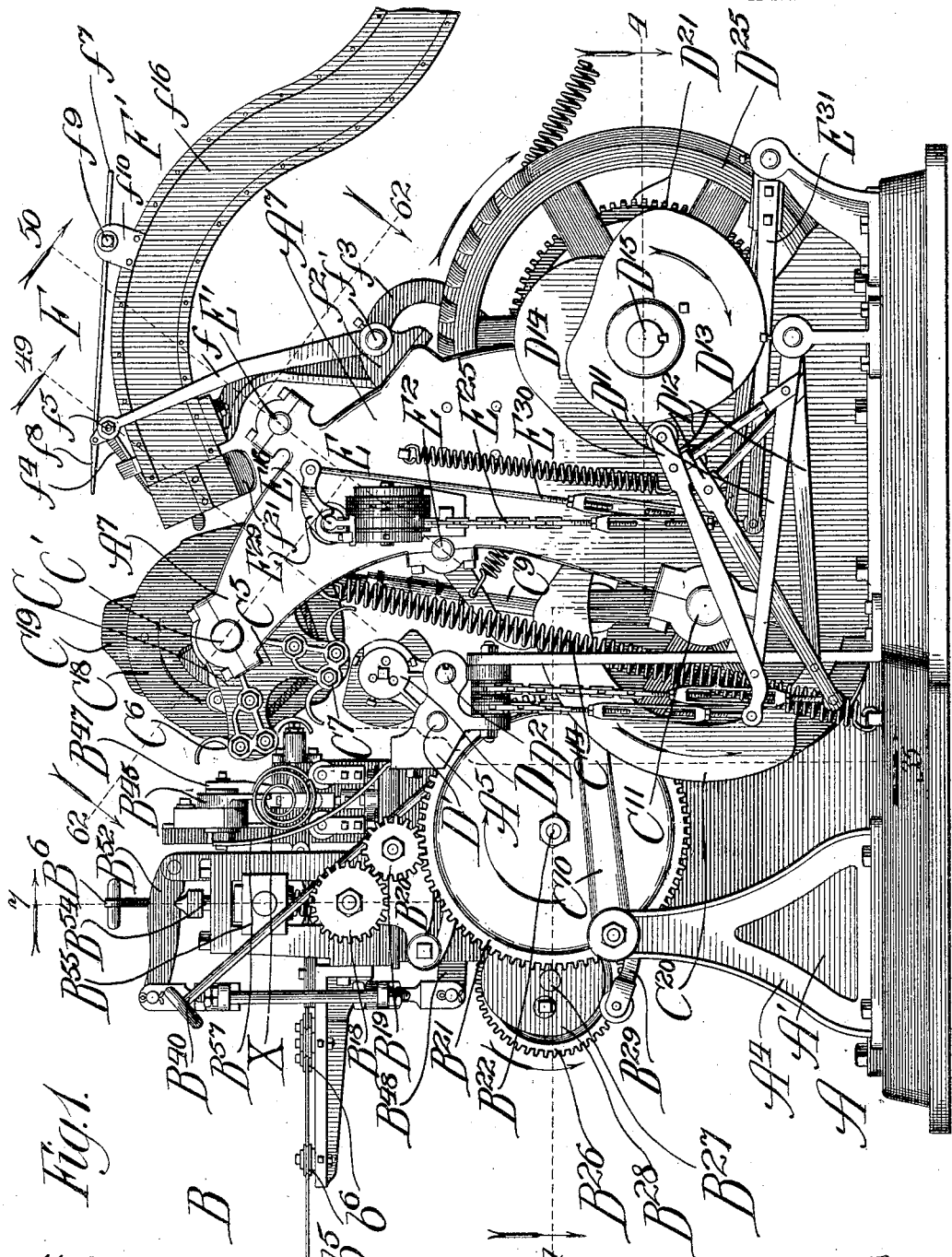

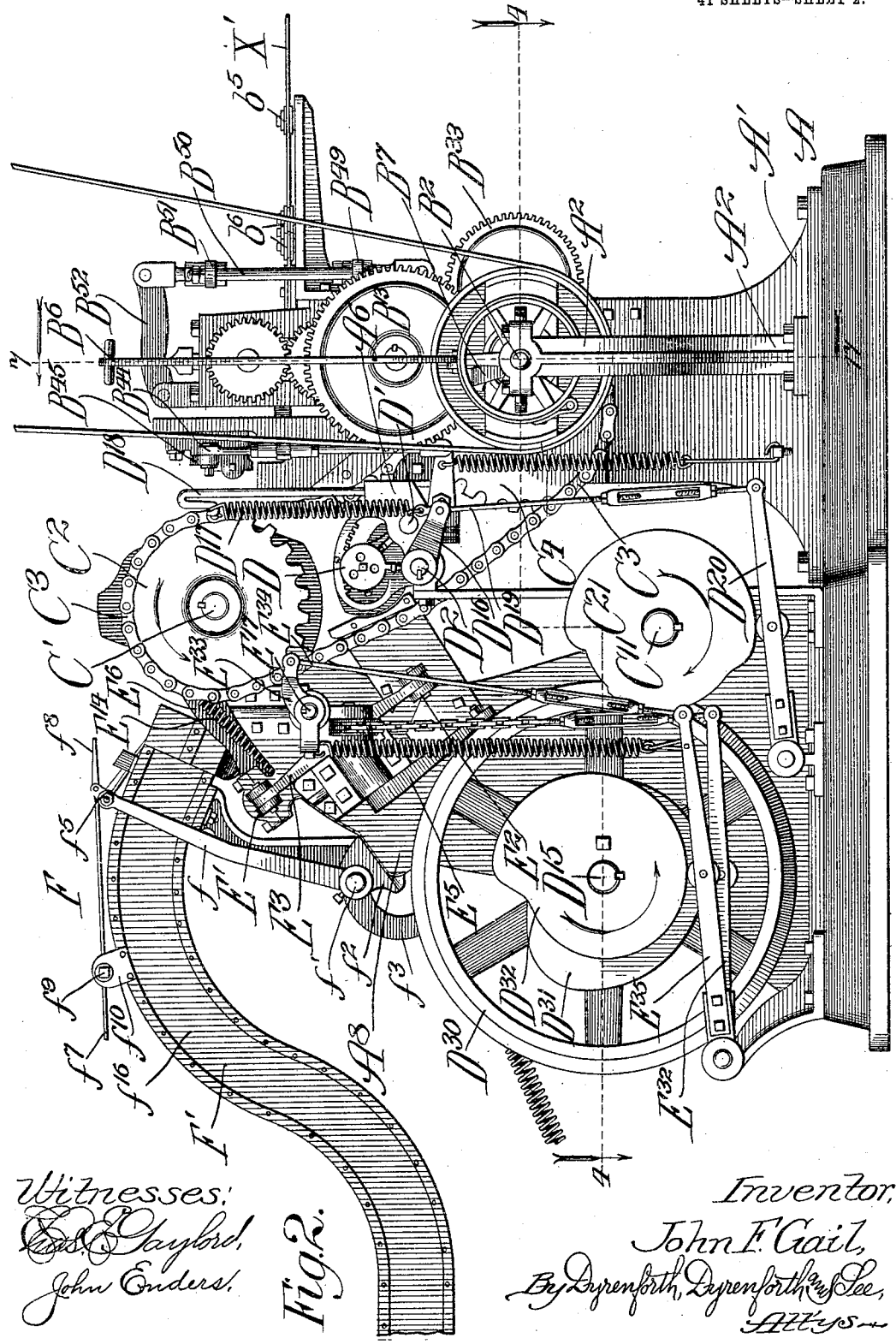

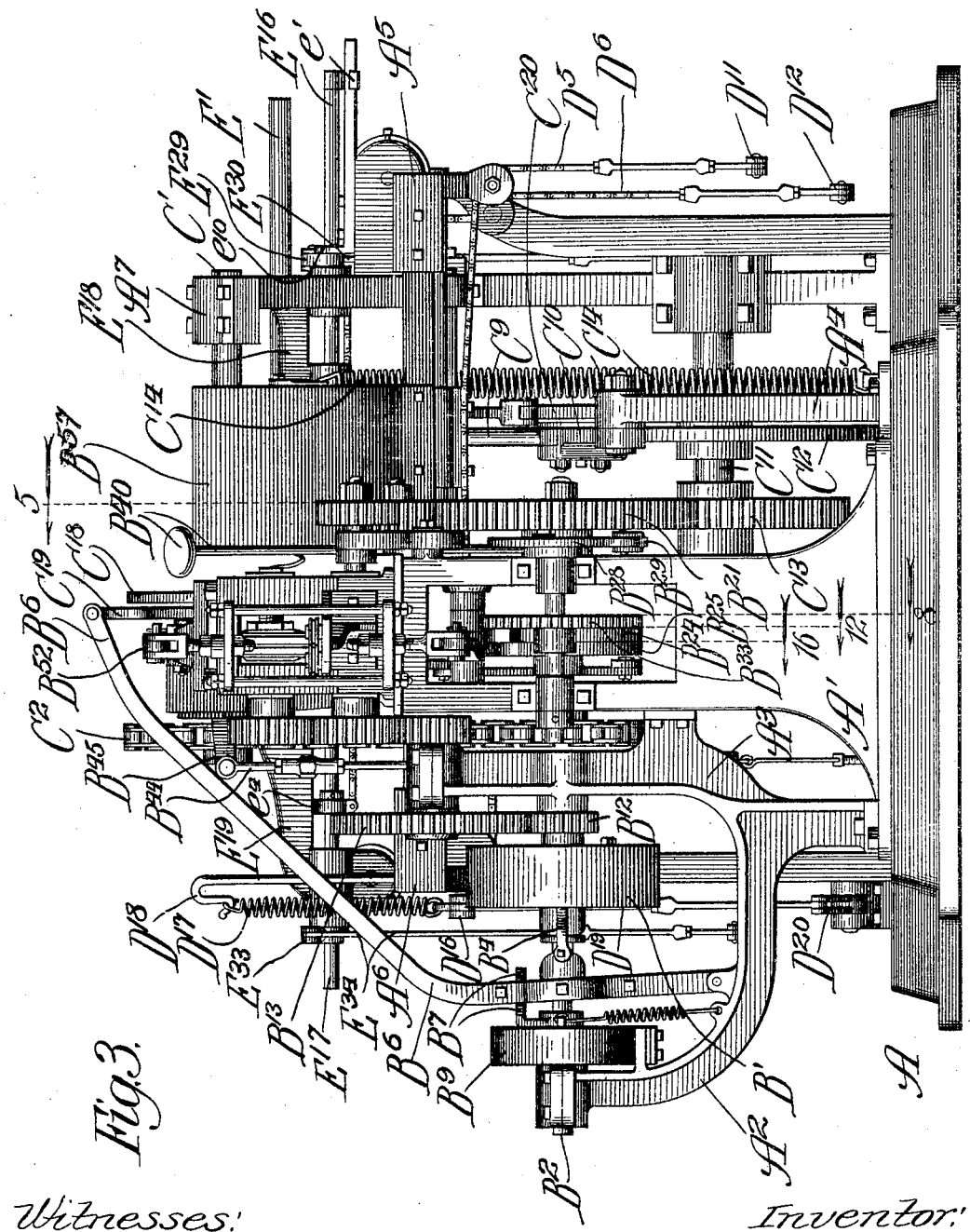

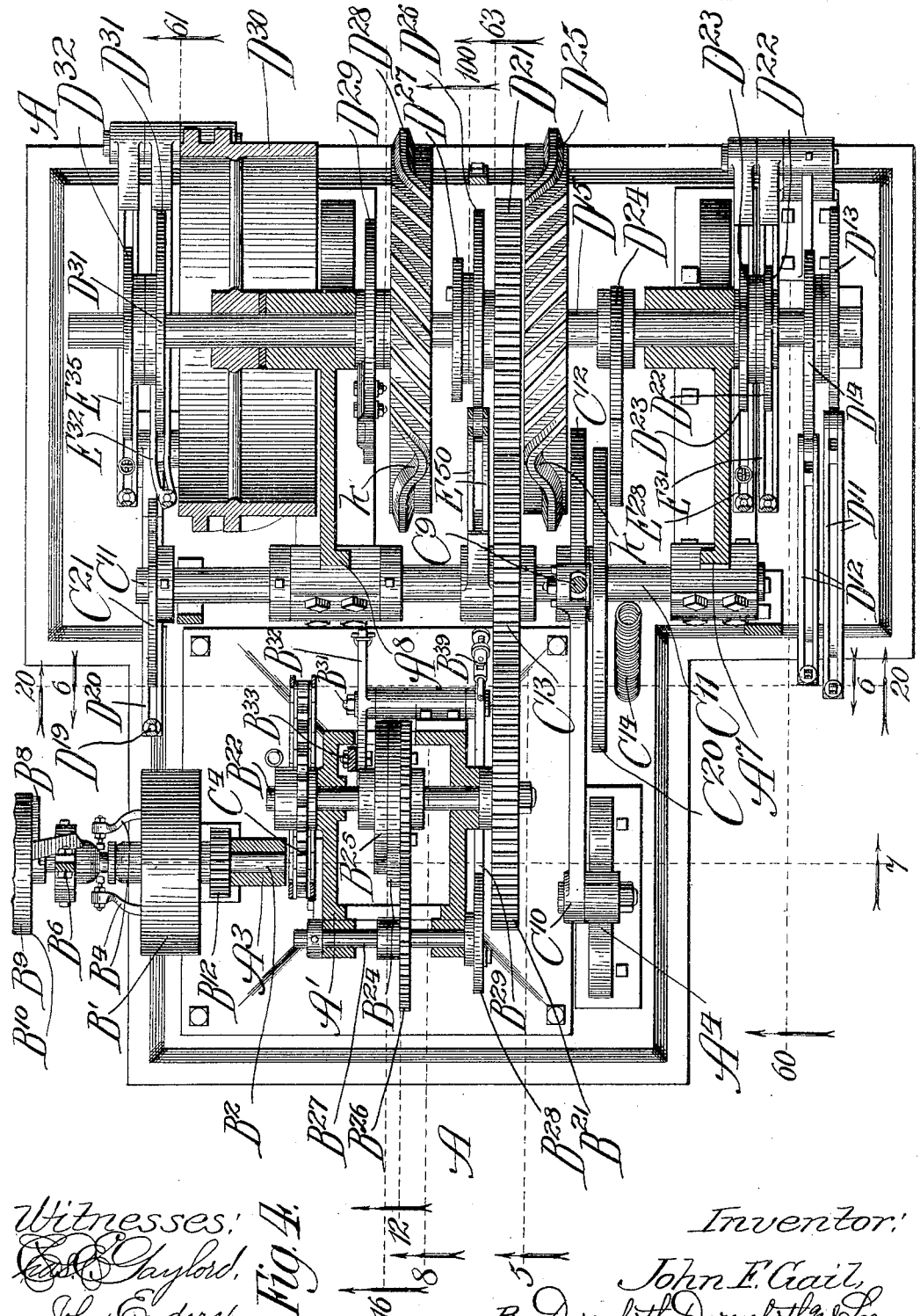

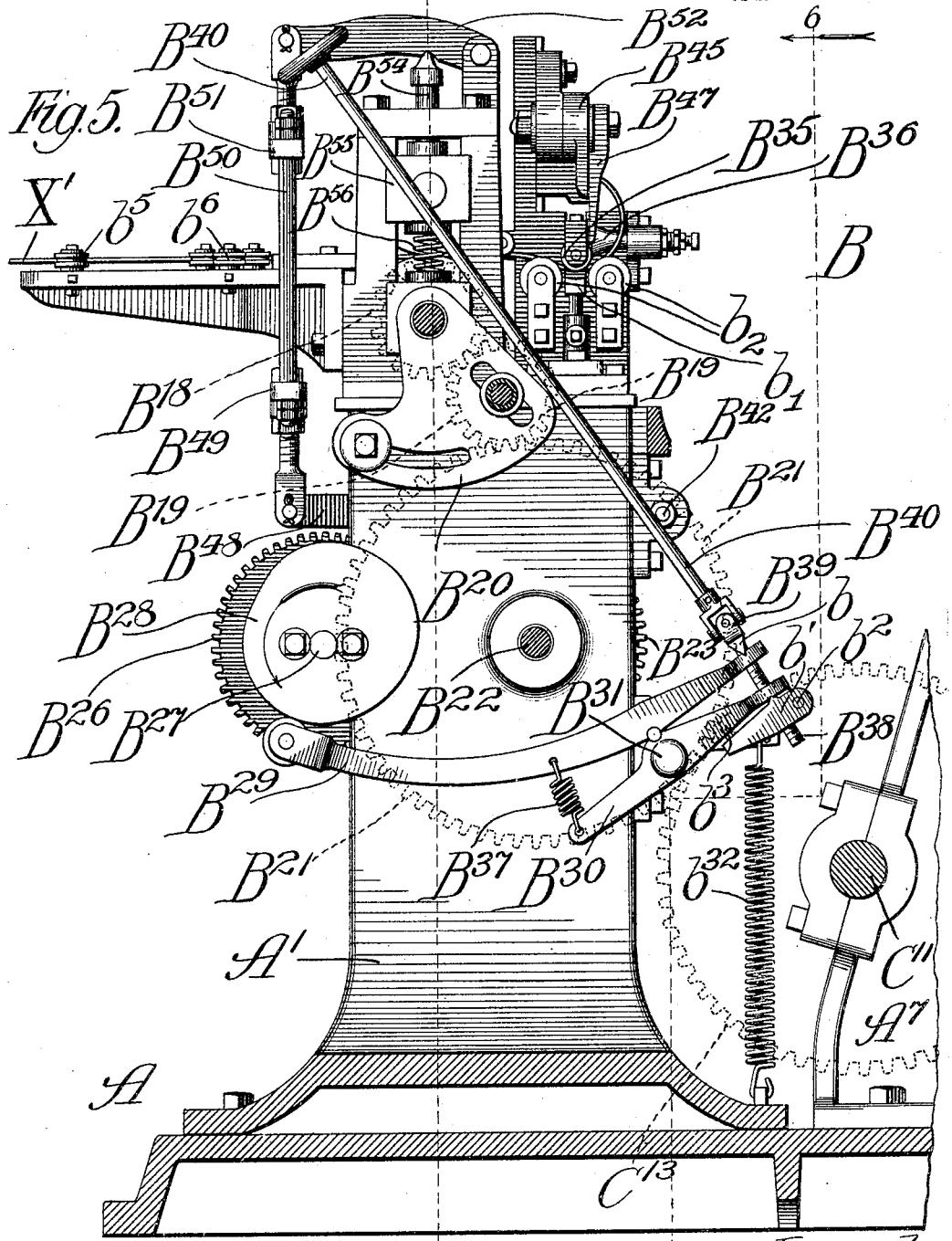

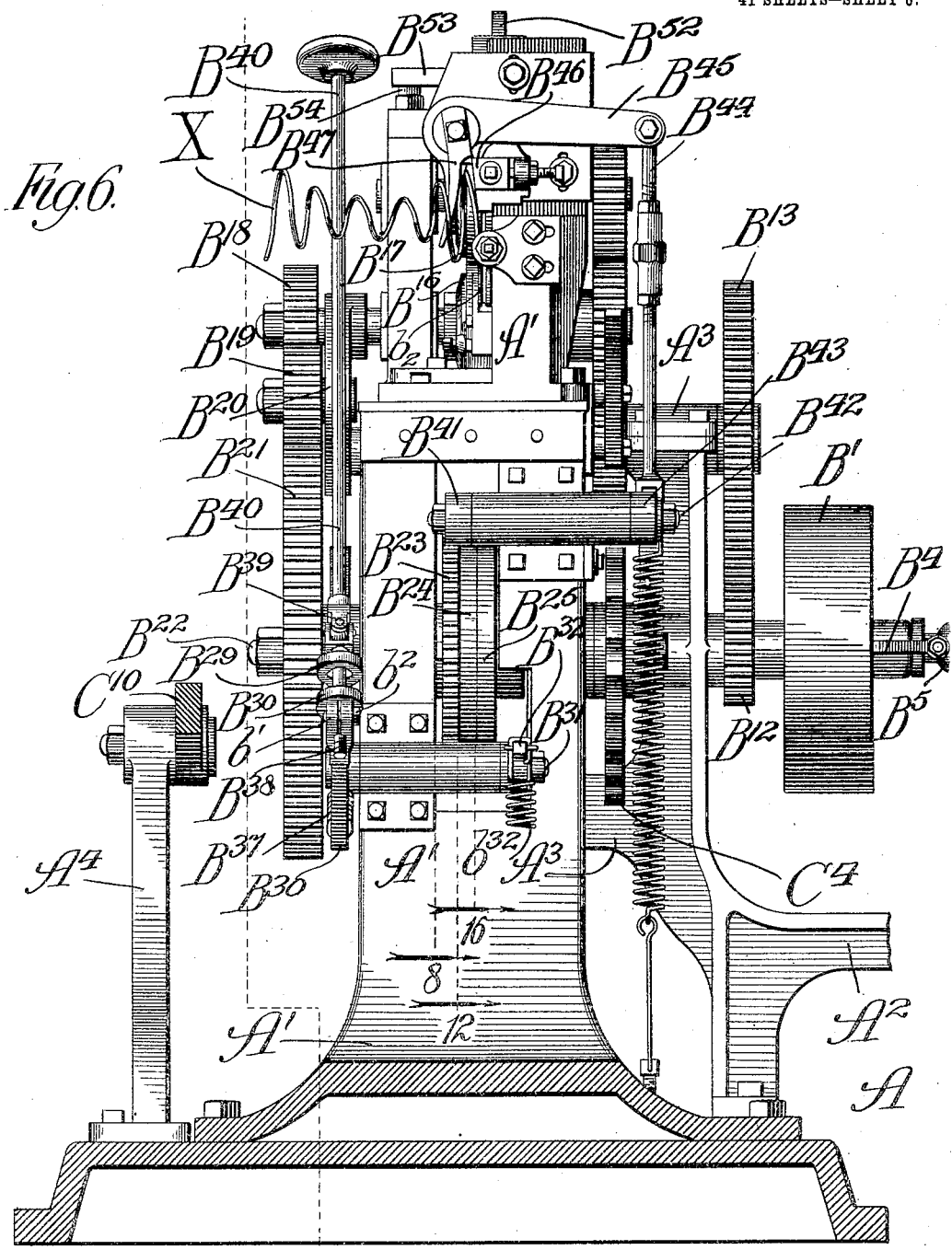

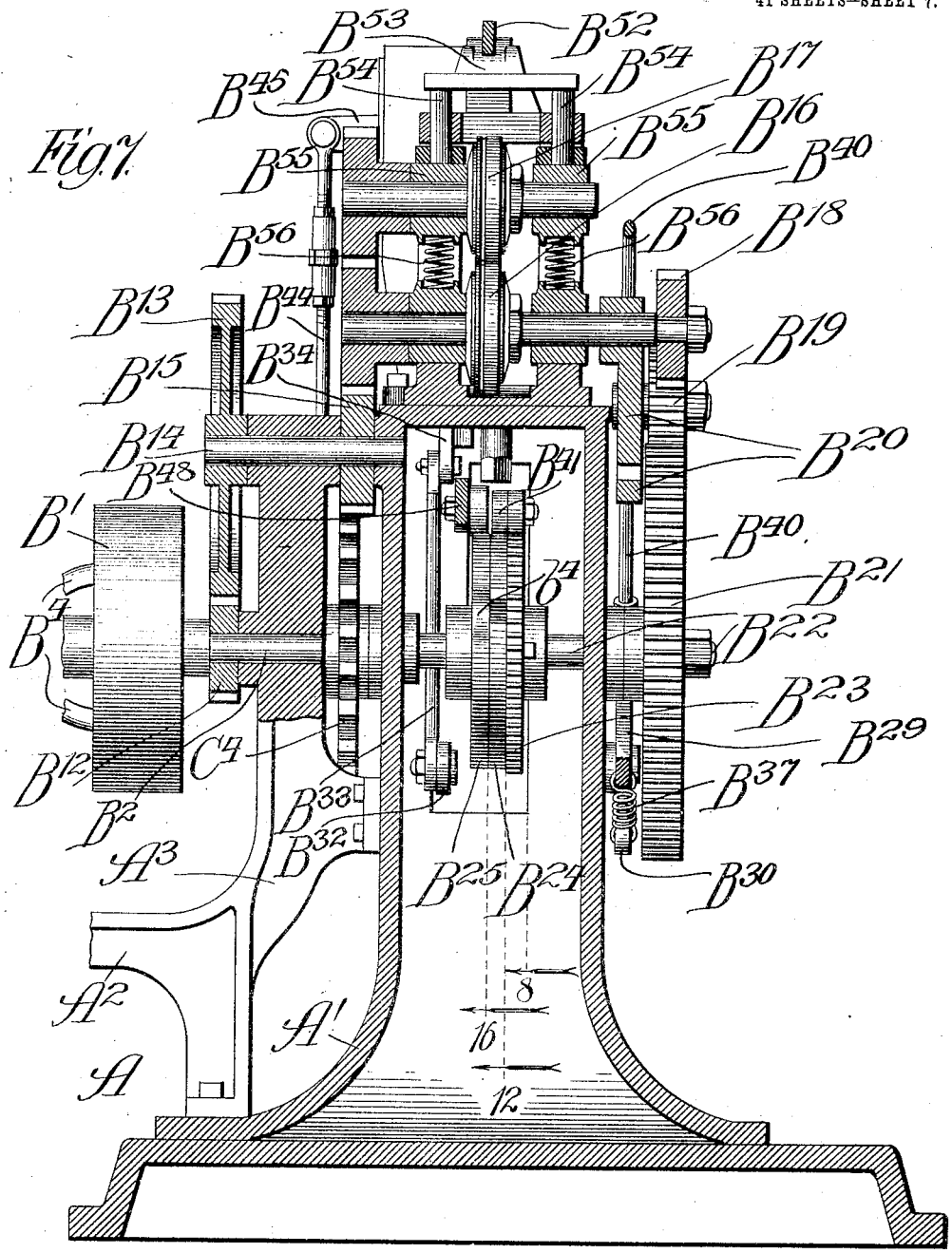

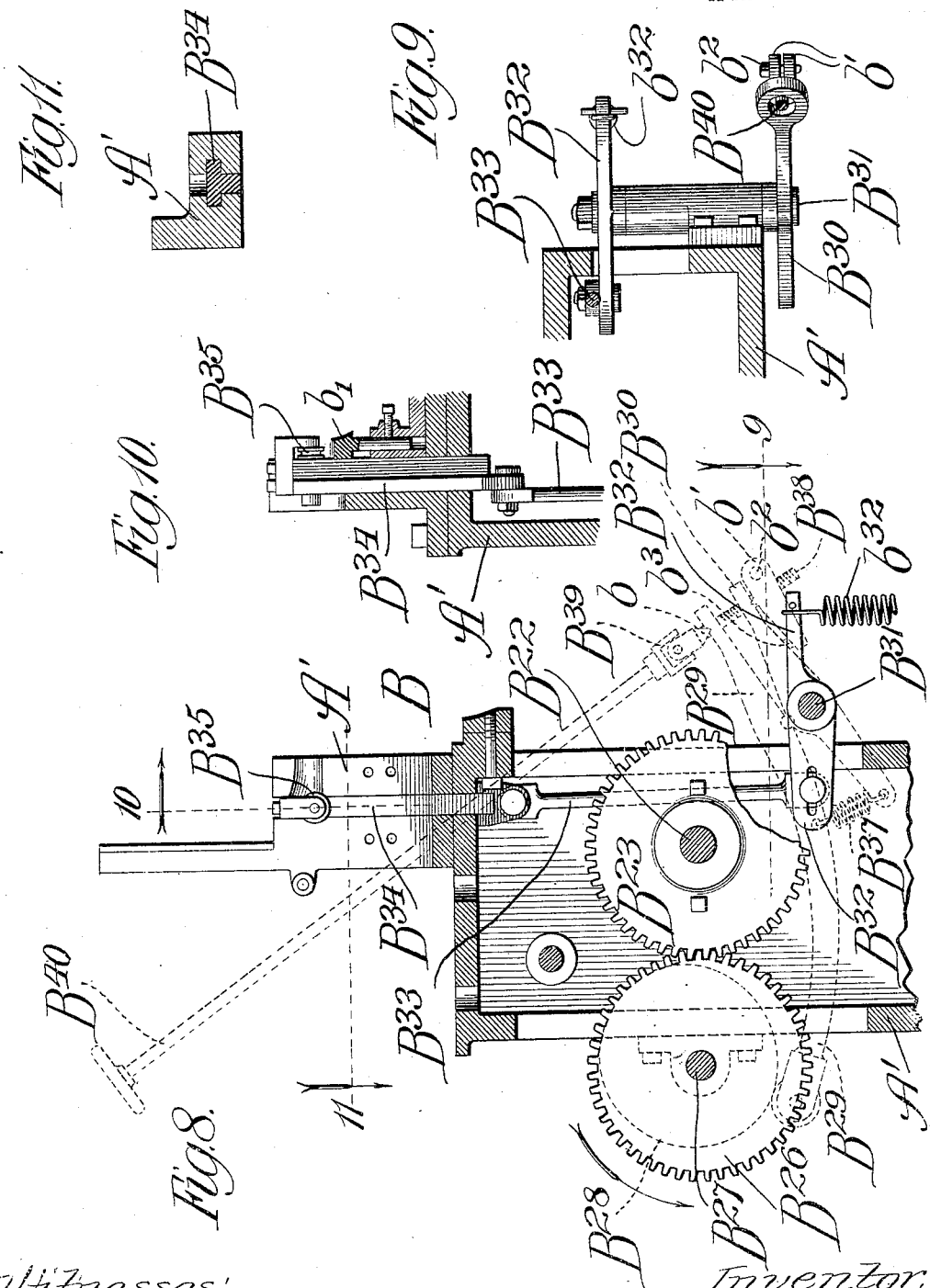

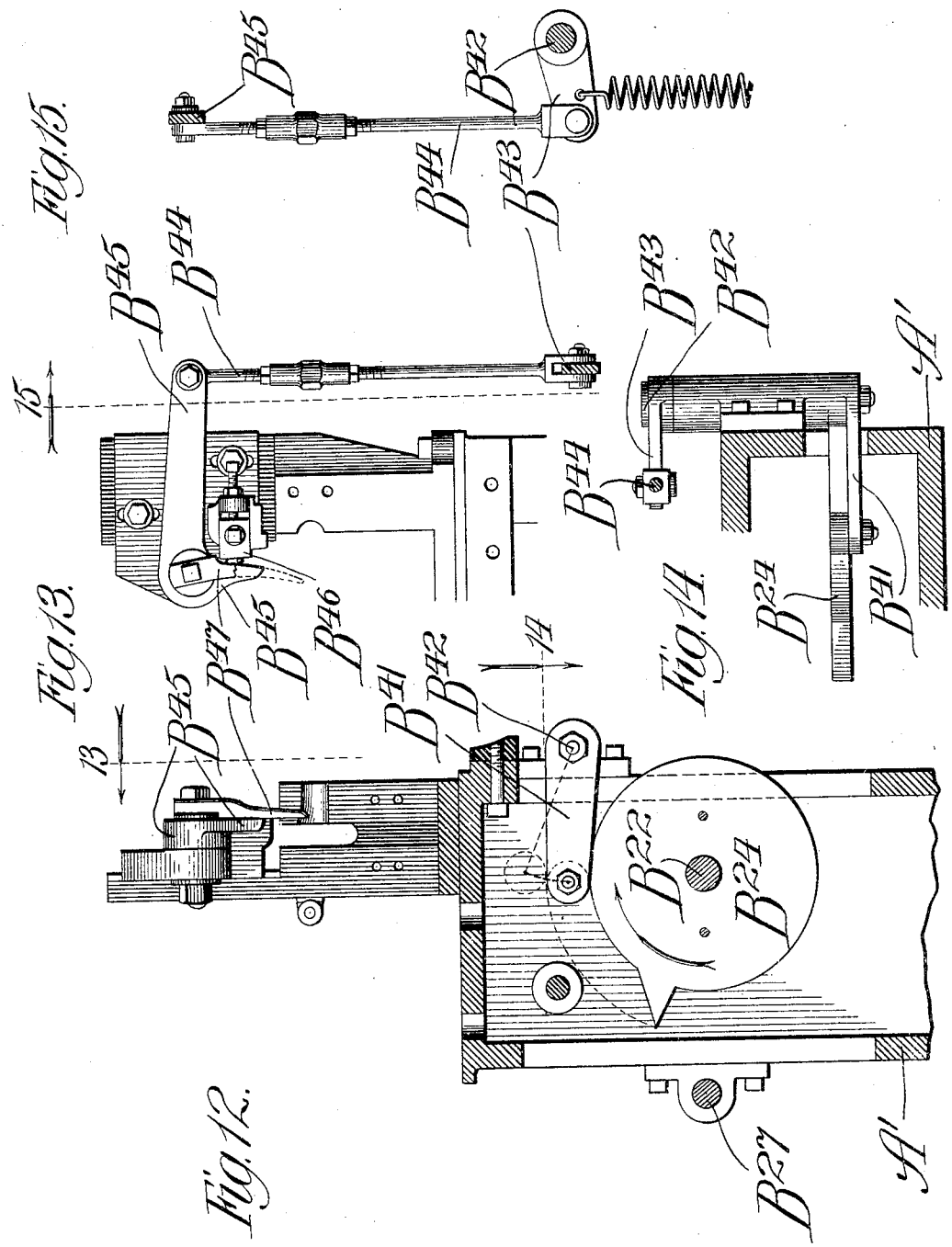

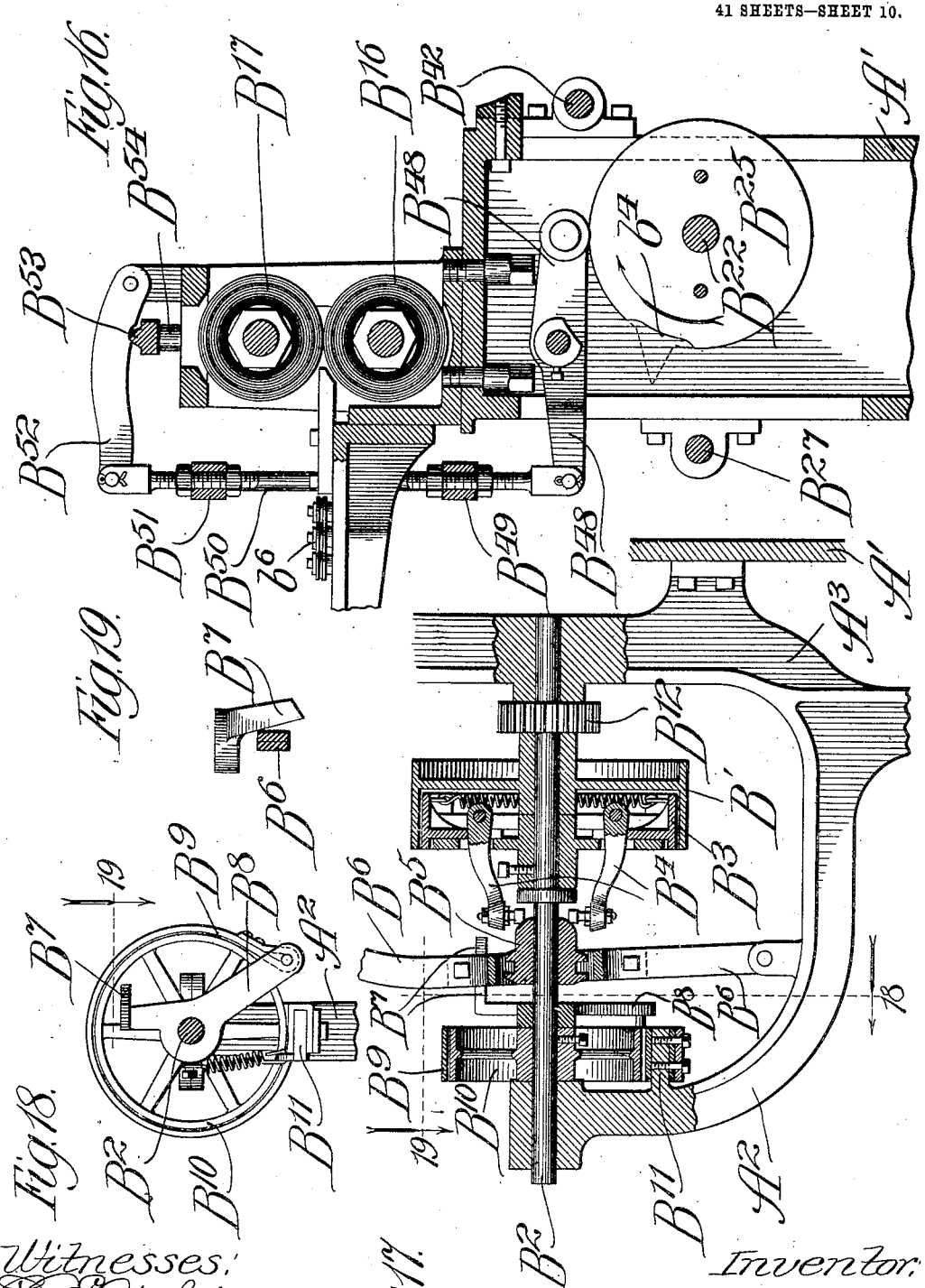

No. 810,048. PATENTED JAN. 16, 1906.
J. F. GAIL.
MACHINE FOR MAKING COIL SPRINGS.
APPLICATION FILED MAR. 3, 1904.
41 SHEETS—SHEET 11.
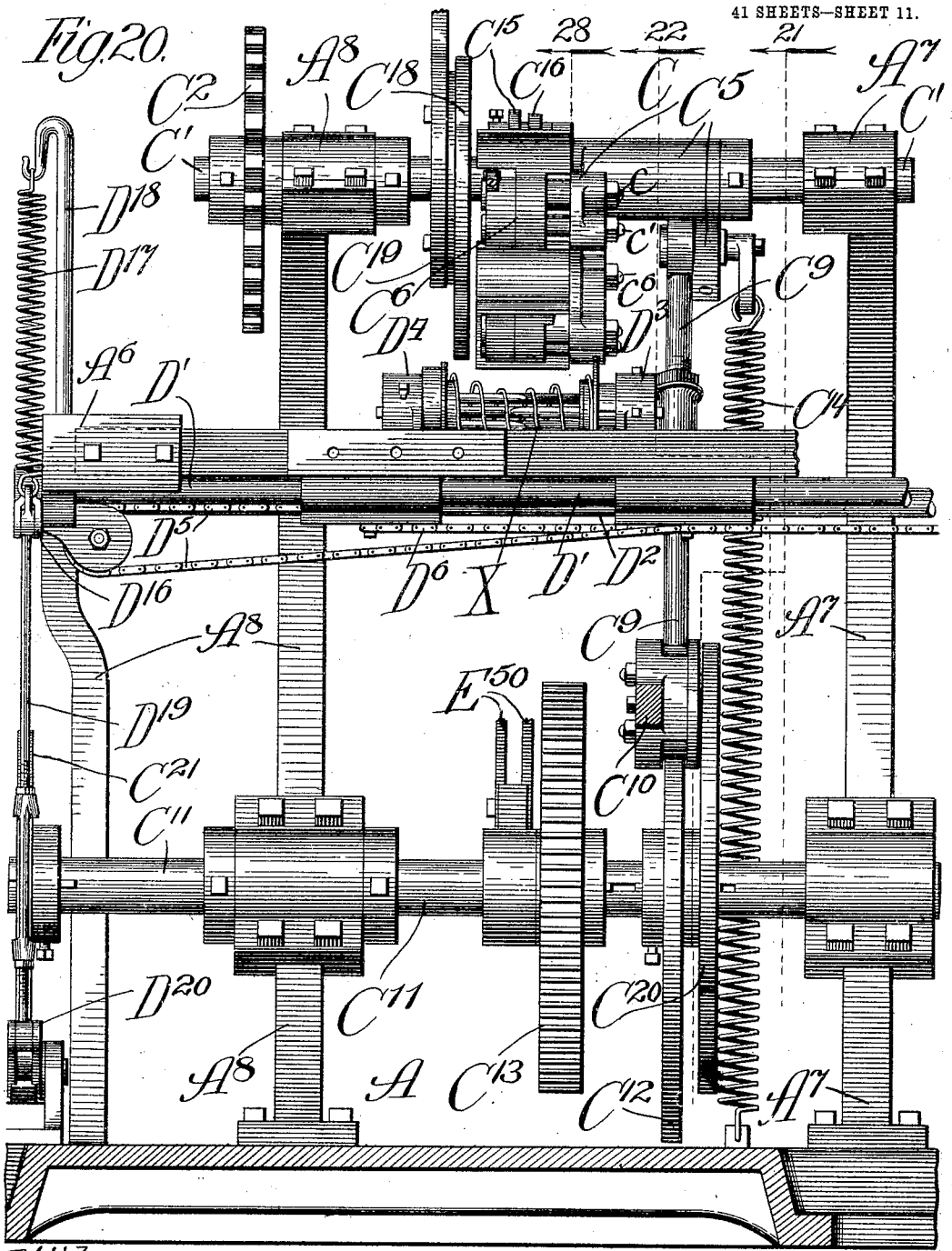

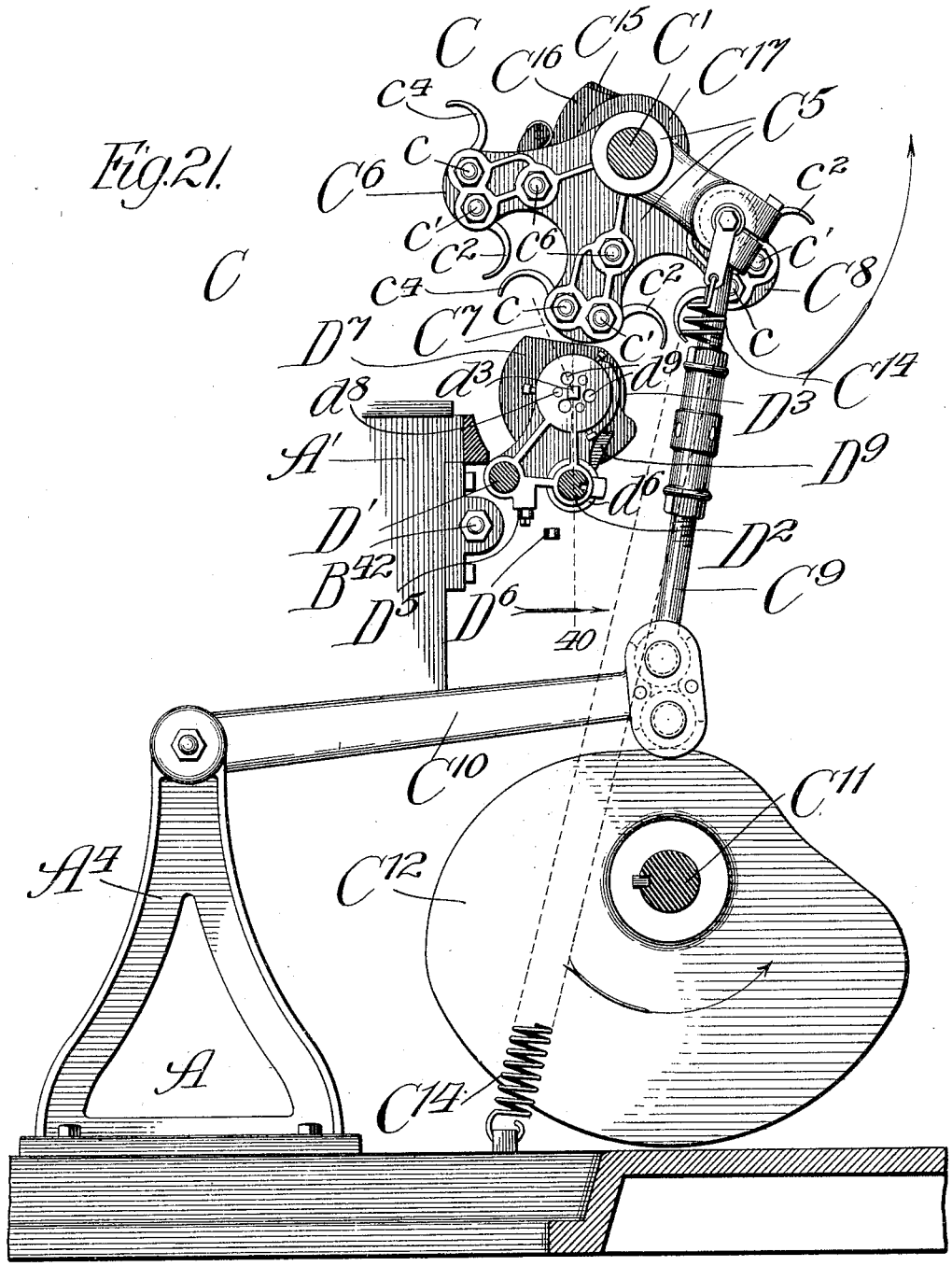

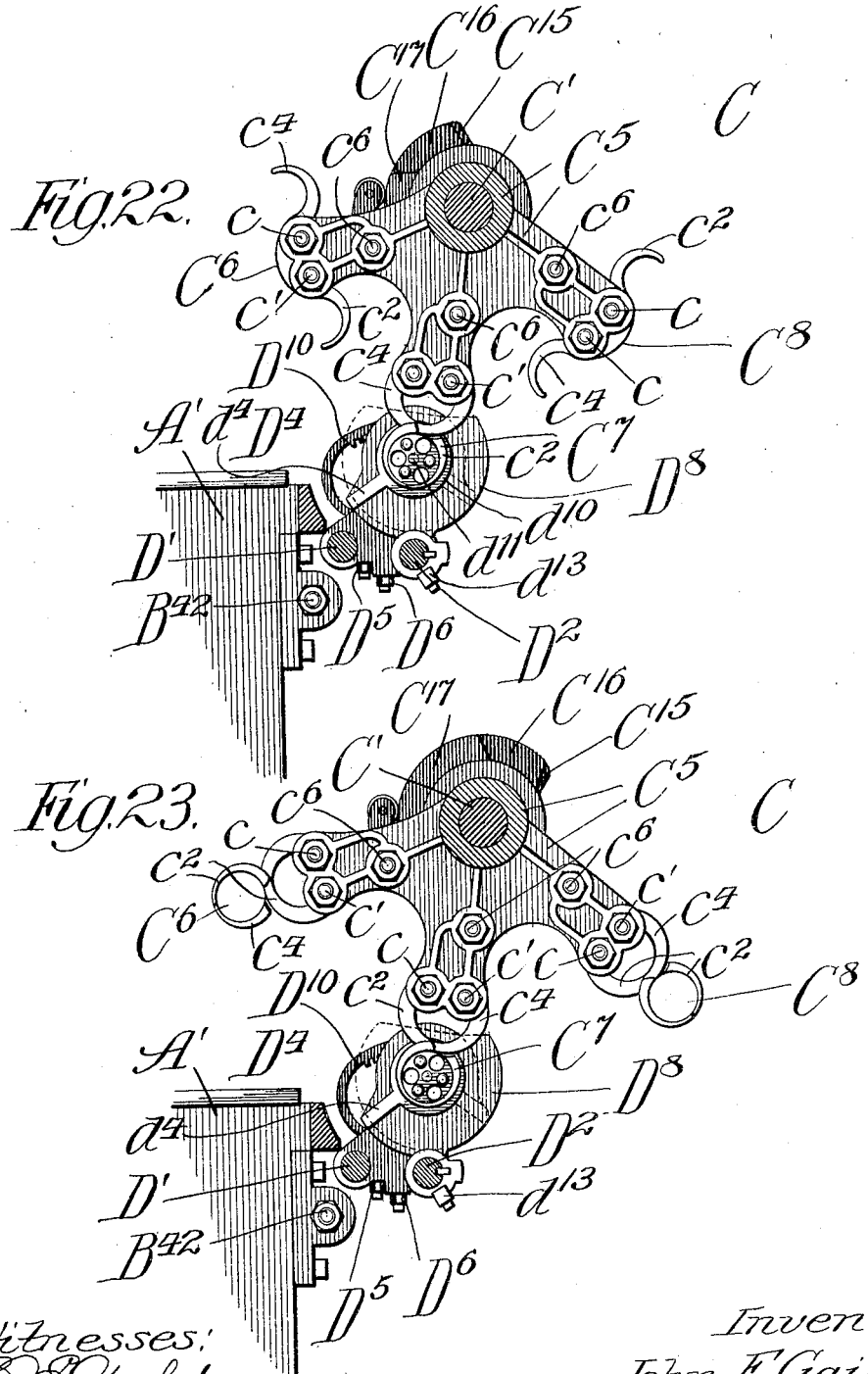

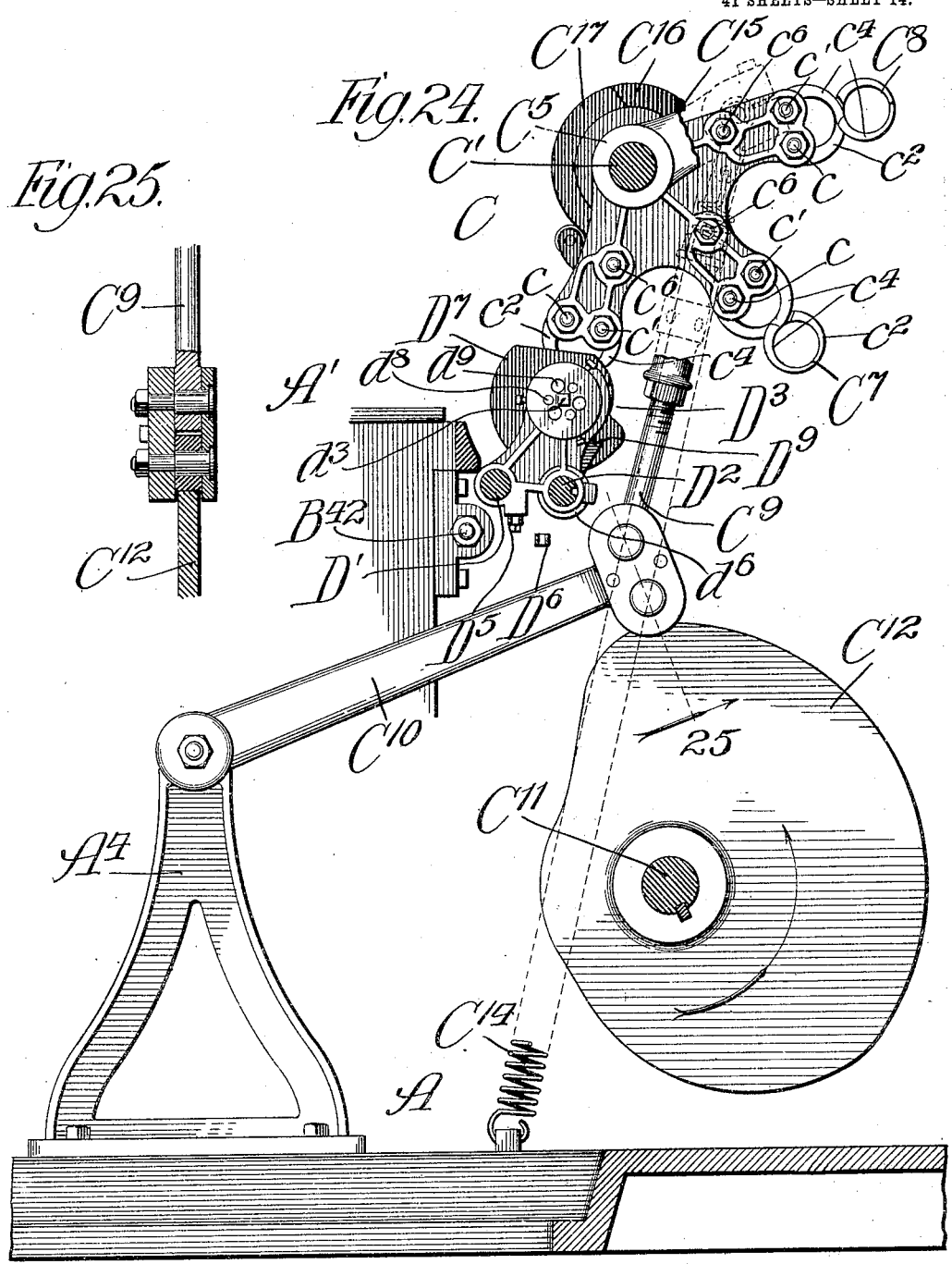

No. 810,048. PATENTED JAN. 16, 1906.
J. F. GAIL.
MACHINE FOR MAKING COIL SPRINGS.
APPLICATION FILED MAR. 3, 1904.

41 SHEETS—SHEET 15.

Witnesses:
Inventor,
John F. Gail,

No. 810,048. PATENTED JAN. 16, 1906.
J. F. GAIL.
MACHINE FOR MAKING COIL SPRINGS.
APPLICATION FILED MAR. 3, 1904.
41 SHEETS—SHEET 16.

Witnesses:
Inventor:
John F. Gail,

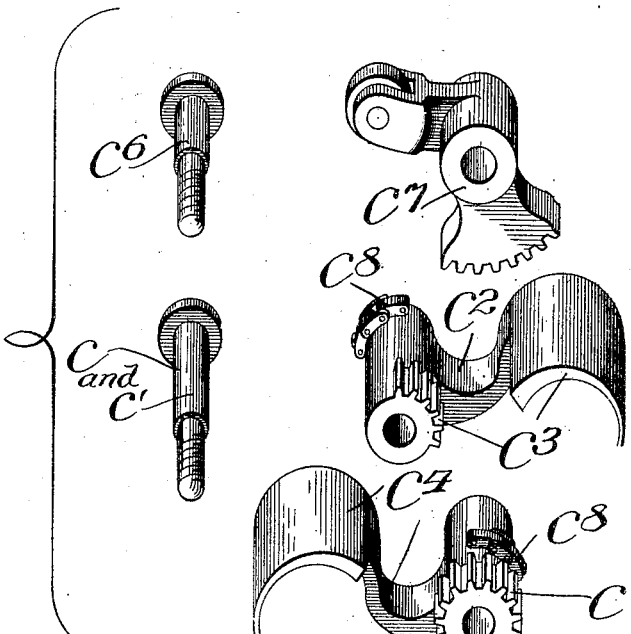
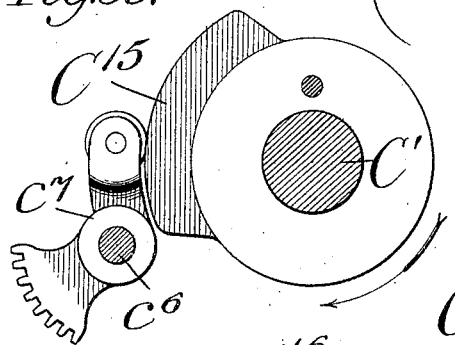
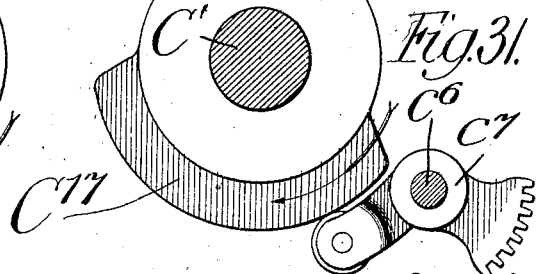
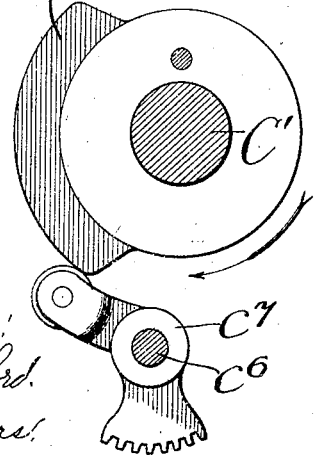
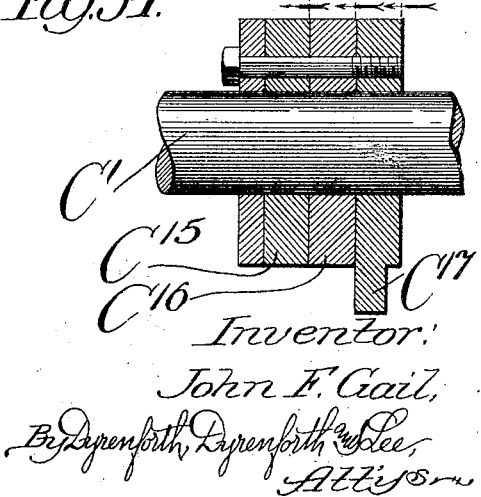

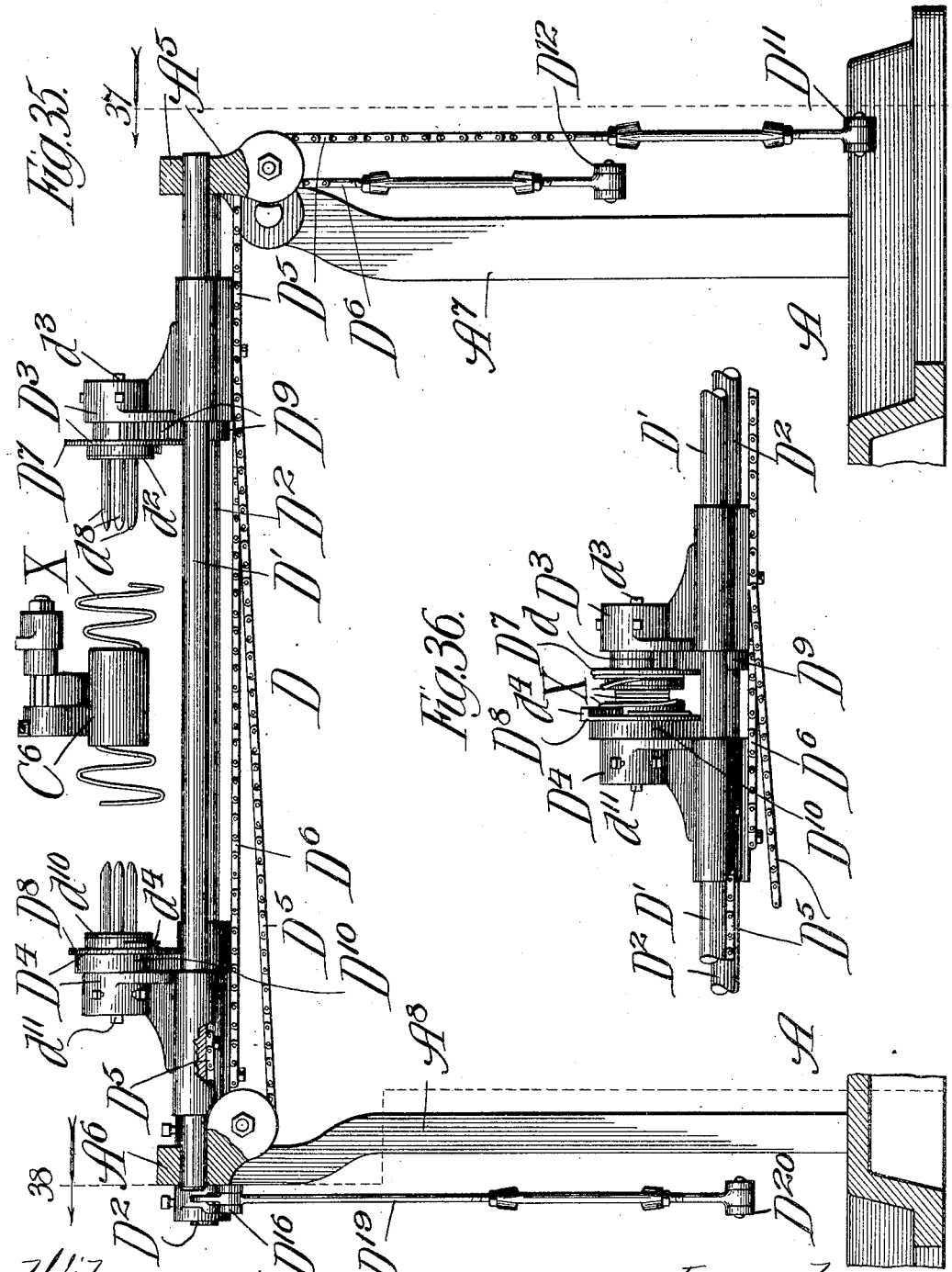

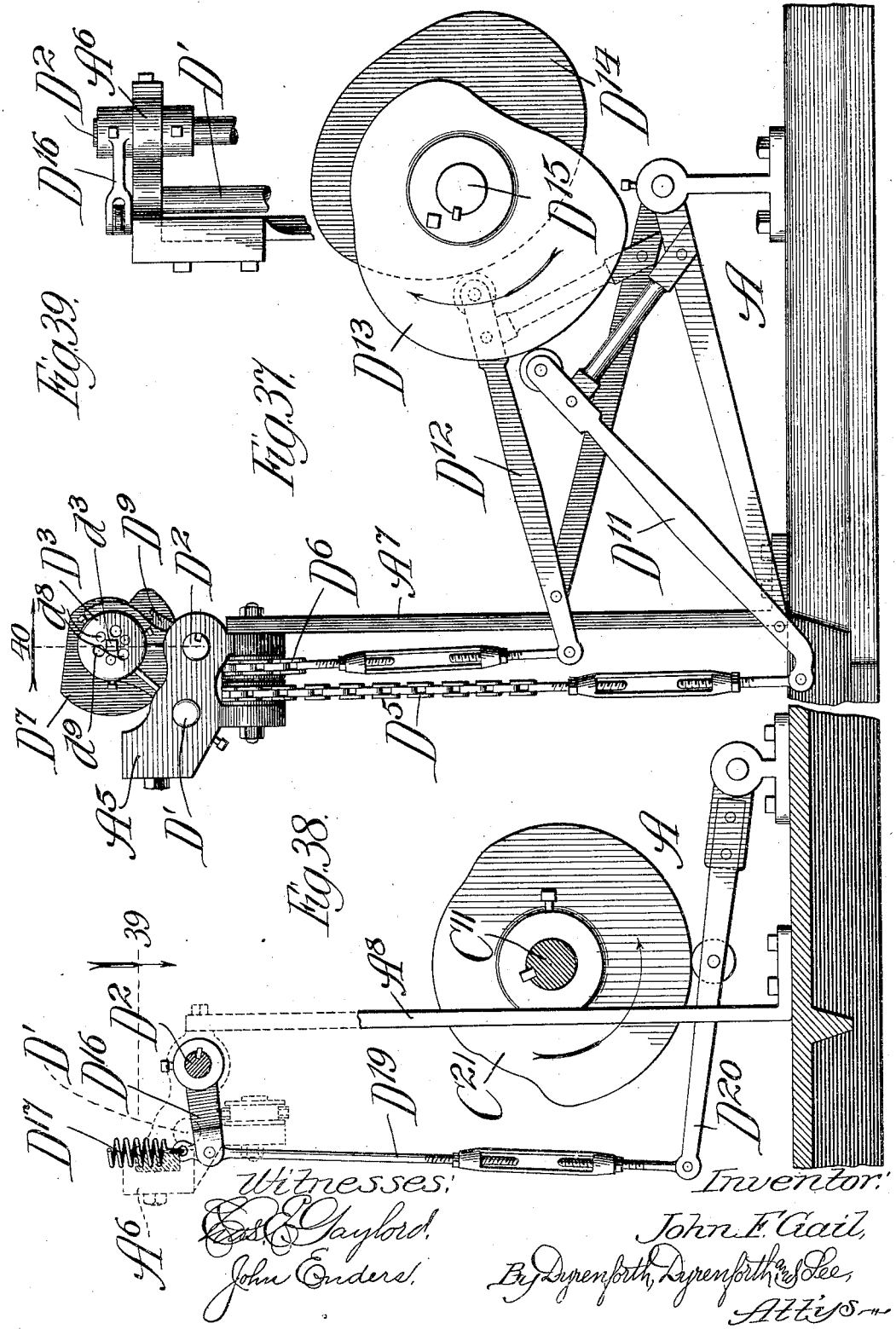

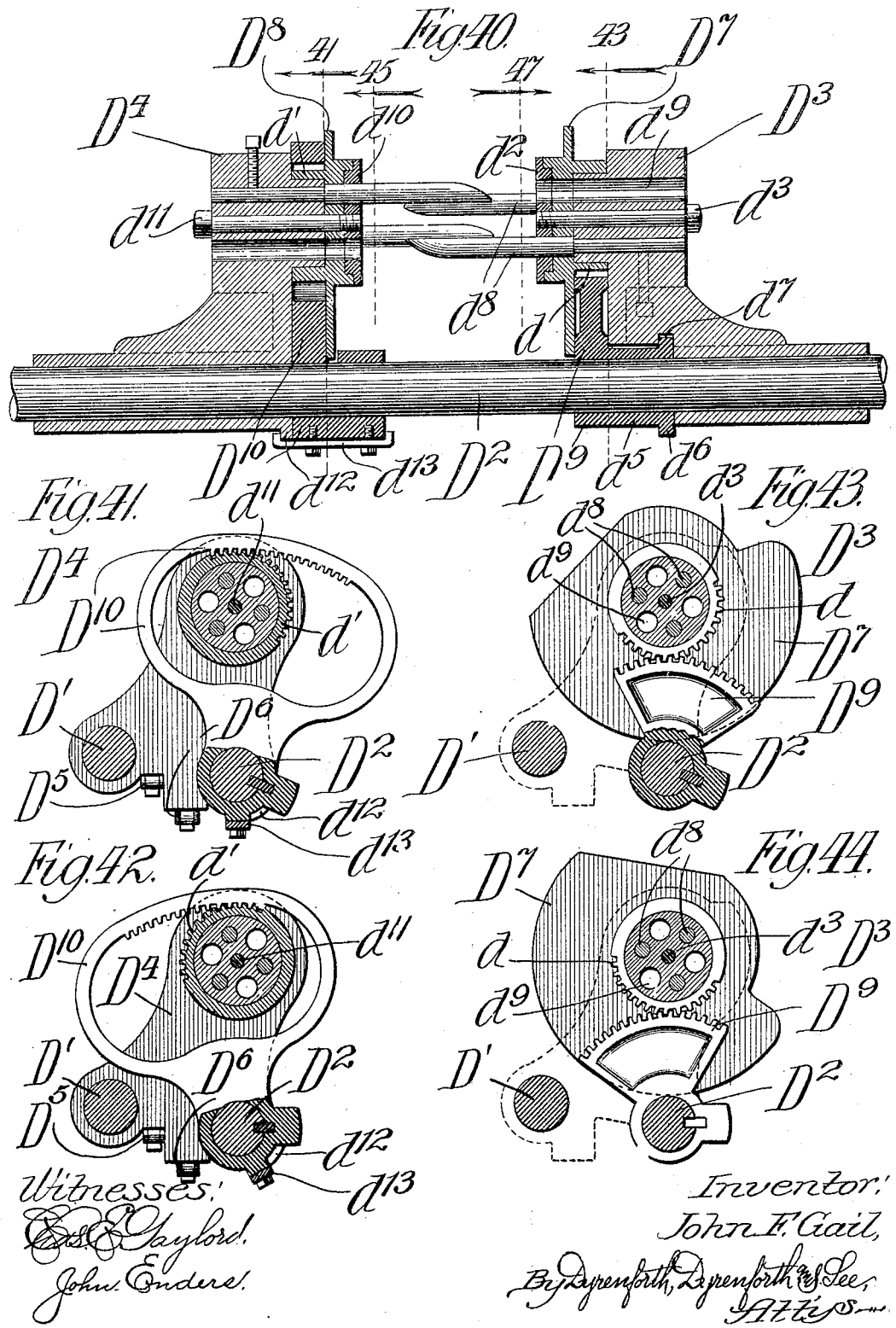

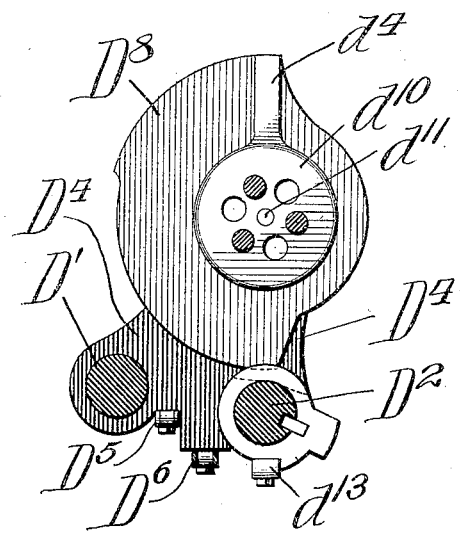
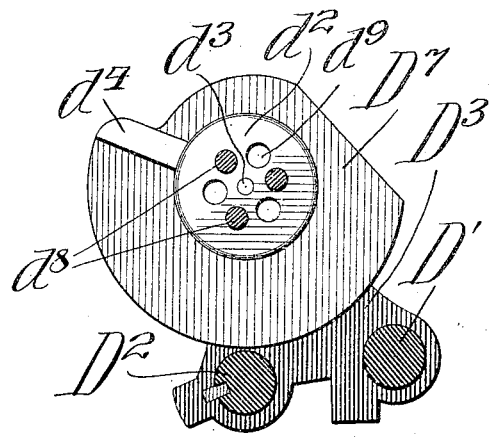
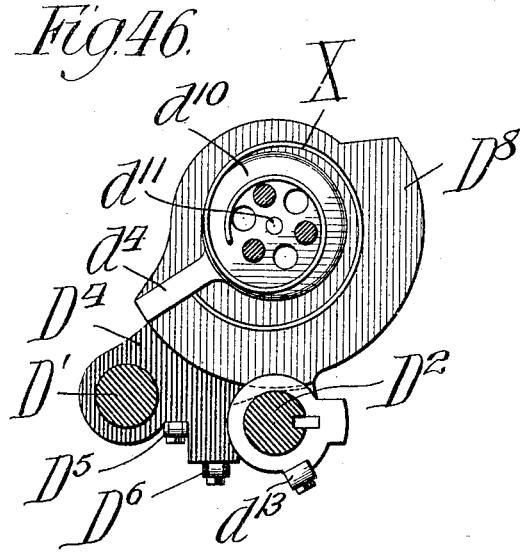
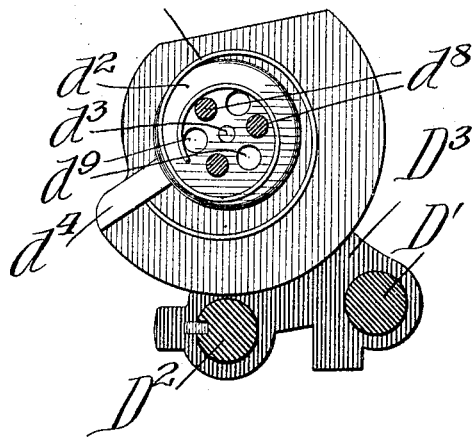

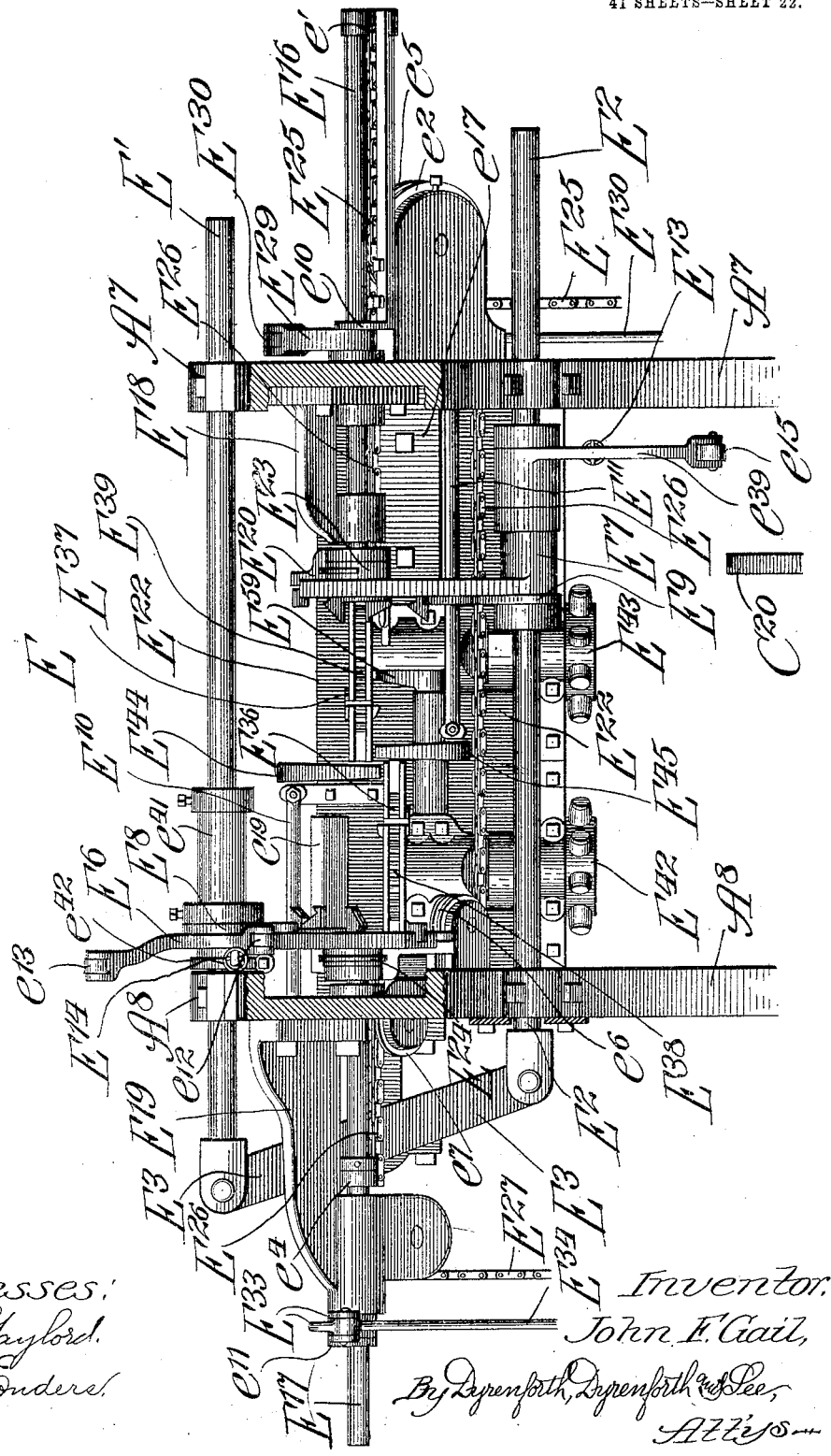

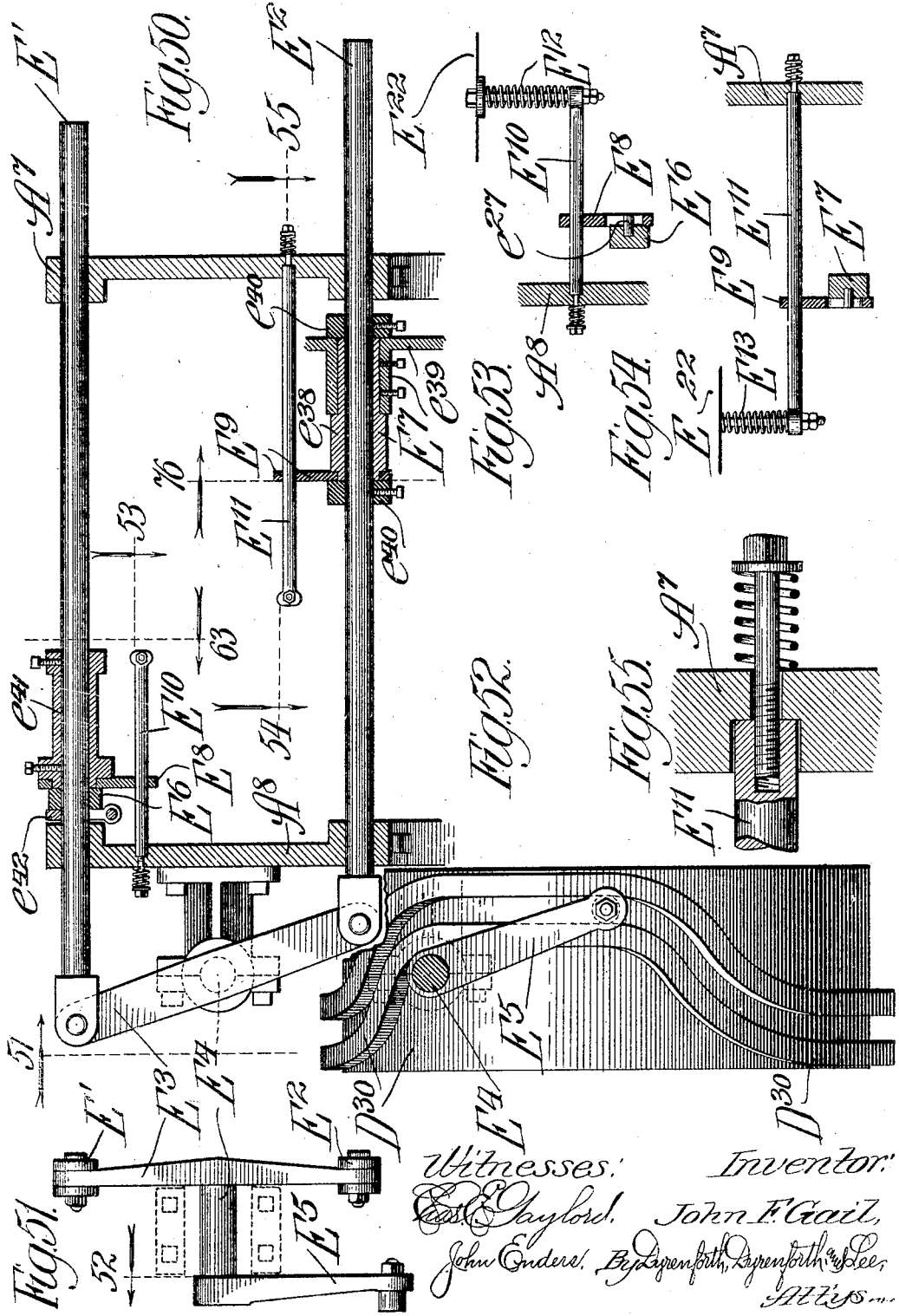

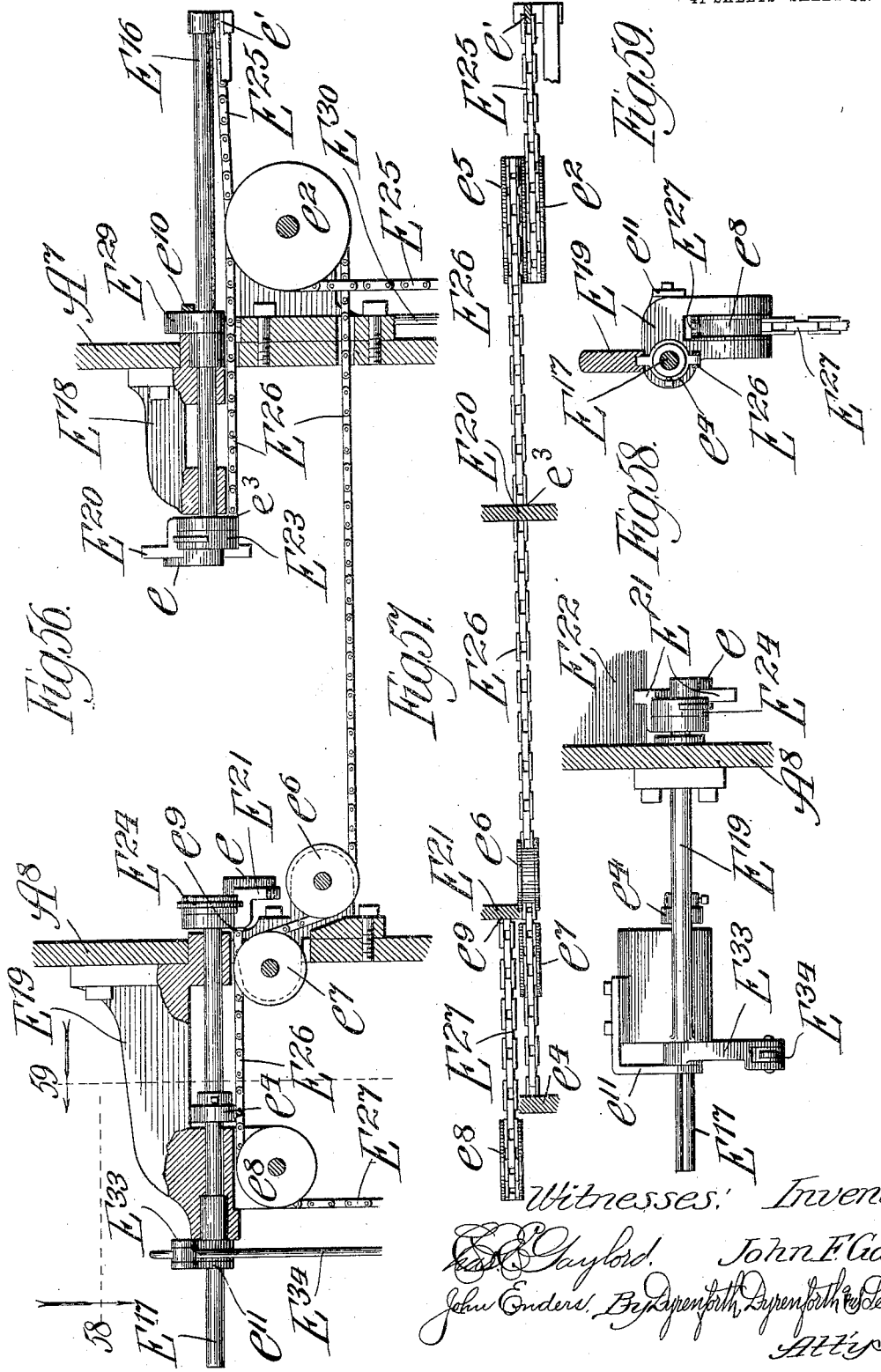

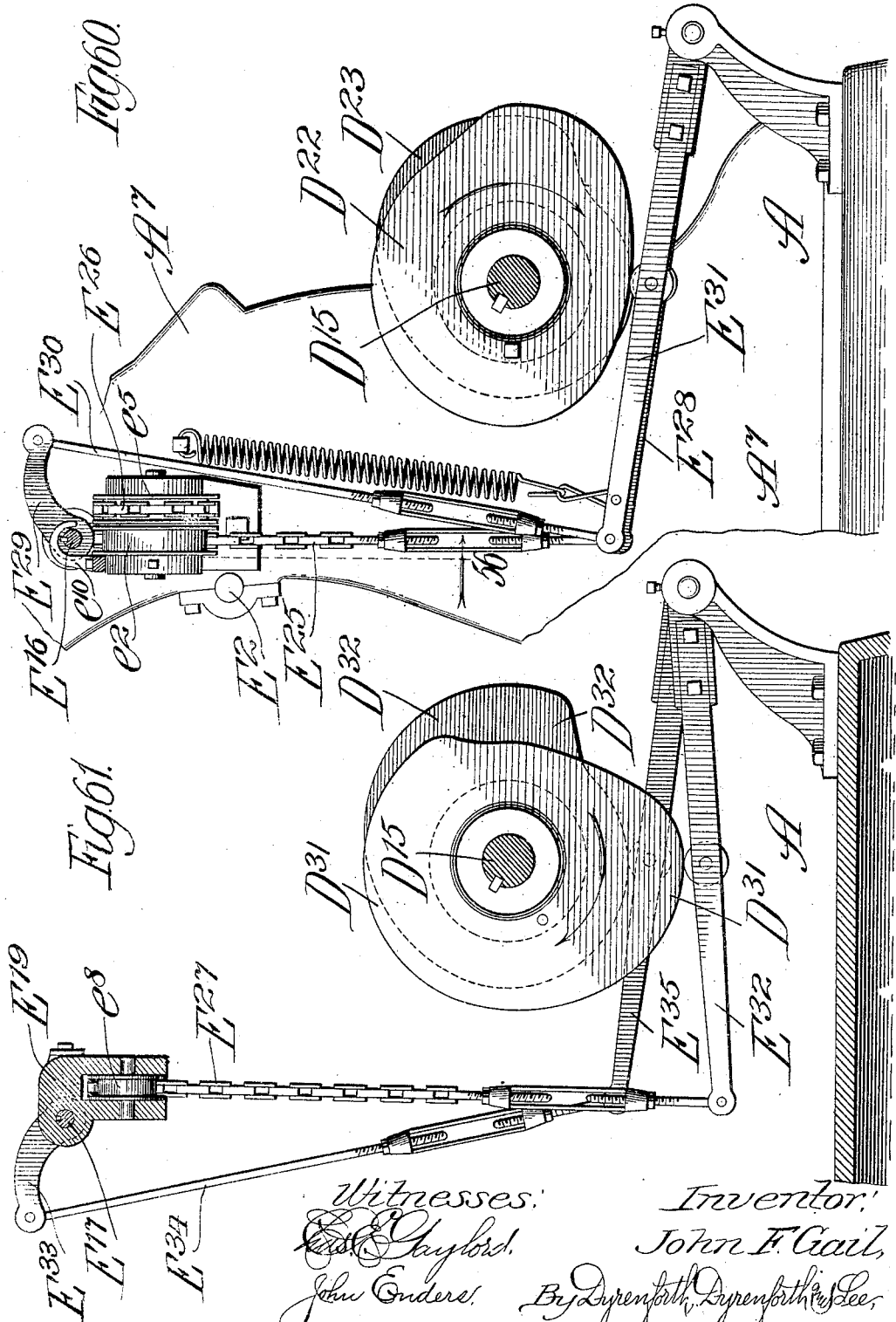

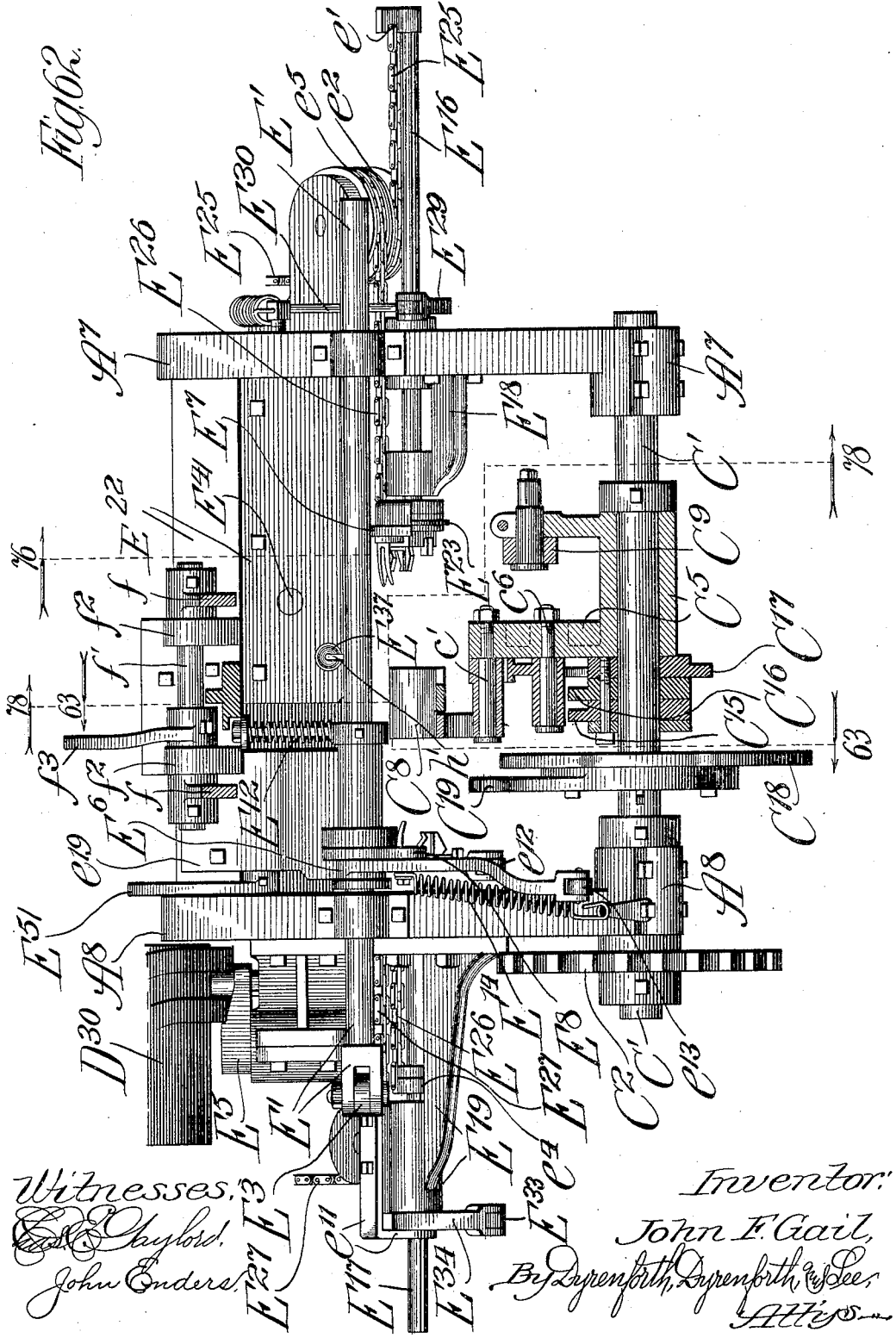

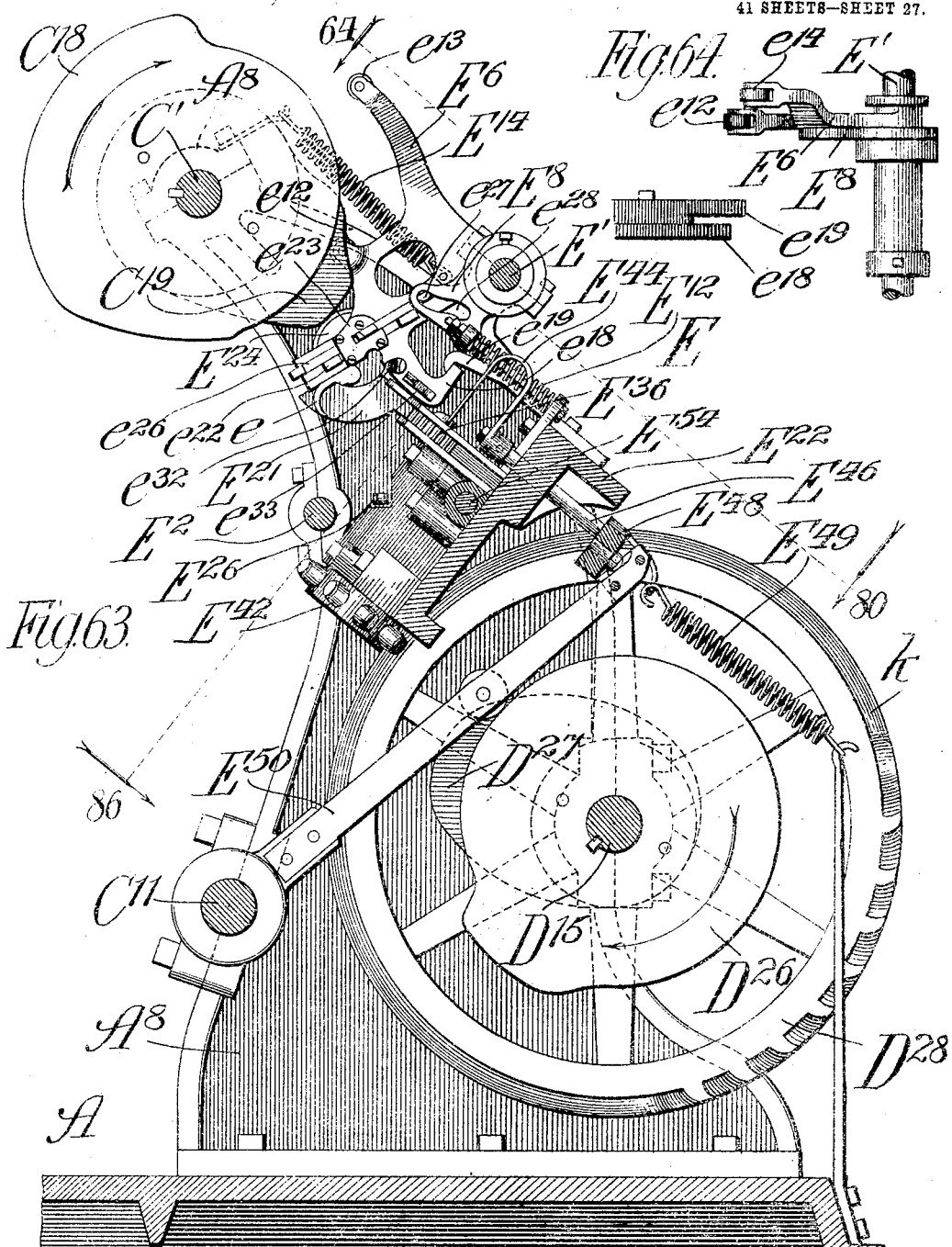

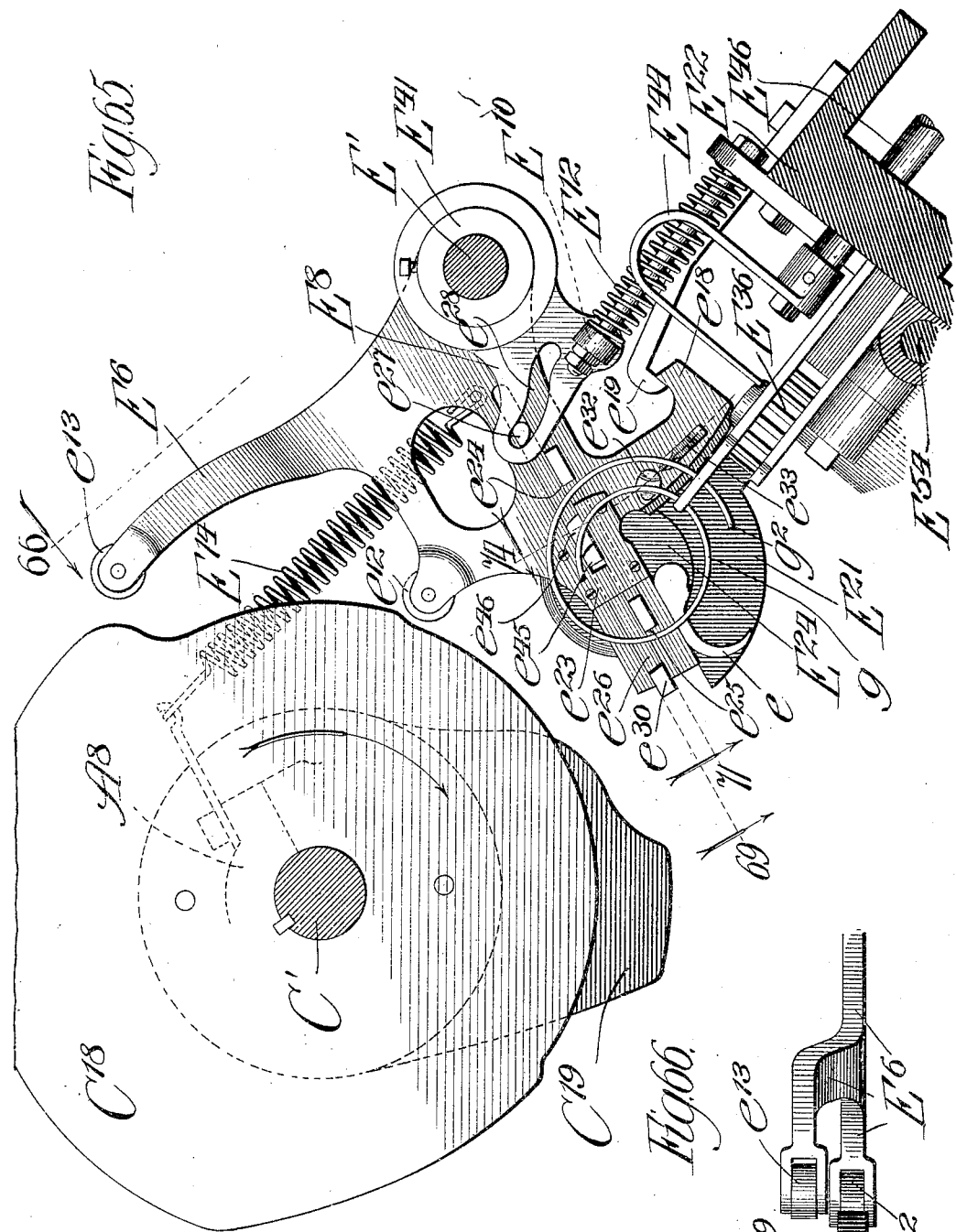

No. 810,048. PATENTED JAN. 16, 1906.
J. F. GAIL.
MACHINE FOR MAKING COIL SPRINGS.
APPLICATION FILED MAR. 3, 1904.

41 SHEETS—SHEET 29.

Witnesses:
C. E. Gaylord.
John Enders.

Inventor:
John F. Gail,
By Dyrenforth, Dyrenforth & Lee,
Attys.

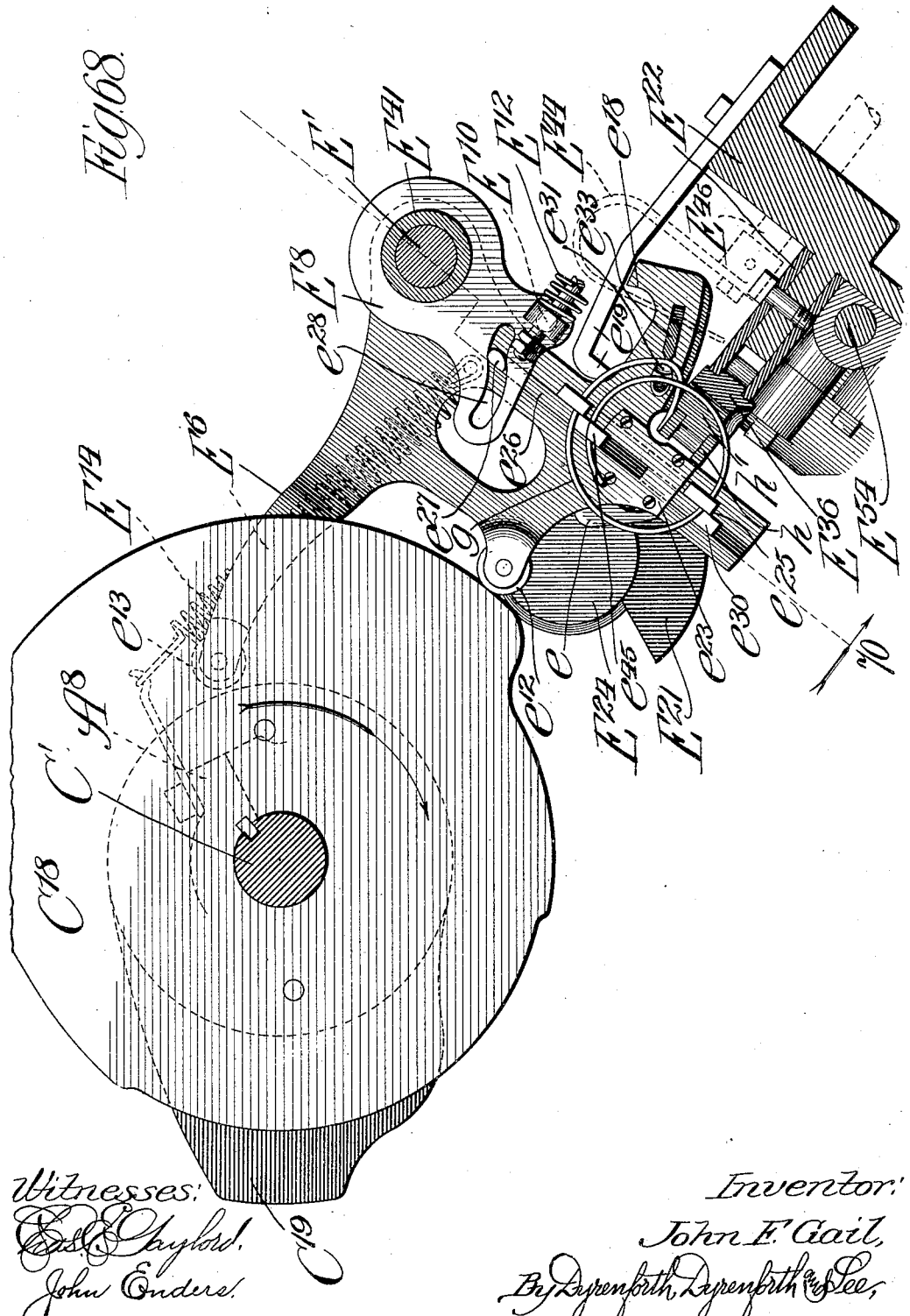

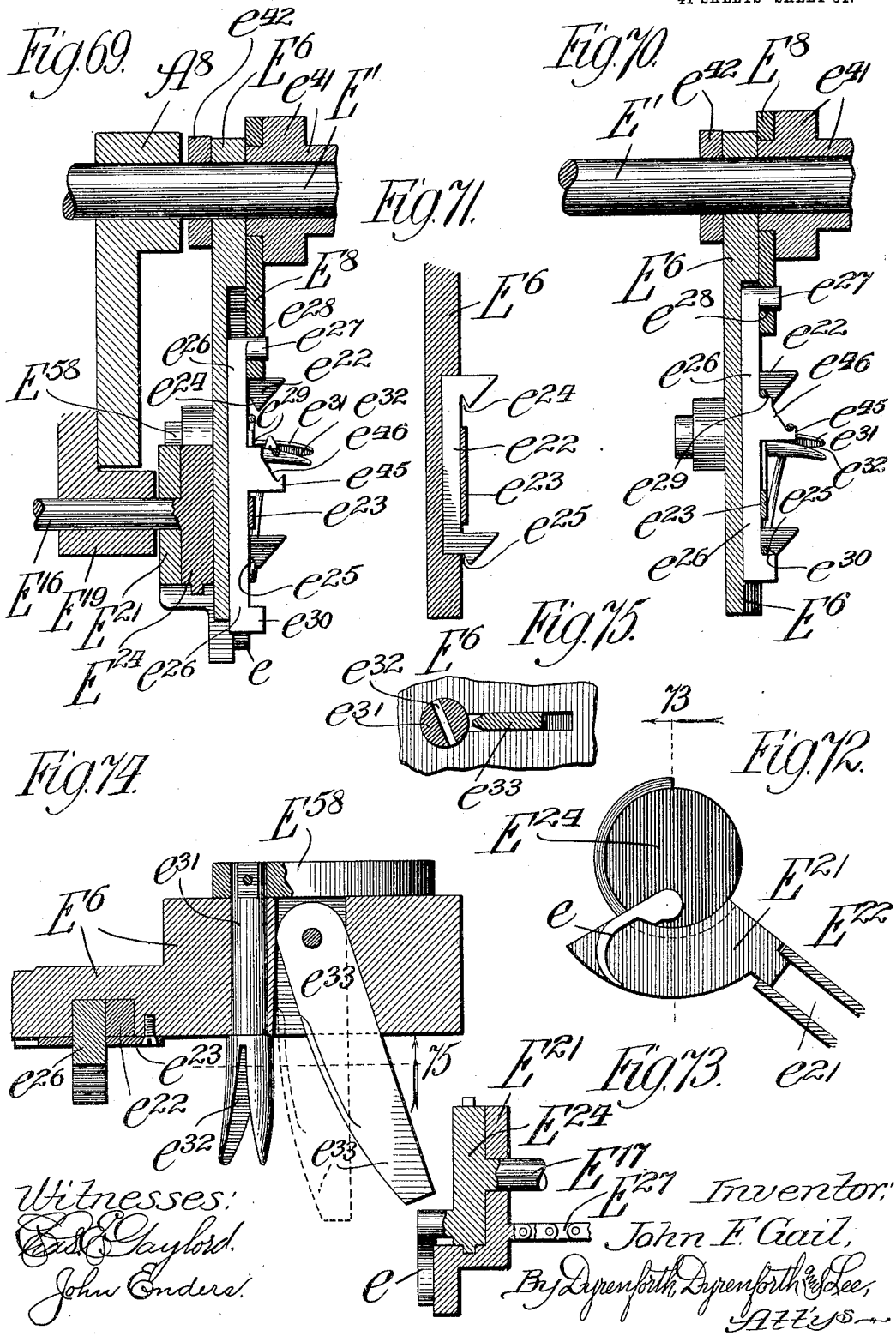

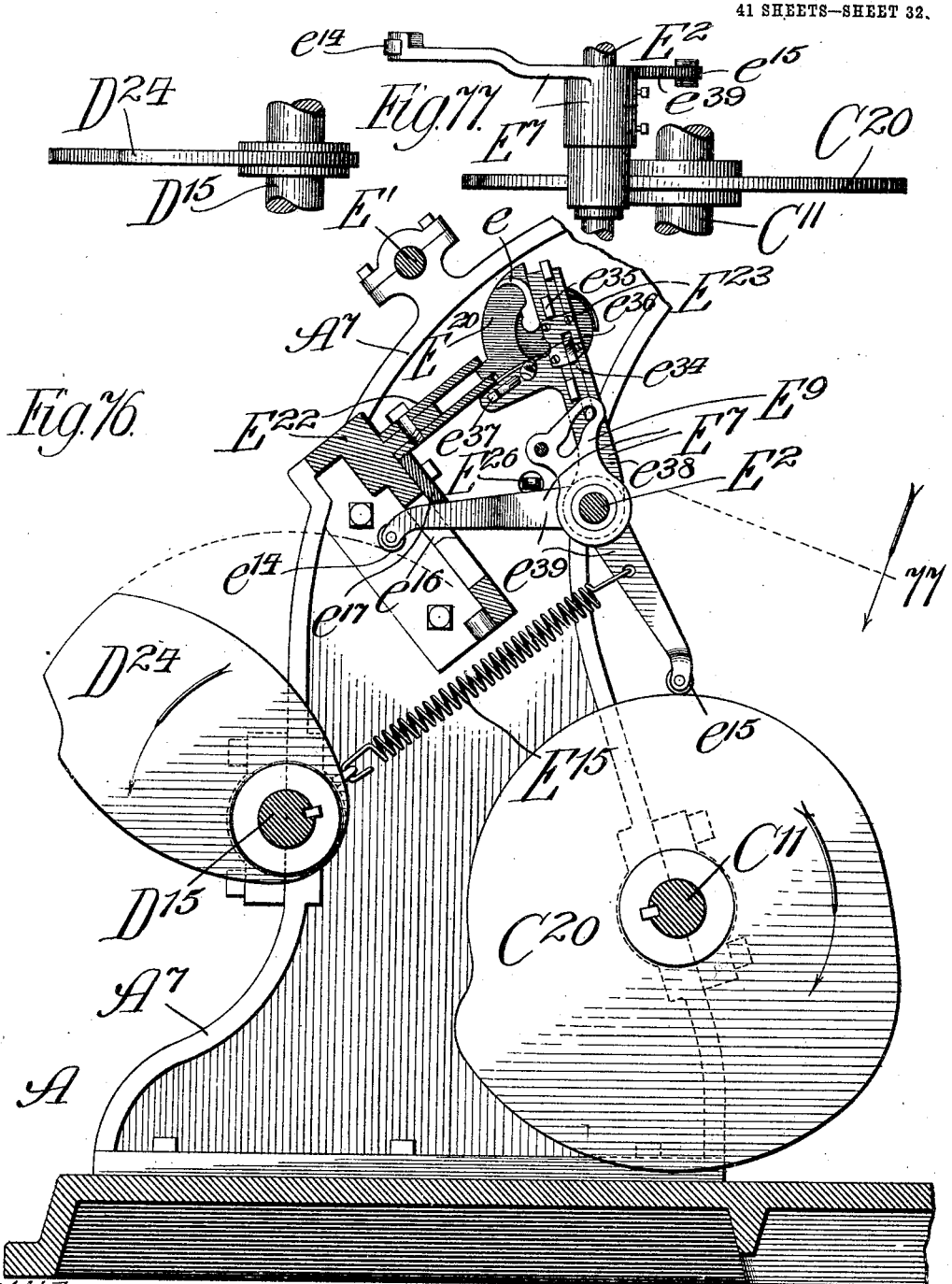

No. 810,048. PATENTED JAN. 16, 1906.
J. F. GAIL.
MACHINE FOR MAKING COIL SPRINGS.
APPLICATION FILED MAR. 3, 1904.

41 SHEETS—SHEET 33.

Witnesses:
Inventor:
John F. Gail,

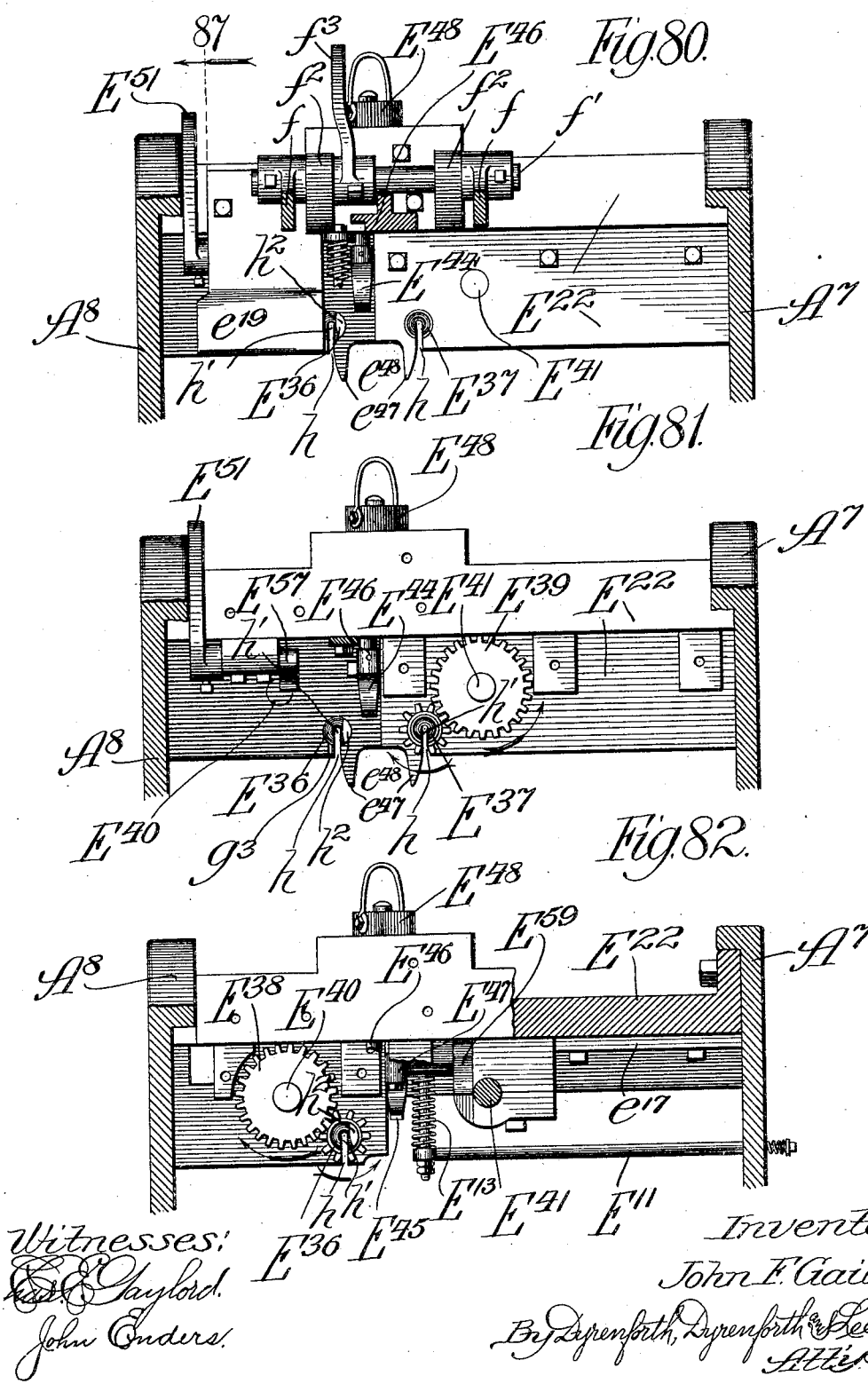

No. 810,048. PATENTED JAN. 16, 1906.
J. F. GAIL.
MACHINE FOR MAKING COIL SPRINGS.
APPLICATION FILED MAR. 3, 1904.
41 SHEETS—SHEET 35.
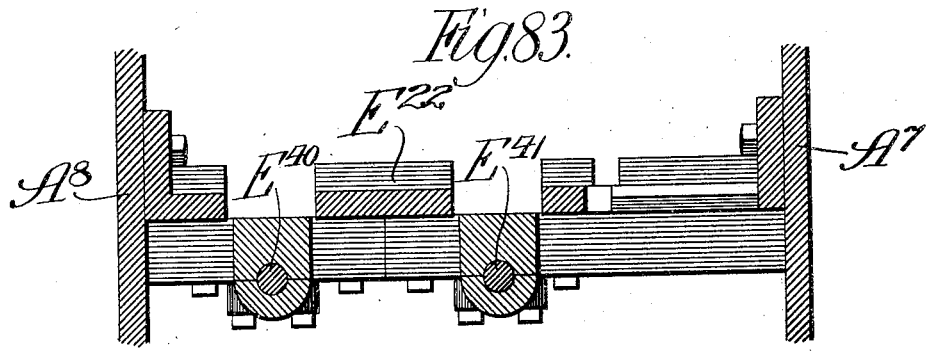
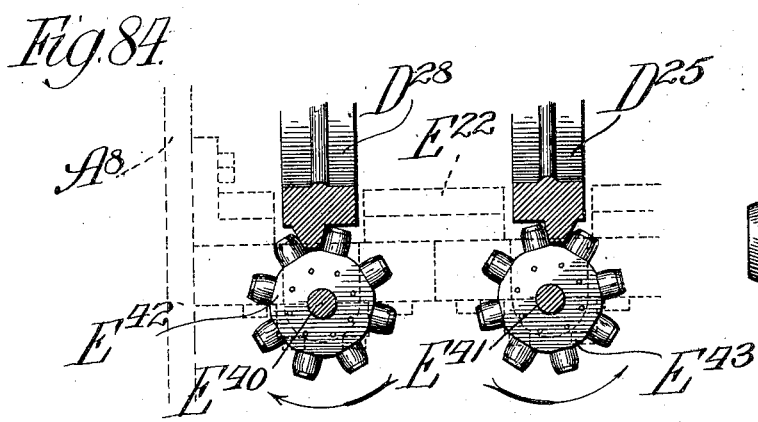
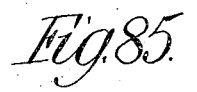
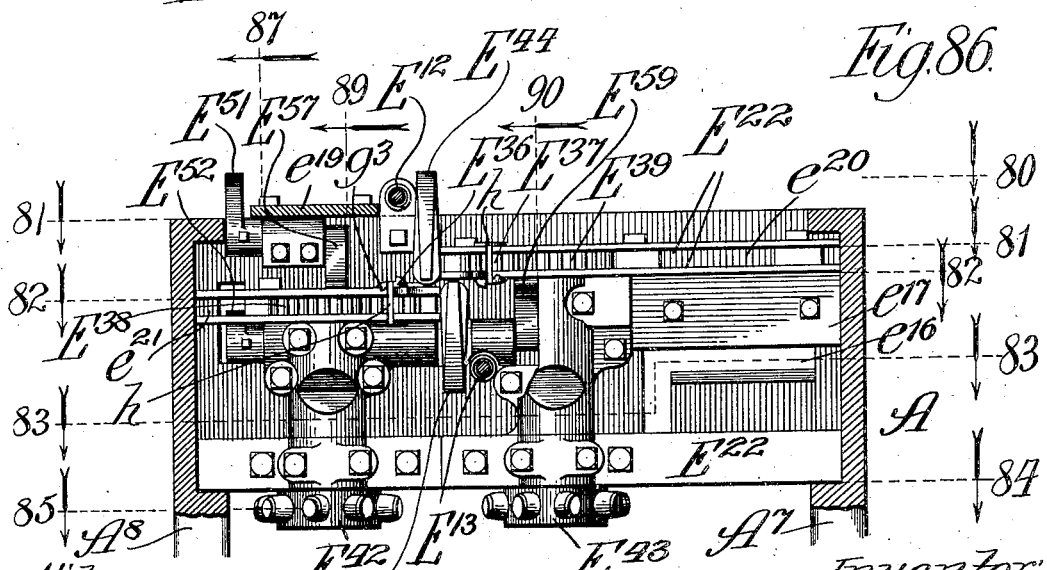
Witnesses:
Inventor:
John F. Gail,
By Dyrenforth, Dyrenforth & Lee,
Attys.

No. 810,048. PATENTED JAN. 16, 1906.
J. F. GAIL.
MACHINE FOR MAKING COIL SPRINGS.
APPLICATION FILED MAR. 3, 1904.
41 SHEETS—SHEET 36.
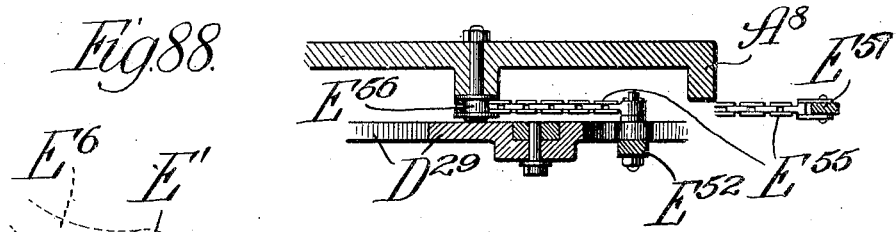
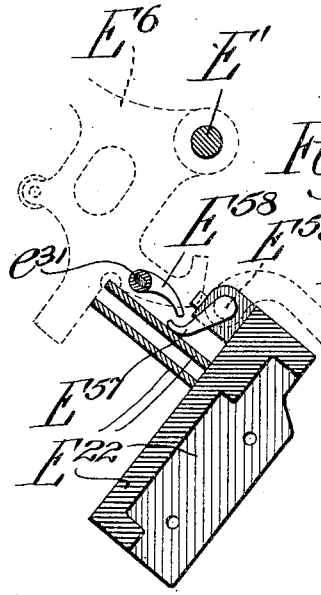
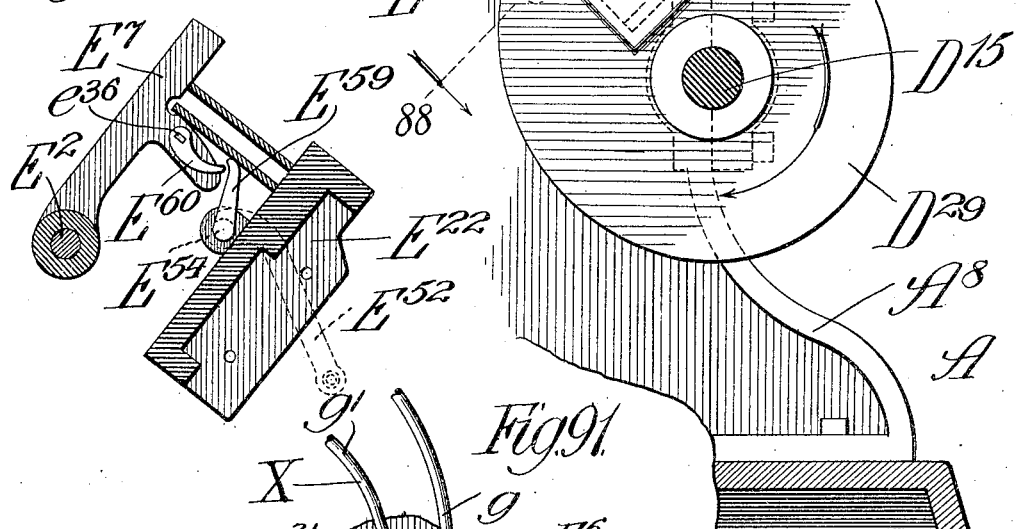
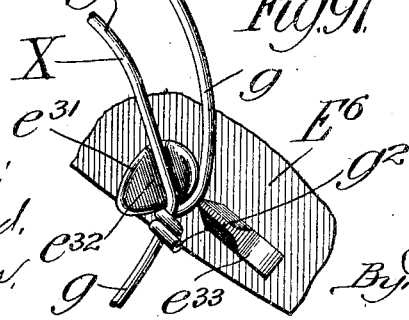
Witnesses:
Inventor:
John F. Gail,

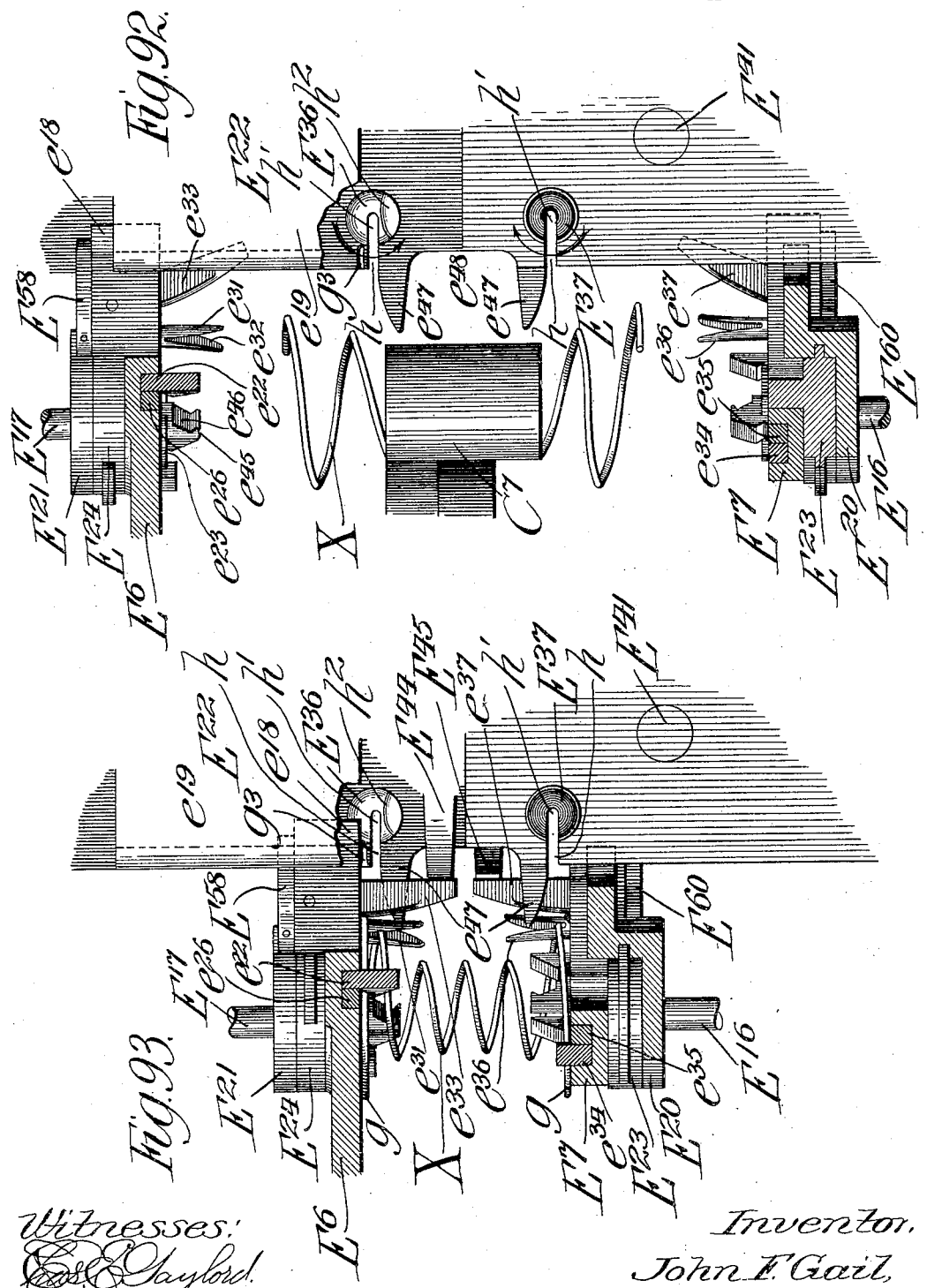

No. 810,048. PATENTED JAN. 16, 1906.
J. F. GAIL.
MACHINE FOR MAKING COIL SPRINGS.
APPLICATION FILED MAR. 3, 1904.
41 SHEETS—SHEET 38.
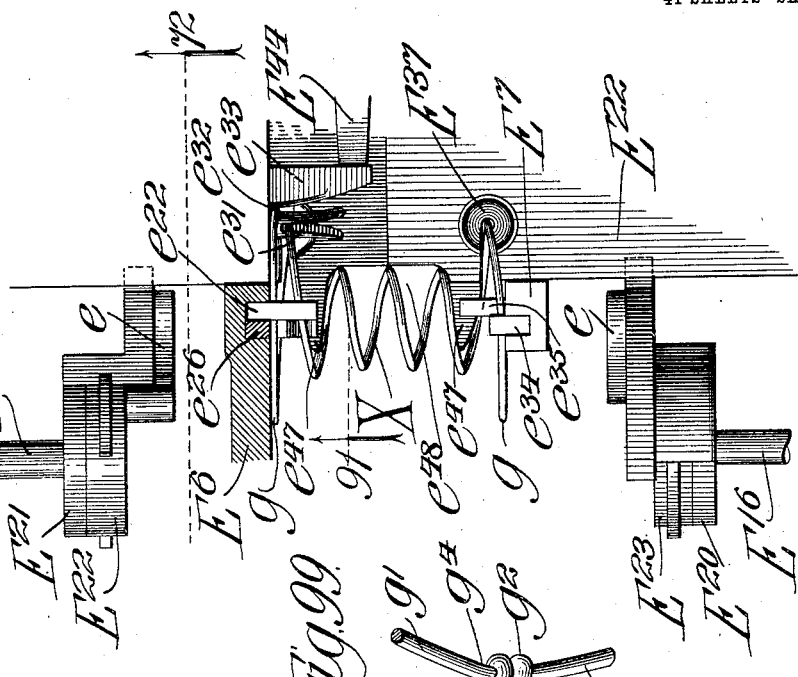
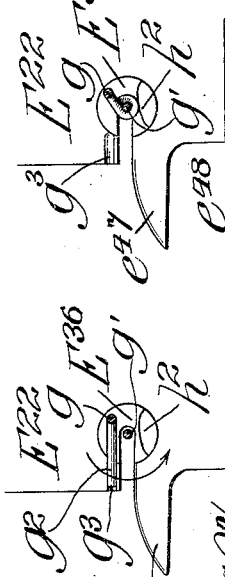

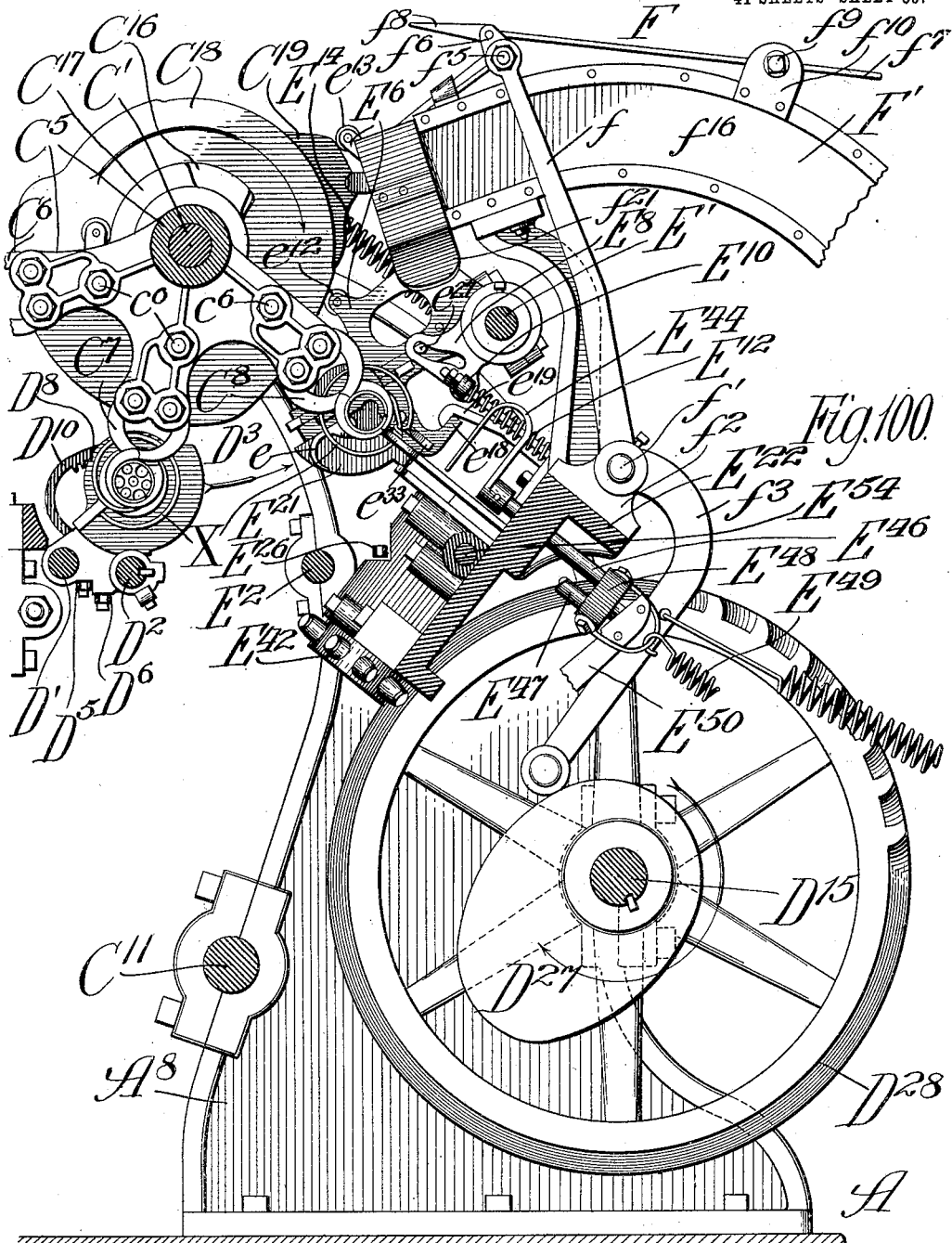

No. 810,048. PATENTED JAN. 16, 1906.
J. F. GAIL.
MACHINE FOR MAKING COIL SPRINGS.
APPLICATION FILED MAR. 3, 1904.
41 SHEETS—SHEET 40.
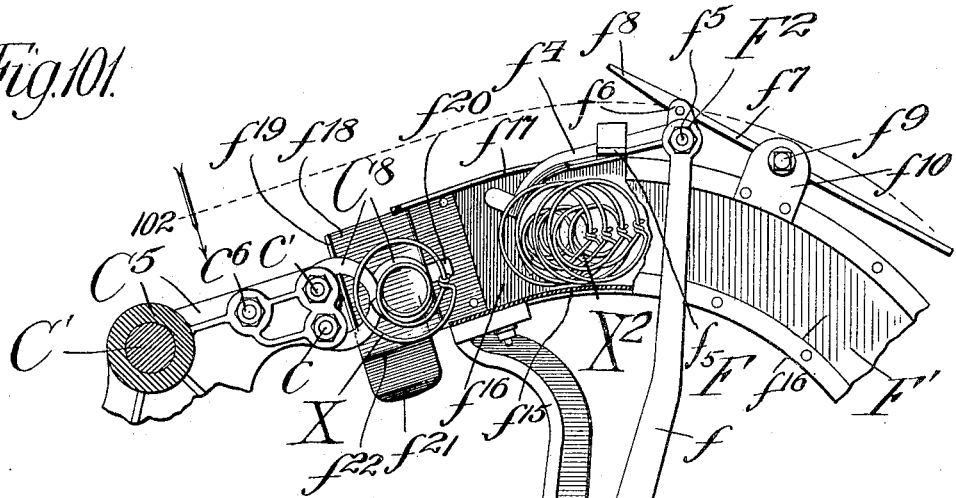
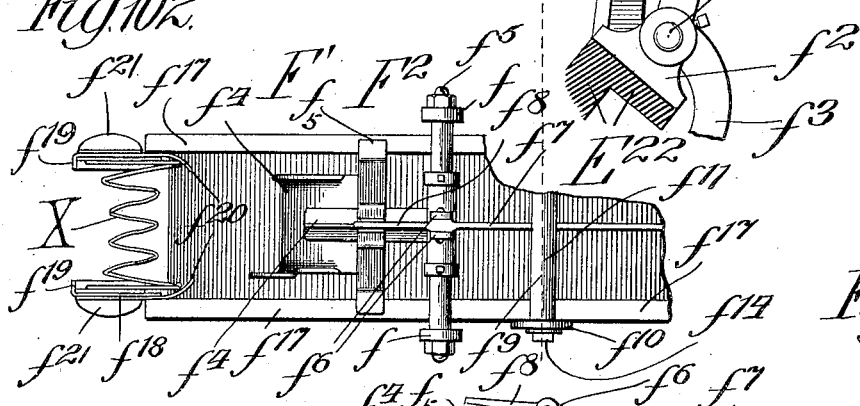
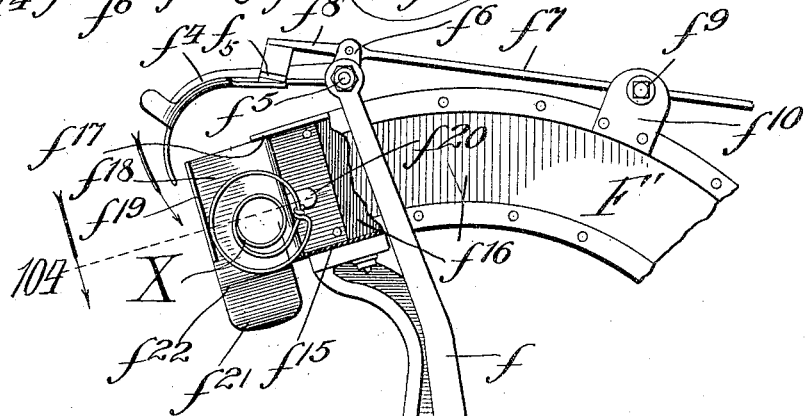

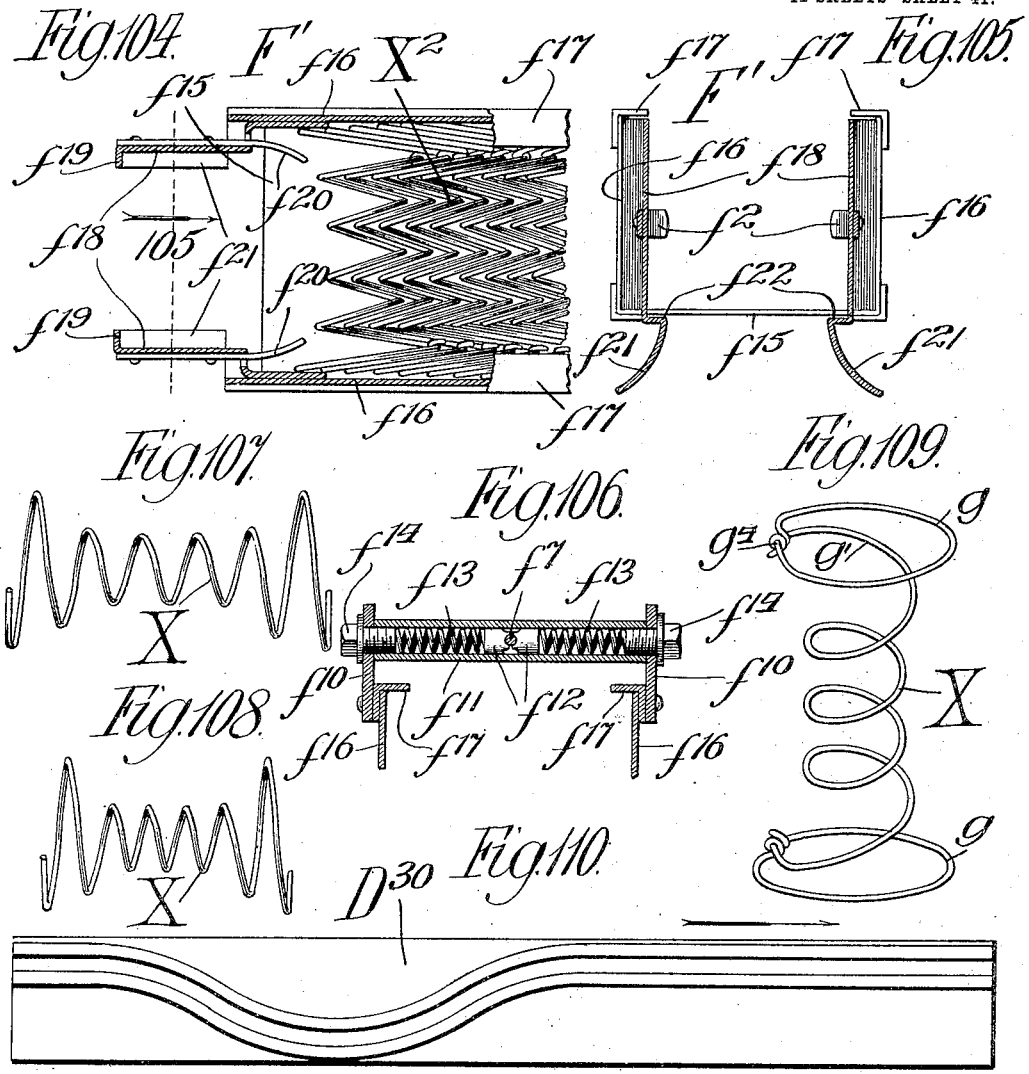

UNITED STATES PATENT OFFICE.

JOHN F. GAIL, OF KENOSHA, WISCONSIN, ASSIGNOR TO THE SIMMONS MANUFACTURING COMPANY, OF KENOSHA, WISCONSIN, A CORPORATION OF WISCONSIN.

MACHINE FOR MAKING COIL-SPRINGS.

No. 810,048.          Specification of Letters Patent.          Patented Jan. 16, 1906.

Application filed March 3, 1904. Serial No. 196,424.

*To all whom it may concern:*

Be it known that I, JOHN F. GAIL, a citizen of the United States, residing at Kenosha, in the county of Kenosha and State of Wisconsin, have invented a new and useful Improvement in Machines for Manufacturing Coil-Springs, of which the following is a specification.

My invention relates particularly to machines for use in the manufacture and nesting of coil-springs, such as are employed in spring-bed and furniture construction.

My primary object is to provide a simple and efficient machine for forming the coils from a wire fed into the machine, each coil being severed from the wire at the proper instant, pressing the coils to give to the wire thereof a proper set, knotting the wire to form the end rings of each coil, and nesting the finished coils compactly to enable them to be conveniently handled or stored.

In the embodiment shown in the accompanying drawings the invention comprises wire coiling and severing mechanism at the feed end of the machine, a pair of transversely-reciprocating presser-heads in the rear of said mechanism and having in connection therewith means for rotating the coil on its axis to properly position the same, knotting mechanism in the rear of the press and including transversely-reciprocating longitudinally-oscillating gripping devices for engaging the ends of a coil, together with gages for regulating the lengths of the projections of the spiral which are to be employed in making the knots, the gripping devices serving during their rearwardly-swinging motion to carry the ends of the coil into the slotted knotting-pinions and in their forward movement to withdraw the coil from the knotting-pinions, nesting mechanism in the rear of and above the knotting mechanism, and an intermittently-actuated swinging coil-carrier equipped with three longitudinally-alined radially-arranged properly-spaced pairs of coil-gripping jaws serving simultaneously to transfer the newly-coiled spring to the press, the pressed spring to the gripping devices of the knotting mechanism, and the completed spring from said gripping devices to the nesting mechanism.

In the following brief description of the drawings the sectional views bear the same numerals as the section-indicating lines which are placed on other views to indicate where the sections are taken, and for brevity the section-indicating line bearing any certain numeral is referred to as the line corresponding with the figure bearing the same numeral.

Figure 27:
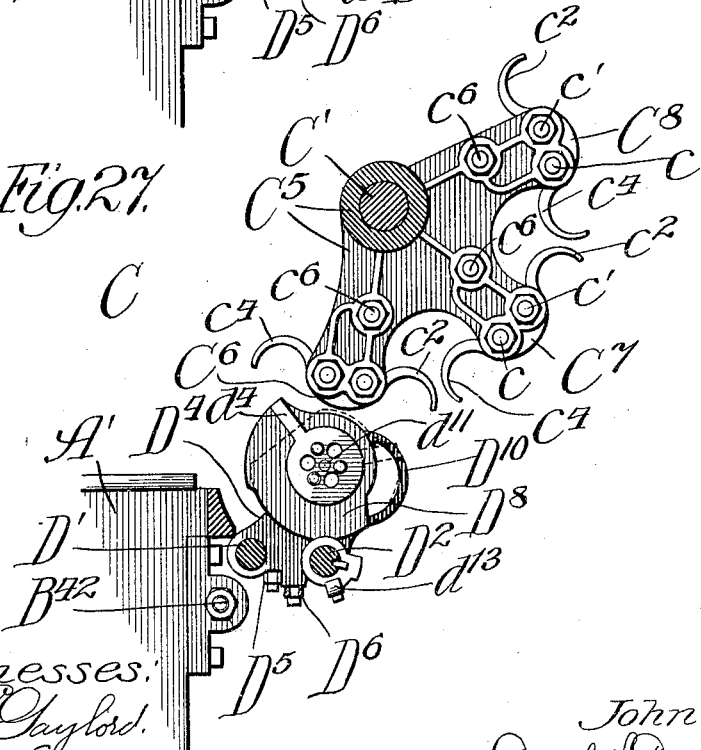
Figure 28:
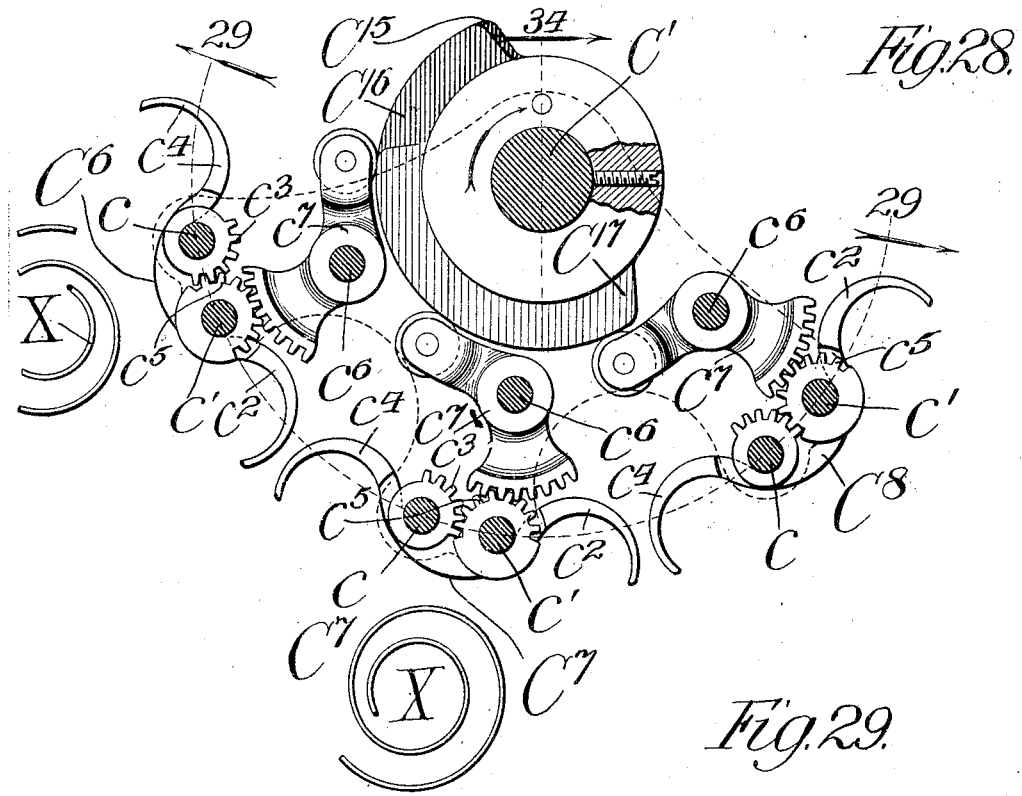
Figure 29:
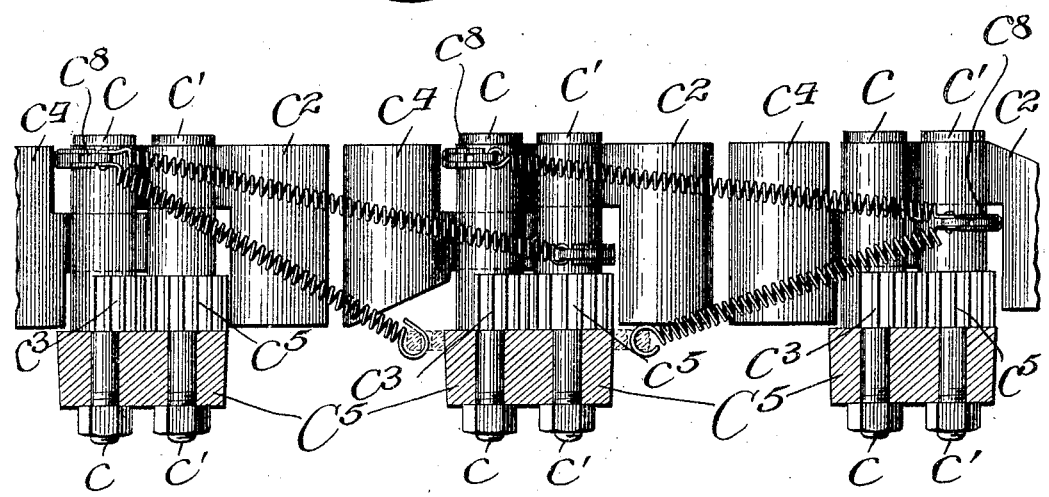
Figure 61:
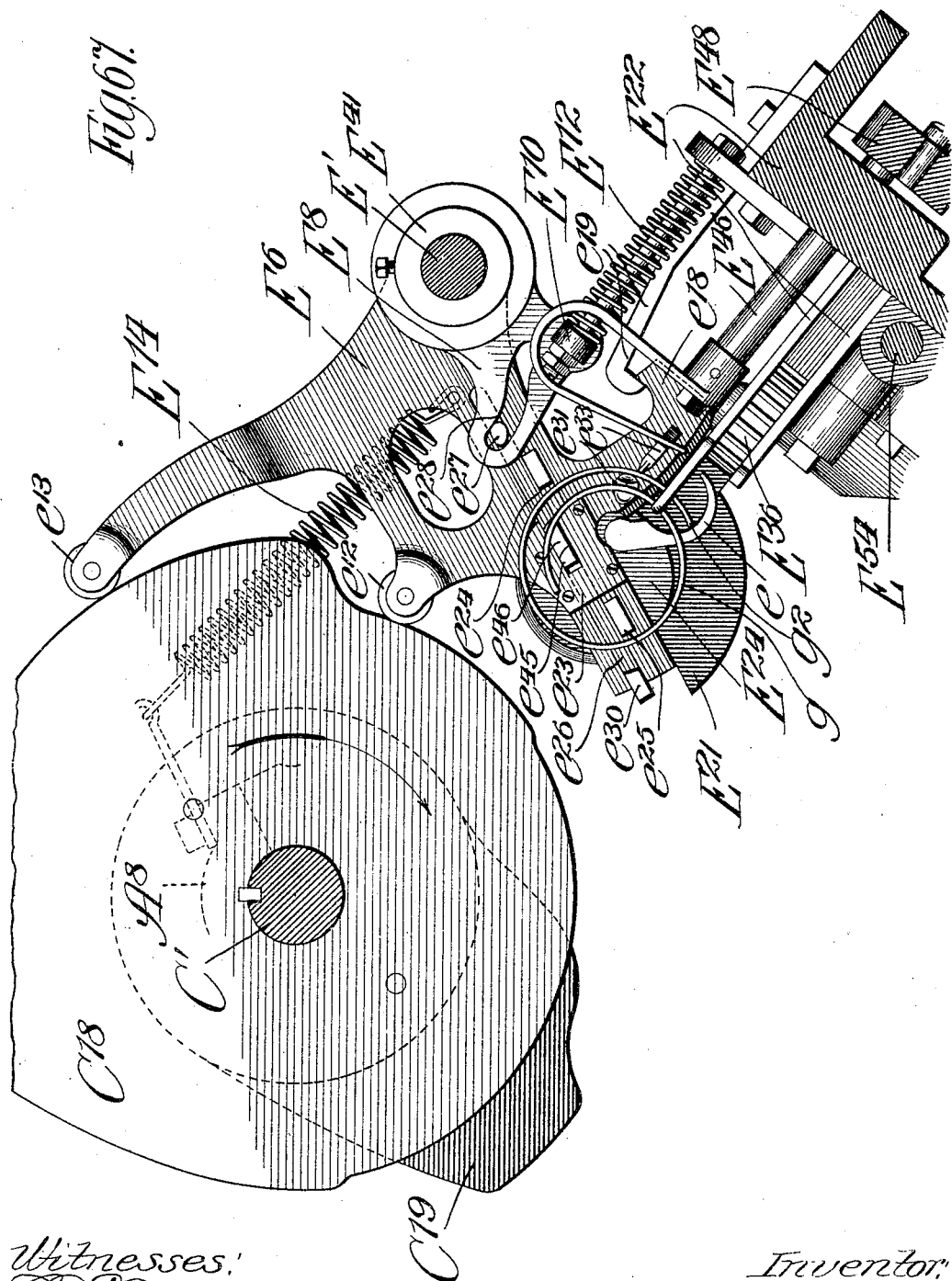
Figure 79:
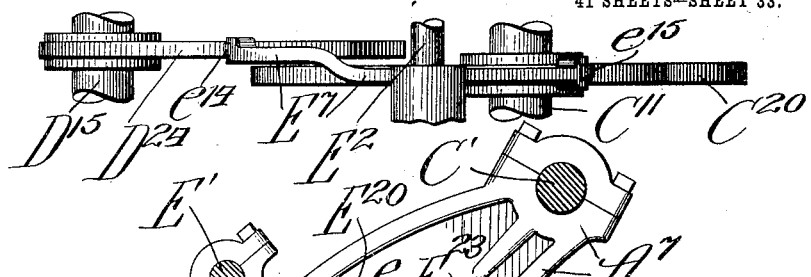
Figure 78:
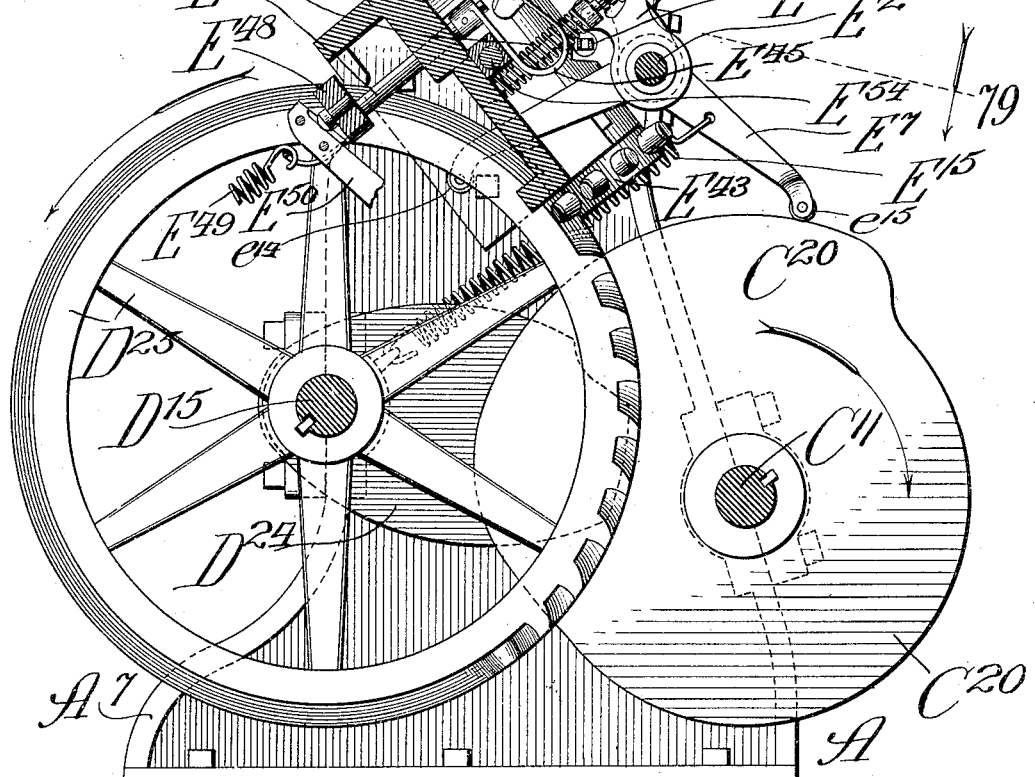

In the drawings, Figure 1 represents a left side view of the machine, facing with the machine, a portion of the stacker or nesting mechanism being broken away; Fig. 2, a right side view of the machine; Fig. 3, a front end view of the machine; Fig. 4, a plan sectional view taken as indicated at line 4 4 of Figs. 1 and 2; Fig. 5, a left side section of the coiling mechanism, taken on line 5 of Figs. 4 and 6; Fig. 6, a transverse vertical section taken as indicated at line 6 6 of Figs. 4 and 5, giving a view of the coiling mechanism from the rear thereof; Fig. 7, a broken vertical transverse section taken as indicated at line 7 on Figs. 1, 2, 4, and 5; Fig. 8, a broken vertical longitudinal section taken as indicated at the corresponding line of Figs. 3, 4, 6, and 7, the dotted lines indicating the means for adjusting the position of the coil-forming roller; Fig. 9, a broken plan section taken as indicated at line 9 of Fig. 8; Fig. 10, a broken vertical section taken as indicated at line 10 of Fig. 8; Fig. 11, a section taken as indicated at line 11 of Fig. 8; Fig. 12, a vertical longitudinal section taken as indicated at line 12 of Figs. 3, 4, 6, and 7, showing the wire-severing means; Figs. 13 and 14, views taken as indicated at the corresponding lines of Fig. 12; Fig. 15, a section taken as indicated at line 15 of Fig. 13; Fig. 16, a broken longitudinal section taken as indicated at line 16 of Figs. 3, 4, 6, and 7, this view illustrating the means for intermittently stopping the feed of the wire into the coiling mechanism; Fig. 17, a broken vertical transverse section taken as indicated at the corresponding line of Fig. 2 and illustrating the friction-clutch and friction-brake employed in the power transmission; Fig. 18, a section taken as indicated at the corresponding line of Fig. 17; Fig. 19, a section taken at the corresponding line of Fig. 18; Fig. 20, a vertical transverse section taken as indicated at line 20 of Fig. 4 and giving a front view of the press and the coil-carrier; Fig. 21, a section taken as indicated at line 21 of Fig. 20 and showing the coil-carrier at the forward end of its arc of traverse, all the pairs of coil-gripping jaws being open; Fig. 22, a section taken as indicated at line 22 of Fig. 20, the carrier being in the same position, the intermediate set of coil-gripping jaws thereof being closed, however; Fig. 23, a similar view showing all three pairs of jaws closed; Fig. 24, a view showing the carrier swung to the rear end of its traverse, all the jaws still remaining closed, the carrier having served, in swinging from the position of Fig. 23 to the position of Fig. 24, to transfer simultaneously a coil from the coiling mechanism to the press, a coil from the press to the knotting mechanism, and a coil from the knotting mechanism to the nesting mechanism; Fig. 25, a section taken as indicated at line 25 of Fig. 24 and illustrating a detail of the construction of the carrier-actuating means; Fig. 26, a view showing the carrier in the position of Fig. 24, the intermediate and rear pairs of jaws of the carrier being open, however, the front pair of jaws remaining closed to support the front coil while the fingers of the presser-heads are entering it; Fig. 27, a view of the carrier in the same position, all the pairs of jaws being open; Fig. 28, a section taken as indicated at line 28 of Fig 20 and showing the carrier on an enlarged scale in its forward position, the position of the newly-coiled spring and of the pressed spring being indicated with relation to the forward and intermediate pairs of jaws of the carrier; Fig. 29, a view in the nature of a development of a section taken as indicated at line 29 of Fig. 28; Fig. 30, a perspective view illustrating the parts and connections of a pair of jaws of the carrier; Fig. 31, a view of the cam employed for opening the rear pair of jaws of the carrier; Fig. 32, a view of the cam employed for opening the intermediate pair of jaws of the carrier; Fig. 33, a view of the cam for opening the front pair of jaws of the carrier, the sections of Figs. 31, 32, and 33 being taken as indicated at the corresponding lines of Fig. 34; Fig. 34, a sectional view of the cams with their actuating-shaft in elevation, the section being taken as indicated at line 34 of Fig. 28; Fig. 35, a section taken as indicated at line 35 of Fig. 1 and showing the press, including the reciprocating presser-heads thereof; Fig. 36, a view showing the presser-heads with an interposed spring under compression; Fig. 37, a section taken as indicated at line 37 of Fig. 35 and showing the cams and levers employed at one side of the machine for actuating the presser-heads; Fig. 38, a section taken as indicated at line 38 of Fig. 35 and showing the cam and lever for rocking a shaft which constitutes one of the guides of the presser-heads, said shaft serving as a means for actuating the coil-rotating devices which are employed in connection with the press; Fig. 39, a section taken as indicated at line 39 of Fig. 38; Fig. 40, a section taken as indicated at line 40 of Figs. 21 and 37 and showing the presser-heads near the inner ends of their traverses; Fig. 41, a section taken as indicated at line 41 of Fig. 40 and showing an internally-toothed sector serving in the rotation of one of the coil-rotating devices of the press; Fig. 42, a similar view showing said sector in another position; Fig. 43, a section taken as indicated at line 43 of Fig. 40 and showing an externally-toothed sector for rotating the other coil-rotating device of the press; Fig. 44, a similar view showing the last-named sector in another position; Fig. 45, a section taken as indicated at line 45 of Fig 40 and showing the first-named coil-rotating device in its initial position; Fig. 46, a similar view showing the same in its rotated position, a portion of a spring being shown in place to illustrate the manner in which its extremity is engaged during the rotating movement; Fig. 47, a section taken as indicated at line 47 of Fig. 40 and showing the other coil-rotating member in its initial position; Fig. 48, a similar view showing the same in its rotated position; Fig. 49, an inclined transverse sectional view taken as indicated at line 49 of Fig. 1 and giving a front view of the knotting mechanism, including the gripping devices thereof, the latter being in their retracted or most widely-separated positions; Fig. 50, an inclined transverse section taken as indicated at line 50 of Fig. 1 and showing the plungers for reciprocating the gripping devices of the knotting mechanism; Fig. 51, a view taken as indicated at line 51 of Fig. 50 and showing the means for oscillating the lever serving to actuate said plungers; Fig. 52, a plan section taken as indicated at line 52 of Fig. 51 and showing the cam and cam-arm connected with the actuating-shaft of the lever serving to actuate said plungers; Fig. 53, a section taken as indicated at line 53 of Fig. 50 and showing a detail of the means for actuating one of the gripper-slides of the gripping devices of the knotting mechanism; Fig. 54, a section taken as indicated at line 54 of Fig. 50 and showing a detail of the other gripper-slide-actuating means of said gripper devices; Fig. 55, an enlarged sectional view taken as indicated at line 55 of Fig. 50; Fig. 56, a section taken as indicated at line 56 of Fig. 60 and illustrating the gage devices for properly locating the projecting ends of the coil with relation to pins over which they are to be bent prior to the knotting operation; Fig. 57, a plan section, diagrammatic in its nature, illustrating the means for reciprocating said gages; Fig. 58, a plan section taken as indicated at line 58 of Fig. 56; Fig. 59, a longitudinal section taken as indicated at line 59 of Fig. 56; Fig. 60, a longitudinal section taken as indicated at line 60 of Fig. 4 and showing the means for rotating one of the gages and the means for imparting motion (reciprocatory) in one direction to the gages; Fig. 61, a section taken as indicated at line 61 of Fig. 4 and showing the means at the opposite side of the machine for rotating the other gage and for actuating the gages in the opposite movement of reciprocation; Fig. 62, an inclined transverse section taken as indicated at line 62 of Fig. 1 and showing the carrier, the knotting mechanism, including the gages and gripping devices thereof, and a portion of the nesting mechanism; Fig. 63, a longitudinal section taken as indicated at line 63 of Figs. 4, 50, and 62 and showing the relation of the knotting mechanism to the shaft supporting the carrier; Fig. 64, a view taken as indicated at line 64 of Fig. 63 and showing the relative positions of one of the gripping devices of the knotting mechanism and the cams for swinging the same at the time when said gripping device is at the outer end of its transverse path of reciprocation; Fig. 65, an enlarged broken sectional view similar to Fig. 63 and showing the position of said last-named gripping device while at the inner end of its path of reciprocation and prior to its movement of oscillation in the action of carrying the coil to the knotting position; Fig. 66, a view taken as indicated at line 66 of Fig. 65; Fig. 67, a view similar to Fig. 65, but showing the gage rotated to adjust the end of the spring and a clamping-finger moved to clamp the spring at one point; Fig. 68, a view similar to Fig. 67, but showing the last-named gripping device swung to its rearmost position to carry the end of the spring into the knotting-pinion; Fig. 69, a broken section taken as indicated at line 69 of Fig. 65 and showing a detail of said gripping device; Fig. 70, a section taken as indicated at line 70 of Fig. 68 and showing the same gripping device with the parts in a different position; Fig. 71, a section taken as indicated at line 71 of Fig. 65 and showing a detail of a gripper member coöperating with the gripper-slide shown in Fig. 69; Fig. 72, a broken section taken as indicated at line 72 of Fig. 94 and showing a face view of the gage employed at the right-hand portion of the machine; Fig. 73, a section taken as indicated at line 73 of Fig. 72; Fig. 74, a section taken as indicated at line 74 of Fig. 65 and showing a detail of the same gripping device; Fig. 75, a section taken as indicated at line 75 of Fig. 74; Fig. 76, a section taken at line 76 of Figs. 50 and 62 and showing that gripping device of the knotting mechanism which is at the near side of the machine as viewed in Fig. 1; Fig. 77, a view taken as indicated at line 77 of Fig. 76 and illustrating the relative positions of said last-named gripping device and the cams for oscillating the same; Fig. 78, a section taken as indicated at line 78 of Fig. 62, the section being similar to Fig. 76, but the gripping device being swung to its rearmost position; Fig. 79, a view taken as indicated at line 79 of Fig. 78 and illustrating the relative positions of the last-mentioned gripping device and the cams for rocking the same when the parts are in the position shown in Fig. 78; Fig. 80, a transverse inclined section taken as indicated at line 80 of Figs. 63 and 86 and showing the knotting-pinions and that portion of the frame on which the knotting-pinions and their driving-gears are supported, a portion of the nesting mechanism being shown connected with the same portion of the frame; Fig. 81, a section taken as indicated at line 81 of Fig. 86, this view being similar to Fig. 80, except that the bearings for the nesting mechanism and certain plates have been removed; Fig. 82, a similar section taken as indicated at line 82 of Fig. 86; Figs. 83 and 84, sections taken as indicated at the corresponding lines of Fig. 86; Fig. 85, a section taken as indicated at the corresponding line of Fig. 86 and showing a detail of the cam-wheel-engaging gears for operating the knotting-pinions; Fig. 86, a section at right angles to the section shown in Fig. 80 and taken as indicated at line 86 of Fig. 63; Fig. 87, a view taken as indicated at line 87 of Figs. 80 and 86 and showing a detail of the mechanism employed for shouldering the spiral at points adjacent to the knots; Fig. 88, a section taken as indicated at the corresponding line of Fig. 87; Fig. 89, a section taken as indicated at the corresponding line of Fig. 86 and illustrating another detail of the mechanism last mentioned; Fig. 90, a section taken as indicated at line 90 of Fig. 86, showing another detail of the same mechanism; Fig. 91, a view taken as indicated at line 91 of Fig. 94 and illustrating the shouldering operation which immediately succeeds the knotting operation; Fig. 92, a view parallel with the view shown in Fig. 80 and illustrating the position of the parts at a moment when the rearmost pair of jaws of the coil-carrier is holding a spring in position to be engaged by the approaching gripping devices of the knotting mechanism, prior to said gripping devices being swung rearwardly to carry the ends of the coil into the grooves of the knotting-pinions; Fig. 93, a similar view showing the gripping devices of the knotting mechanism engaging the spring at its ends and the rearmost pair of jaws of the carrier removed, (opened;) Fig. 94, a similar view showing the gages which serve to measure the lengths of the projecting wire ends (which are to be employed in making the knots) withdrawn from the gripping devices of the knotting mechanism, the gripping devices being in their rearmost position, having carried the end rings of the coil into the slots of the knotting-pinions and located the projecting ends of the wire in position to be engaged by the knotting-pinions on rotation of the latter; Fig. 95, a view showing a knotting-pinion about to begin its rotation; Fig. 96, a similar view showing the knot formed and showing the knotting-pinion somewhat reversed in rotation to free the end of the wire from the shoulder of the pinion; Fig.

97, a perspective view showing the position of the parts prior to the rotation of the knotting-pinion; Fig. 98, a perspective view of the pinion shown in Fig. 97; Fig. 99, a perspective view showing the knot and shoulder at one of the end rings of the coil; Fig. 100, a section taken as indicated at line 100 of Fig. 4 and showing the relative positions of the coil-carrier, knotting mechanism, and nesting mechanism; Fig. 101, a view, partly in section and partly in side elevation, of the nesting mechanism and illustrating the manner in which the rearmost pair of jaws of the carrier brings the completed coil within the grasp of the nesting mechanism; Fig. 102, a view taken as indicated at line 102 of Fig. 101; Fig. 103, a view similar to Fig. 101, but showing the coil-engaging hook, rake, or nester of the nesting mechanism advanced to engage a new coil; Fig. 104, a section taken as indicated at the corresponding line of Fig. 103 and showing the nesting of the coils; Fig. 105, a section taken as indicated at the corresponding line of Fig. 104; Fig. 106, a section taken as indicated at the corresponding line of Fig. 102 and showing a detail of a friction device; Fig. 107, a view of the spring as it leaves the coiling mechanism; Fig. 108, a view of the same as it leaves the press; Fig. 109, a view of the completed spring; Fig. 110, a development of the surface of the cam-wheel which serves to actuate the plungers imparting the movements of transverse reciprocation to the gripping devices of the knotting mechanism, and Figs. 111 and 112 developments of the surfaces of the wheels (cam-wheels or spiral gears) employed for actuating the gears which impart motion to the knotting-pinions.

It may be here stated that after the coil has been formed in the coiling mechanism, as shown in Fig. 6, it is carried to the press by the foremost pair of gripping-jaws of the carrier and held in the position shown in Fig. 35 while the presser-heads of the press come together and the fingers thereof enter the coil, after which said gripping-jaws are opened to allow the coil to be compressed, as shown in Fig. 36. After the compression of the coil to give it a desired set and during the retraction of the presser-heads one of the shafts constituting one of the guides of the presser-heads is rotated to actuate the coil rotating or adjusting devices. (Shown in Figs. 40 to 48, inclusive.) During the retraction of the presser-heads and before the complete withdrawal of the fingers thereof from the coil the second pair of jaws of the carrier grasps the coil at its intermediate portion, and during the next rearward swing of the carrier the pressed spring is carried back to the position shown in Fig. 92, where it is properly located to be engaged by the gripping devices of the knotting mechanism when they approach each other.

In Fig. 93 the gripping devices have come together and engaged the ends of the coil and the intermediate pair of jaws of the carrier have been opened. In this figure certain pivoted clamping-fingers have been actuated to clamp each end ring of the spring at one point; but in the meantime the gages coacting with the gripping devices and having both a reciprocating and a turning movement have operated to insure just the proper length of projection of each end of the spring across the corresponding end ring of the spring to give the proper lengths of material for forming the knots. In the next action which occurs the gages are retracted and the gripping devices of the knotting mechanism swung rearwardly to the position shown in Fig. 94, in which position the knotting-pinions can operate on the ends of the wire. During the rearward swing of said gripping devices a gripper-slide in connection with each gripping device is actuated to clamp each end ring at two additional points, and the extremities of the wire engage grooves in the frame adjacent to the knotting-pinions, thereby bending the ends of the wire across the end rings of the coil, as shown in Fig. 68. After the knots have been formed and the shouldering operation effected the gripping devices of the knotting mechanism are again swung forwardly and the rearmost pair of jaws of the carrier grasps the spring at its intermediate portion, as shown in Fig. 100, after which the gripping devices retreat, leaving the spring free to be carried up to the nesting mechanism.

A general description of the main parts of the machine forming the preferred embodiment of my invention will now be given, and this will be followed by a detailed description of said parts.

A represents the frame of the machine; B, coiling mechanism located at the front end of the machine; C, the swinging coil-carrier, located in the rear of and somewhat above the point where the coil is formed and equipped with three pairs of jaws; D, the press, located in the rear of and somewhat below the point where the coil is formed; E, Figs. 1 and 100, the knotting mechanism, located in the rear of and somewhat above the press and F nesting mechanism located principally in the rear of and somewhat above the knotting mechanism. As thus described, the carrier is so located with relation to the coiling mechanism, press, knotting mechanism, and nesting mechanism that the three pairs of jaws of the carrier may be simultaneously employed to carry the newly-coiled spring from the coiling mechanism to the press, the pressed spring from the press to the gripping devices of the knotting mechanism, and the knotted spring from the gripping devices of the knotting mechanism to the nesting mechanism.

The frame may be of any suitable construction. Preferably it comprises a suitable base, a standard A' for the coiling mechanism, brackets A² A³ for the driving-gears, a standard A⁴, Figs. 1 and 24, for the pivot of the rock-arm which actuates the carrier, brackets A⁵ A⁶, Figs. 1 and 2, for supporting the guides of the presser-heads, and side members of housings A⁷ A⁸, upon which are supported and journaled various of the operative parts of the machine.

The coiling mechanism is of the general construction of machines now employed for coiling wire into springs, but contains certain improvements particularly adapting it to use in combination with the other mechanisms of my improved machine.

Referring now to Figs. 1 to 16, inclusive, power is imparted to the coiling mechanism and from thence to the other mechanisms of the machine from a constantly-rotating pulley B', loosely mounted on the shaft B², Fig. 17, to which is rigidly secured a friction member B³, adapted to engage the encircling flange of the pulley B'. The member B³ is of well-known construction, being provided with friction-shoes adapted to be thrown into engagement with the inner surface of the pulley B' when moved or expanded radially by means of levers B⁴, whose free ends engage a cone B⁵, shiftable longitudinally of the shaft B² by means of a hand-lever B⁶. The hand-lever B⁶ is adapted when thrown outwardly to engage an oblique projection B⁷, Figs. 18 and 19, on the free end of a lever B⁸, which is rotatably mounted on the shaft B², the opposite end of said lever being connected with the free end of a strap B⁹, encircling a wheel B¹⁰, fixed to the shaft B². One end of the strap is attached to a stationary part B¹¹, as shown in Figs. 17 and 18. Thus is provided a friction-brake which may be used to overcome the inertia of the moving parts of the machine when it is desired to stop the machine quickly. Between the pulley B' and the bracket A³ is a pinion B¹², fixed to the shaft B². Meshing with the pinion B¹² is a gear B¹³, Fig. 7, fixed to the outer end of the shaft B¹⁴, the inner end of which is equipped with a pinion B¹⁵. A pair of feed-rolls B¹⁶ B¹⁷, having intermeshing gears, are actuated from the pinion B¹⁵. The shaft of the lower feed-roll B¹⁶ is equipped at the opposite side of the machine with a pinion B¹⁸, meshing with an idler B¹⁹, carried by an adjustable bracket B²⁰. Meshing with the idler B¹⁹ is a gear B²¹, fixed to the outer end of a shaft B²², provided within the hollow standard A' with a gear B²³, a knife-actuating cam B²⁴, and a feed-roll-shifting cam B²⁵, Figs. 7 and 16. Meshing with the gear B²³ is a gear B²⁶, actuating a shaft B²⁷, Fig. 8, which is equipped with a coiling-roller-shifting cam B²⁸. The cam B²⁸ serves to actuate an arm B²⁹, adjustably connected with a lever B³⁰, secured upon a rock-shaft B³¹, Figs. 4, 5, 8, and 9. The rock-shaft B³¹ carries at its opposite end a rock-lever B³², held by a spring b³² and which actuates a connecting-rod B³³, whose upper end is connected with a slide B³⁴, which in turn is provided at its upper end with a bending or coiling roll B³⁵, coöperating with an adjustable stationary pitch-determining cone B³⁶, Figs. 8, 10, and 5, an adjustable stationary guide b', and a pair of non-shifting rollers b².

Referring to Fig. 8, one end of the level B³⁰ is connected by a spring B³⁷ with the arm B²⁹, and the opposite end has a threaded perforation receiving a screw B³⁸, whose upper end forms one member of a universal joint B³⁹, connected with an adjusting rod or handle B⁴⁰, Fig. 1. The lower member of the universal joint B³⁹ bears upon a washer b, which has a knife-edge at its lower side bearing in a V-shape notch crossing the perforation in the arm B²⁹, through which the screw B³⁸ passes. The screw is equipped beneath the end of the lever B³⁰ with a split nut b' for clamping the screw when tightened by a cap-screw b², Fig. 9. The nut is provided with a stem, Fig. 5, equipped with a pin b³, entering a perforation (not shown) in the lever B³⁰, to prevent the nut from turning with relation to the lever. It will be understood that by adjustment of the screw B³⁸ the lever B³⁰ will be adjusted with relation to the arm B²⁹, which will in turn change the location of the path of oscillation of the bending-roll B³⁵. Referring to Figs. 12 to 15, inclusive, the cam B²⁴ serves to actuate an arm B⁴¹, attached to a rock-shaft B⁴², equipped with an arm B⁴³, joined by a connecting-rod B⁴⁴ to the actuating-arm of the pivoted knife B⁴⁵. The knife B⁴⁵ coöperates with a stationary adjustable knife B⁴⁶. Adjustably connected with the pivot of the knife B⁴⁵ is a guide-finger B⁴⁷, which serves to steady the coil X, Fig. 6.

Referring to Figs. 5, 7, and 16, the cam B²⁵ engages the rear end of a lever B⁴⁸, the front end of which is connected with a cross-head B⁴⁹, joined by rods B⁵⁰ with a cross-head B⁵¹, joined to a lever B⁵², bearing upon a cross-head B⁵³, having studs B⁵⁴ connected with the movable boxes B⁵⁵ of the upper feed-roll. Said movable boxes are held normally depressed by the cam B²⁵ and bear at their lower sides against springs B⁵⁶, Figs. 1 and 5, which serve to raise the boxes and elevate the upper feed-roll when the cam-roller on the rear end of the lever B⁴⁸ drops into a depression b⁴ on the cam B²⁵, Fig. 16. Thus at each revolution of the cam B²⁵ the upper feed-roll is allowed to rise under the action of its springs, thus intermittently stopping the feed of the wire to permit the coils as they are successively formed to be severed from the wire. The wire is fed into the machine from a suitable spool, (not shown,) passing through straightening-rolls b⁵ b⁶ on its way to the feed-rolls of the coiling mechanism. The wire X' enters the machine in the direction shown in Fig. 5, and the coil after formation extends transversely of the machine in the rear of the coiling mechanism adjacent to a shield $B^{57}$, as shown in Figs. 1 and 6, the diameter of the convolutions of the coil varying according to the rising and falling movements of the coiling-roll $B^{35}$.

Referring now more particularly to Figs. 1, 2, 3, and 20 to 34, inclusive, the coil-carrier or coil-transferring mechanism C comprises a transversely-extending shaft $C'$, journaled in the upper ends of the housings $A^7 A^8$, a sprocket-wheel $C^2$, fixed to said shaft at the right side of the machine and connected by a sprocket-chain $C^3$ with a sprocket-wheel $C^4$, Figs. 4, 6, and 7, on the corresponding end of the shaft $B^{22}$, a jaw-carrier $C^5$, loosely mounted on the shaft $C'$ and equipped with front, intermediate, and rear pairs of jaws $C^6$, $C^7$, and $C^8$, respectively, a connecting-rod $C^9$, Figs. 20 and 21, connected at its upper end with an arm of the member $C^5$ and at its lower end with the free end of a rock-arm $C^{10}$, whose opposite end is pivoted on the standard $A^4$, a transverse shaft $C^{11}$ at the lower portion of the machine equipped with a cam $C^{12}$, actuating the arm $C^{10}$, the shaft $C^{11}$ being equipped with a gear $C^{13}$, meshing with the gear $B^{21}$ of the coiling mechanism, from which the shaft $C^{11}$ is actuated; a spring $C^{14}$, tending normally to hold the rear arm of the member $C^5$ depressed and yielding to permit the cam $C^{12}$ to swing the member $C^5$ forwardly at proper intervals, and relatively small cams $C^{15} C^{16} C^{17}$, Figs. 28 and 31 to 34, inclusive, fixed upon the shaft $C'$ and serving, respectively, to open the pairs of jaws $C^6 C^7 C^8$. The shaft $C'$ also has fixed thereon cams $C^{18} C^{19}$, Figs. 20 and 63, which serve in rocking one of the gripping devices of the knotting mechanism. As shown in Figs. 21, 24, and 25, the rock-arm $C^{10}$ is provided with a cam-roller engaging the cam $C^{12}$. The swinging member or jaw-support $C^5$ is provided at each set of jaws with a pair of studs $c\ c'$. Upon each stud $c$, Figs. 28 to 30, inclusive, is fulcrumed a jaw $c^2$, provided at its pivotal hub with a segmental pinion $c^3$. Upon each stud $c'$ is fulcrumed a jaw $c^4$, equipped at its pivotal hub with a segmental pinion $c^5$. The member $C^5$ is equipped with a stud $c^6$, corresponding with each pair of jaws. Upon each of the studs $c^6$ is pivoted a bell-crank lever $c^7$, equipped at one end with a gear-segment meshing with the corresponding segmental pinion $c^5$ and equipped at its other end with a cam-roller bearing upon the appropriate one of the cams $C^{15}$, $C^{16}$, and $C^{17}$. Upon the hubs of the jaws and properly secured thereto are chains $c^8$, whose free ends are connected with suitably-supported springs, which tend normally to close the jaws. The spring-actuating means for closing the jaws permits the latter to open or yield in case of obstruction to the operation of the machine, as by a coil getting caught in the mechanism. The cams $C^{15}$, $C^{16}$, and $C^{17}$ rotate with the shaft $C'$ and open the jaws at the proper time during each revolution of the shaft $C'$. The jaw-support is oscillated independently of the rotation of the shaft $C'$, as will be understood from the preceding description. As shown in Fig. 4, the shaft $C^{11}$ is provided near the left side of the machine with a cam $C^{20}$, which serves to oscillate the corresponding gripping device of the knotting mechanism in one direction, and said shaft is provided at the right side of the machine with a cam $C^{21}$, which serves to actuate the shaft of the coil-rotating devices of the press, as will be hereinafter explained.

Referring now to Figs. 1 and 2 and 35 to 48, inclusive, the press D comprises transversely-extending shafts $D' D^2$, supported by the brackets $A^5 A^6$ of the frame, the shaft $D'$ constituting one of the guides of the presser-heads, and the shaft $D^2$ constituting the other guide of the presser-heads and serving also as a means for actuating the coil-rotating or coil-adjusting devices of the press; presser-heads $D^3 D^4$, reciprocatingly mounted on said guides; chains $D^5 D^6$ passing over suitable pulleys supported on the frame, the chain $D^5$, which is attached to both of the presser-heads, serving to draw both the presser-heads apart, and the chain $D^6$, which is attached only to the presser-head $D^4$, serving to draw the presser-heads together; coil-rotating disks or members $D^7 D^8$, rotatingly mounted on the presser-heads $D^3 D^4$, respectively; segments $D^9 D^{10}$, Figs. 40 to 44, inclusive, having their hubs feathered on the shaft $D^2$, the segment $D^9$ having external teeth meshing with the segmental pinion $d$, with which the member $D^7$ is provided, and the segment $D^{10}$ having internal teeth meshing with a segmental pinion $d'$ with which the member $D^8$ is provided; rock-arms $D^{11} D^{12}$, Figs. 4 and 37, connected with the chains $D^5 D^6$, respectively, and actuated, respectively, by cams $D^{13} D^{14}$, mounted on the left end of a transverse shaft $D^{15}$ at the rear lower portion of the machine; a rock-arm $D^{16}$ on the end of the shaft $D^2$ at the right side of the machine, Fig. 2; a spring $D^{17}$, supported on the standard $D^{18}$ and serving to hold the free end of the arm $D^{16}$ normally elevated; a connecting-rod $D^{19}$ depending from the arm $D^{16}$, and a rock-arm $D^{20}$ engaging the cam $C^{21}$ on the shaft $C^{11}$ and connected with the lower end of the rod $D^{19}$. The shaft $D^{15}$ is rotated by a gear $D^{21}$, Fig. 4, meshing with the gear $C^{13}$, and said shaft is equipped, starting from the left side of the machine, with a gage-rotating cam $D^{22}$, a gage-reciprocating cam $D^{23}$, Figs. 4 and 60, a cam $D^{24}$, coacting with the cam $C^{20}$ to control the rocking movements of the left gripping device of the knotting mechanism, a knotter-actuating cam wheel $D^{25}$, a spring-clamp-actuating cam $D^{26}$, Figs. 4, 63, and 100, a nester-actuating cam $D^{27}$, a knotter-actuating cam-wheel $D^{28}$ a shouldering-device-actuating cam $D^{29}$, a cam-wheel $D^{30}$ for reciprocating the plungers carrying the gripping devices of the knotting mechanism, a gage-reciprocating cam $D^{31}$, Figs. 4 and 61, and a gage-rotating cam $D^{32}$.

Referring again to Figs. 40 to 48, inclusive, the coil-rotating member $D^7$ has its pinion journaled on a suitable trunnion with which the presser-head $D^3$ is provided, and said member is secured on its trunnion by a face-plate $d^2$ and a bolt $d^3$. The inner face of the member $D^7$ is provided with a radial shoulder $d^4$, which serves to engage one end of the coil in the operation of rotating or truing the coil. The hub of the member $D^9$ is provided with a sleeve $d^5$, equipped with a collar $d^6$, connected with a groove $d^7$, with which the base of the presser-head $D^3$ is provided. Said presser-head is provided with inwardly-projecting fingers $d^8$ and with perforations $d^9$ for receiving the fingers of the companion presser-head. The presser-head $D^4$ is provided with a suitable trunnion for the coil-rotating member $D^8$, and the member $D^8$ is held upon its trunnion by a face-plate $d^{10}$ and a bolt $d^{11}$. Said presser-head is provided with inwardly-projecting fingers and with perforations for receiving the fingers of the companion presser-head. The head $D^4$ is provided at its lower portion with a curved rib $d^{12}$, with which engages the flange of a member $d^{13}$, attached to the hub of the segment $D^{10}$. The connection is such that the segments $D^9$ $D^{10}$ may rock with the shaft $D^2$ and with relation to the presser-heads $D^3$ $D^4$. In the operation of the press the presser-heads come together to compress the coil, and during the retreat of the presser-heads the shaft $D^2$ is actuated to rock the segments $D^9$ $D^{10}$, thereby rotating the members $D^9$ $D^8$ in opposite directions to bring the ends of the coil to a predetermined plane, as will be understood from Figs. 46 and 48. This leaves the coil properly positioned to enter the gripping devices of the knotting mechanism after being carried rearwardly by the intermediate pair of jaws of the swinging carrier.

Referring now more particularly to Figs. 49 to 100, inclusive, the knotting mechanism, including the gripping devices thereof, comprises reciprocating plungers $E'$ $E^2$, Figs. 49, 50, and 51; a rearwardly and upwardly inclined lever $E^3$, Fig. 2, connected with the ends of the plungers at the right side of the machine and having a short shaft $E^4$, journaled in a suitable bearing on the frame; an actuating-arm $E^5$, equipped with a cam-roller entering a groove in the cam-wheel $D^{30}$ on the shaft $D^{15}$; spring-held gripping devices $E^6$ $E^7$, Figs. 49 and 50, confined yieldingly rotatively on the plungers $E'$ $E^2$ to have a reciprocating motion with said plungers, said devices being equipped with suitable cam-rollers engaging the pairs of cams $C^{18}$ $C^{19}$, Figs. 62, 64, and 65, and $C^{20}$ $D^{24}$, Fig. 76; cams $E^8$ $E^9$, mounted to have a reciprocating motion with the devices $E^6$ $E^7$ and serving to actuate gripper-slides connected therewith, the cams $E^8$ $E^9$ being provided with perforations moving on guides $E^{10}$ $E^{11}$, whose outer ends are yieldingly connected with the frame, as shown in detail in Figs. 53, 54, and 55, and whose inner ends are yieldingly held in an advanced position by springs $E^{12}$ $E^{13}$, respectively, springs $E^{14}$, Fig. 68, and $E^{15}$, Fig. 76, tending to hold the gripping devices normally swung forward; alined plungers $E^{16}$ $E^{17}$, Figs. 49 and 56, located midway between the plungers $E'$ $E^2$ and somewhat in front of the plane thereof and moving in suitable guides $E^{18}$ $E^{19}$ on the frame members $A^7$ $A^8$; slides $E^{20}$ $E^{21}$, having tongue-and-groove connection with the transverse frame member $E^{22}$, Figs. 58, 72, and 73; gage-heads $E^{23}$ $E^{24}$, fixed to the inner ends of the plungers which project through the slides $E^{20}$ $E^{21}$, said gage-heads being equipped with fingers $e$, which serve to engage the ends of the spiral when the gage-heads are rotated and measure the projecting ends which are to be employed in making the knots, it being understood that the gage-heads and the slides with which they are rotatably connected move inwardly with the gripping devices of the knotting mechanism from their outer positions (corresponding with the positions shown in Fig. 69) to the position shown in Fig. 93, whereupon the gage-heads are rotated to properly measure the projections of the ends of the wire, and the gage-heads are then retracted prior to the rearward swing of the gripping devices, as will be understood from Fig. 94; a chain $E^{25}$, attached to the outer end of the plunger $E^{16}$ at $e'$ and passing over a pulley $e^2$; a chain $E^{26}$, attached to the slide $E^{20}$ at $e^3$ and to a collar $e^4$ on the plunger $E^{17}$, said chain passing about a pulley $e^5$, under a pulley $e^6$, and over a pulley $e^7$; a chain $E^{27}$, passing about a pulley $e^8$ and attached at a point $e^9$ to the slide $E^{21}$; an actuating rock-arm $E^{28}$, connected with the chain $E^{25}$ and actuated by the cam $D^{23}$, Fig. 60; a rock-arm $E^{29}$, Fig. 56, feathered on the plunger $E^{16}$ and confined against movement longitudinally therewith by a bearing $e^{10}$ on the bracket supporting the pulleys $e^2$ $e^5$; a connecting-rod $E^{30}$, Fig. 61, connected with the free end of the arm $E^{29}$; a rock-arm $E^{31}$, connected with the lower end of the rod $E^{30}$ and actuated by the cam $D^{22}$; a rock-arm $E^{32}$, connected with the lower end of the chain $E^{27}$ and actuated by the cam $D^{31}$, Fig. 61; a rock-arm $E^{33}$, Figs. 56, 58, and 61, feathered on the plunger $E^{17}$ and confined against longitudinal movement therewith by a bearing $e^{11}$, connected with the frame member $E^{19}$; a connecting-rod $E^{34}$, having its upper end connected with the free end of the arm $E^{33}$ and its lower end connected with the free end of a rock-arm $E^{35}$, actuated by the cam $D^{32}$; a pair of knotting-pinions $E^{36}$ $E^{37}$, journaled in the frame member $E^{22}$, which is provided with guides for the slides $E^{20}$ $E^{21}$, Figs. 80 to 90, inclusive; gears $E^{38}$ $E^{39}$, meshing with said pinions and fixed to the upper ends of shafts $E^{40}$ $E^{41}$, whose lower ends are equipped with gears $E^{42}$ $E^{43}$, actuated, respectively, by the large cam or spiral gear-wheels $D^{28}$ $D^{25}$, Fig. 4; a pair of spring-heads $E^{44}$ $E^{45}$, Fig. 86, carried by the forward ends of plungers $E^{46}$ $E^{47}$, Figs. 81, 82, and 100, projecting forwardly from a cross-head $E^{48}$, normally held in a retracted position by a spring $E^{49}$, a rock-arm $E^{50}$, Figs. 63 and 78, pivoted on the shaft $C^{11}$ and actuated by the cam $D^{26}$, and serving in turn to actuate said spring-heads, said spring-heads serving in their turn to actuate pivoted clamping-fingers on the gripping devices $E^6$ $E^7$ of the knotting mechanism; a pair of rock-arms $E^{51}$ $E^{52}$, Figs. 87 to 90, secured to rock-shafts $E^{53}$ $E^{54}$, extending longitudinally of the frame member $E^{22}$, said rock-arms having their free ends connected by a chain $E^{55}$, passing about a stationary pulley $E^{56}$, the rock-arm $E^{52}$ being equipped with a cam-roller engaging the cam $D^{29}$; a finger $E^{57}$ on the inner or free end of the rock-shaft $E^{53}$ serving to engage a finger $E^{58}$, Fig. 89, connected with the shouldering device of the gripping device $E^6$, assuming said gripping device to be rocked rearwardly to the position indicated in dotted lines in Fig. 89, and a finger $E^{59}$, Fig. 90, on the free end of the rock-shaft $E^{54}$ serving to engage the finger $E^{60}$ of the shouldering device of the gripping device $E^7$, assuming said gripping device to be rocked rearwardly to the position indicated in Fig. 90. Recalling that the plungers $E'$ $E^2$, having a reciprocating motion imparted to them in the manner indicated in Fig. 50 and that the gripping devices $E^6$ $E^7$ have an oscillating movement upon said plungers when said gripping devices are at the inner ends of their traverses, it may now be mentioned that when the gripping device $E^6$ is at the outer end of its traverse the cam-contacting rolls $e^{12}$ $e^{13}$ bear the position with relation to the cams $C^{18}$ $C^{19}$ shown in Figs. 63 and 64, and in the corresponding position the cam-rolls $e^{14}$ $e^{15}$ of the gripping device $E^7$ bear the relation to their cams $D^{24}$ $C^{20}$ shown in Fig. 77. When the gripping member $E^6$ is at the inner end of its traverse, its cam-rolls bear the relation to the cams shown in Fig. 66, and at the same time the cam-rolls of the gripping device $E^7$ bear the relation to their cams shown in Fig. 79. During the reciprocating movement of the gripping device $E^7$ one of its arms moves in a slot $e^{16}$, Figs. 76 and 86, in the member $E^{22}$, being held during this movement in contact with a bearing-plate $e^{17}$. During the reciprocating movement of the member $E^6$ its arm $e^{18}$, Fig. 63, engages a bearing-plate $e^{19}$, Figs. 63 and 80. As appears from Figs. 49 and 86, the frame member $E^{22}$ is provided with suitable plates to form guide-slots $e^{20}$ $e^{21}$ for the projections on the slides $E^{20}$ $E^{21}$, with which the gage-heads are connected. The exact details of construction of the member $E^{22}$ need not be described, any convenient arrangement of removable plates being provided to permit ready assembling and disconnection of the operative members.

Referring now particularly to Figs. 65 to 71, the gripping device $E^6$ is equipped with a relatively stationary gripping member $e^{22}$, Fig. 71, let into a recess in the face of the member $E^6$ and secured by a plate $e^{23}$, the member $e^{22}$ having gripping-notches $e^{24}$ $e^{25}$ and a gripping-slide $e^{26}$, provided at its upper end with a pin $e^{27}$, engaging a cam-groove $e^{28}$, with which the cam $E^8$ is provided. When the gripping device $E^6$ is swung rearwardly in the operation of carrying the coil to the knotting-pinion, the cam $E^8$ is yieldingly held against swinging with the gripping device by the spring $E^{12}$, which action causes the pin $e^{27}$ to move along the cam-groove $e^{28}$, thereby raising the gripper-slide and causing its shoulders $e^{29}$ $e^{30}$ to grip the coil at two points, as shown in Fig. 70. Journaled in a perforation in the member $E^6$ is a shouldering-pin $e^{31}$, having its inner end forked at $e^{32}$ and its outer end secured to the finger $E^{58}$, Figs. 74 and 89. Pivoted in a recess adjacent to the pin $e^{31}$ is a swinging clamping-finger $e^{33}$, with which the spring $E^{44}$ engages to clamp the end convolution of the coil between the finger $e^{33}$ and the forked end of the pin $e^{31}$, as shown in Fig. 93. This action occurs when the springs $E^{44}$ $E^{45}$ are thrust forward by the reciprocation of the cross-head $E^{48}$ under the action of the rock-arm $E^{50}$ and cam $D^{26}$. This clamping action occurs after the gages have operated to properly locate the extremities of the coil. The shouldering operation is caused by the pivotal movement of the pin $e^{31}$, the forked end of the pin receiving the wire in the manner shown in Fig. 68 and the shouldering operation taking place immediately after the knot has been tied, as shown in Fig. 100.

The construction of the gripping member $E^7$ is similar to the construction of the gripping member $E^6$, as will appear from Fig. 76, where the gripping-slide is designated $e^{34}$. The stationary gripping member coacting therewith is designated $e^{35}$. The pivoted forked shouldering-pin is designated $e^{36}$, this being the pin connected with the finger $E^{60}$, (shown in Fig. 90,) and the pivoted gripping member, corresponding with the gripping member $e^{33}$ of Fig. 74, is designated $e^{37}$. The member $E^7$, however, comprises a member $e^{38}$, Figs. 50 and 76, which carries the gripper-slide and other parts just enumerated, and a member $e^{39}$, equipped with the arms bearing the cam-rollers $e^{14}$ $e^{15}$, the hub of the member $e^{39}$ being adjustably connected with the hub of the member $e^{38}$, as shown in Fig. 50. The member $E^7$ is confined against longitudinal movement with relation to the shaft $E^2$ by collars $e^{40}$. The member $E^6$ is confined against longitudinal movement with relation to its shaft by collars $e^{41}$ $e^{42}$, the collar $e^{41}$ having a projecting hub on which is journaled the cam $E^8$. The manner in which the shouldering operation takes place may be better understood by reference to Figs. 75 and 91, the latter showing the pin $e^{31}$ turned axially with relation to the finger $e^{33}$.

Referring to Figs. 68 and 69, it will be observed that the gripper-slide $e^{26}$ is provided with a central enlargement $e^{45}$, having a bevel-surface $e^{46}$, which serves to guide an intermediate convolution of the coil as the gripping devices approach each other. As shown in Figs. 92 and 94, the frame member $E^{22}$ is provided with two forwardly-projecting fingers $e^{47}$, whose outer edges are curved to guide the convolutions of the coil adjacent to the end rings of the coil, the space $e^{48}$ between said fingers serving to receive the intermediate convolutions of the coil.

Referring now particularly to Figs. 100 to 106, inclusive, the nesting mechanism F comprises a chute or receiver F', preferably of the curved form shown, and a nester $F^2$, having a swinging motion with relation to the receiver F' and comprising arms $f$, actuated by a rock-shaft $f'$, journaled in the bearing $f^2$ on the frame member $E^{22}$, Fig. 80, and actuated by a rock-arm $f^3$, actuated by the cam $D^{27}$, a coil-engaging hook $f^4$, pivoted at $f^5$ on the upper ends of the arms $f$ and provided with a crank-arm $f^6$ and a stop $f^5$, an actuating-rod $f^7$, provided with a stop $f^8$ for limiting the upward swing of the hook $f^4$, and a friction device $f^9$, connected with stationary supports $f^{10}$ and frictionally engaging the rod $f^7$. The details of the friction device $f^9$ appear in Fig. 106. A tube $f^{11}$ is pivotally supported between the supports $f^{10}$, and this tube contains friction-blocks $f^{12}$ and springs $f^{13}$, adjustable by means of screws $f^{14}$. The rod $f^7$ passes through perforations in the tube $f^{11}$ and alined grooves at adjacent ends of the blocks $f^{12}$. Thus it will be seen that when the arms $f$ are swung toward the front end of the machine to enable the nester to grasp a fresh spring the hook $f^4$ will be swung upwardly through the medium of the rod $f^7$, and when the arms $f$ are swung rearwardly the hook will be depressed to engage the new spring, further motion of the arms $f$ causing the rod $f^7$ to slip in its bearing in the friction device $f^9$. The receiver F' is of rectangular cross-section, having a bottom $f^{15}$, sides $f^{16}$, inturned top flanges $f^{17}$, Fig. 105, and a contracted front end portion $f^{18}$, Fig. 104, provided with end flanges $f^{19}$, rearwardly-projecting springs $f^{20}$, extending into the adjacent portion of the main body of the receiver, and depending springs $f^{21}$, Fig. 105, having flaring lower extremities and provided at a short distance from said extremities with retaining-shoulders $f^{22}$. The rearmost pair of gripping-jaws of the carrier serves to swing the completed spring up into the contracted portion $f^{18}$ of the receiver, the spring itself and the springs $f^{21}$ yielding to permit this action, after which the spring occupies the position shown in Fig. 101. The carrier-jaws are then released, leaving the spring held compressed between the side walls of the contracted portion $f^{18}$ of the receiver, as shown in Fig. 102. This leaves the spring in position to be engaged by the hook of the nester at the next operation, the nester operating to produce a nest of springs $X^2$, as indicated in Figs. 101 and 104. As the coils are nested they are flexed, so that the end rings of each coil occupy non-parallel planes, thus leaving room, as shown in Fig. 104, for the new spring to enter.

The operation may be briefly summed up as follows: Power is imparted to the machine through the friction-clutch illustrated in Fig. 17, the machine being put into operation by drawing the lever $B^6$, which is suitably curved to permit it to be grasped from the left side of the machine, as shown in Fig. 3, toward the left side of the machine—that is, toward the right side of Fig. 3. The feed-rolls $B^{16}$ $B^{17}$ are in constant rotation when the machine is in operation, the upper roll being intermittently raised to stop the feed of the wire while the knife operates to sever the newly-formed coil from the wire. The shaft C' is constantly rotated by the sprocket-chain $C^3$, and the shafts $C^{11}$ $D^{15}$ (shown in Fig. 4) are constantly rotated by the train of gearing. The jaw-supporting member $C^5$ is swung rearwardly at each revolution of the shaft $C^{11}$, as shown in Fig. 24, by the cam $C^{12}$ and is swung forwardly again by the spring $C^{14}$ during the revolution of the cam. At the beginning of the operation the carrier is at the front end of its arc of movement in the position shown in Fig. 1. The shaft $D^{15}$ rotates at the same rate of speed as the shaft $C^{11}$, and the presser-heads of the press are reciprocated at each revolution. Likewise the gripping devices of the gripping mechanism are reciprocated at each revolution and the gage-heads have a general movement of reciprocation corresponding with the movement of reciprocation of said gripping devices. The gripping devices of the knotting mechanism are longitudinally oscillated (with reference to the machine) while at the inner ends of their transverse traverses at each revolution of the shaft $D^{15}$. The nester of the nesting mechanism is likewise oscillated once during each revolution of the shaft $D^{15}$. Wire from any suitable source enters the machine, passing first through the straightening-rolls $b^5$ $b^6$ and then through the feed-rolls and between the bending-rolls, the oscillation of the upper bending-roll serving to vary the diameter of the convolutions of the coil, while the conical surface $B^{36}$, Fig. 5, serves to give the desired pitch to the spiral. The diameter of any convolution of the coil is determined by the location of the upper bending-roll at the moment the convolution is being formed, and this may be controlled by adjusting the path of oscillation of the upper bending-roll by means of the adjusting-rod $B^{40}$, and the pitch of the spiral may be varied by adjusting the cone $B^{36}$. Assuming the machine to be in operation long enough to enable all of its several mechanisms to be performing their usual functions, coils X are being simultaneously operated upon in the coiling mechanism, the press, the knotting mechanism, and the nesting mechanism. In the forward position of the carrier the front pair of jaws is adjacent to the forming-coil, the intermediate pair of jaws is adjacent to the coil being operated upon by the press, and the rear pair of jaws is adjacent to the coil being operated upon by the knotting mechanism. After the coiling, pressing, and knotting operations have been, respectively, performed on the several coils upon which the machine is operating the three pairs of jaws are closed and the carrier swung rearwardly, thereby advancing each coil to the next successive point of operation pertaining thereto. Inasmuch as the fingers of the presser-heads must be withdrawn from the coil being operated upon in the press before the carrier can be swung rearwardly, it is desirable to have the intermediate pair of jaws close first, as shown in Fig. 22, and inasmuch as the gripping devices of the knotting mechanism must be released from the completed coil before the rearward swing of the carrier takes place it is desirable to have the rearmost pair of jaws close next in succession, which is the result of the arrangement of the cams shown in Figs. 31 to 34, inclusive. By the time the intermediate and rear pair of jaws have been closed the coiling operation is completed, and the feed of the wire is interrupted while the knife operates to sever the newly-formed coil from the wire, the front pair of jaws of the carrier having in the meantime closed upon the newly-formed coil. At this moment the carrier occupies the position shown in Fig. 23, in which position the jaws $C^6$ will have grasped the newly-formed coil, the jaws $C^7$ will have grasped the pressed coil, and the jaws $C^8$ will have grasped the knotted coil. During the retreat of the presser-heads from the position shown in Fig. 36 the shaft $D^2$ is rotated through the medium of the arm $D^{16}$, connecting-rod $D^{19}$, arm $D^{20}$, and cam $C^{21}$, Fig. 38, thereby actuating the coil-rotating members $D^7 D^8$ and turning the coil to such a position that when grasped by the jaws $C^7$ and carried rearwardly to the knotting mechanism the coil will be in proper position to enter the gripping devices of the knotting mechanism. In Fig. 24 the carrier has swung rearwardly to carry the knotted coil to the nesting mechanism, the pressed coil into alinement with the reciprocating gripping devices of the knotting mechanism, said gripping devices being now in their forwardly-rotated positions, and to carry the newly-formed coil from the coiling mechanism into alinement with the presser-heads of the press. The presser-heads now advance and compress the new coil, and the gripping devices of the knotting mechanism, together with the gages coacting with said gripping devices, advance practically simultaneously. The jaws $C^7$ hold the pressed spring while the gripping devices $E^6 E^7$ advance and receive the opposite ends of the spring, as will be understood from Figs. 65 and 92. At each gripping device the convolution forming the end ring $g$ of the spring is received between the shouldering-pin $e^{31}$ and the pivoted gripping-finger $e^{33}$, Fig. 65, and portions of the end ring also lie between the gripping-shoulders of the stationary gripping member $e^{22}$ and the coacting shoulders of the gripping-slide $e^{26}$. The convolution $g'$ adjacent to the end ring finds a bearing upon the beveled surface $e^{46}$ of the projection $e^{45}$. At this moment the cross-head $E^{48}$ is actuated to carry the spring-heads $E^{44} E^{45}$ forwardly, Fig. 93, thereby clamping each end ring at one point. Prior to this action the gages are rotated from the position shown in Fig. 65 to the position shown in Fig. 67 to insure the right length of projection of the ends $g^2$ of the coil past the points at which the wire is to be first gripped, as will be understood from Fig. 67. The cam-rollers of the gripping devices being at this time in the path of their respective cams are engaged by the cams $C^{18}$ and $C^{20}$, thereby rocking the gripping devices rearwardly to the position shown in Figs. 93 and 94. In the meantime the gages have retreated from the gripping devices, as indicated in Fig. 94. During the rearward swing of the gripping devices the ends $g^2$ of the coil engage the slots $g^3$ (one only shown) on the frame member $E^{22}$, Figs. 68, 92, and 97, thereby bending the ends about the pins $e^{31}$ and across the adjacent portions of the end rings of the spring. The end rings of the spring during this movement enter vertical slots $h$ in the frame member $E^{22}$ and registering slots $h'$, with which the knotting-pinions are provided. The knotting-pinion $E^{36}$ is provided at its upper end with a wire bearing or shoulder $h^2$, and the knotting-pinion $E^{37}$ is provided at its lower end with a similar bearing, Fig. 86. At the proper time the spiral gears or cam-wheels operate to turn the knotting-pinions, thereby forming the knots. It will be understood that the bearing $h^2$ of the knotting-pinion $E^{37}$ passes beneath the convolution $h'$ of the spring in the initial movement of the knotting-pinion from the position shown in Fig. 97. The projecting end $g^2$ of the wire is in the path of the bearing $h^2$, however, so that the end is engaged and carried about the wire of the end ring $g$. The knotting-pinions are given a little more than two revolutions in the knotting operation and then receive a slight reverse, due to the change in direction of the cam-ribs at $k$, as will be understood from Figs. 111, 112, it being explained that the projections or teeth of the gear-wheels $E^{42}$ $E^{43}$ embrace the cam-ribs, as shown in Fig. 84. The reversal of the knotting-pinions is to allow the shoulders or bearings to become disengaged from the ends of the wire, which spring back somewhat after the pressure is relieved. As soon as the knotting is completed the shouldering-pins $e^{31}$ are rotated slightly to produce the bends in the convolutions $g'$ adjacent to the knots, as indicated at $g^4$ in Fig. 99. The spring being now completed, the cams $C^{19}$ $D^{24}$ operate to rotate the gripping devices of the knotting mechanism forwardly, during which movement the gripper-slides are actuated to release the pressure upon the end rings of the spring. The carrier-jaws $C^8$ now grasp the completed spring, the pressure upon the clamping-fingers $e^{33}$ is relieved, and the gripping devices retreat, overtaking the gages as the latter near the outer ends of their traverses. At the next rearward swing of the carrier the completed coil is carried upwardly and forced into the contracted portion $f^{18}$ of the receiver $F'$ of the nesting mechanism, and at the next operation of the machine the coil is engaged by the nester and drawn rearwardly to the position shown in Fig. 101. When it is desired to stop the machine, the power is disconnected by shoving the lever $B^6$ toward the right side of the machine, thereby disconnecting the clutch members and at the same time throwing the friction-brake into operation to overcome the momentum of the heavy moving parts of the machine.

It will be understood that the foregoing detailed description has been given for clearness of understanding only, and that various changes in the embodiment of the invention may be made. The exact details of construction of the coiling mechanism, or any of the other described mechanisms of the machine, while matters of importance are not considered essential to the machine. In some cases it may be desirable to use in combination less than the full number of coöperating mechanisms shown, and I desire to be understood as intending in the appended claims to claim the several subcombinations of distinct mechanisms shown, and where it shall so appear from the claims themselves to claim the subcombinations of the individual mechanisms.

From the foregoing it will be understood that manifold changes in the details of construction and the arrangement of parts may be made without departure from my invention. Hence no limitation inconsistent with the scope of the invention itself should be understood in construing the appended claims.

As an illustration of the manner in which less than the full number of mechanisms for operating upon the coil may be employed, it may be stated that the press may be omitted, a pair of jaws omitted from the carrier, and the positions of the knotting mechanism and nesting mechanisms with relation to the coiling mechanism appropriately changed, or any of the mechanisms for forming or operating upon the coils may be omitted, while still retaining the advantages of my invention in a lesser degree.

What I regard as new, and desire to secure by Letters Patent, is—

1. The combination of coiling mechanism; a press; and means provided with a coil-gripping device and serving to convey coils from the coiling mechanism to the press.

2. The combination of coiling mechanism; a press; knotting mechanism; and means for conveying coils from the coiling mechanism to the press and from the press to the knotting mechanism.

3. The combination of coiling mechanism; a press; knotting mechanism; nesting mechanism; and means for transferring coils progressively through the machine.

4. The combination of coiling mechanism; a press; and an oscillating carrier operating to transfer coils from the coiling mechanism to the press.

5. The combination of coiling mechanism; a press; and a carrier provided with means for simultaneously removing coils from the coiling mechanism and the press.

6. The combination of coiling mechanism; a press; and an oscillating carrier provided with means for simultaneously conveying coils from the coiling mechanism and the press.

7. The combination of coiling mechanism; a press; and a swinging carrier provided with two pair of jaws spaced to receive coils from the coiling mechanism and the press.

8. The combination of coiling mechanism; a press; knotting mechanism; and a suitably-actuated carrier provided with coil-engaging means corresponding with each of said named mechanisms and located adjacent thereto in one position of said carrier, for the purpose set forth.

9. The combination of coiling mechanism; a press; knotting mechanism; nesting mechanism; and an oscillating carrier provided with suitably-spaced coil-engaging means and operating to simultaneously transfer the coils from the point whereat they are being operated upon respectively to the next succeeding points of operation, for the purpose set forth.

10. The combination of coiling mechanism; a press; knotting mechanism; nesting mechanism; said mechanisms being arranged in a curved path, and a pivotally-supported carrier equipped with a plurality of pairs of jaws adapted to oscillate between adjacent mechanisms, for the purpose set forth.

11. The combination of coiling mechanism; a press; knotting mechanism provided with gripping devices and suitable knotters, the discharge-point of the coiling mechanism, the press, and the gripping devices of the knotting mechanism being arranged on a curve, an oscillating carrier provided with a plurality of properly-spaced coil-engaging means, and means for moving the gripping devices of the knotting mechanism with relation to the knotters, for the purpose set forth.

12. The combination of coiling mechanism; a press, located in the rear of the coiling mechanism and having its axis substantially parallel with the axis of the coil formed in the coiling mechanism; and means equipped with a coil-gripping device and serving to transfer the coil parallel with itself from the coiling mechanism to the press.

13. The combination of coiling mechanism; a press; and an oscillating carrier provided with means for gripping the coil at an intermediate portion, said carrier operating to transfer coils from the coiling mechanism to the press.

14. The combination of coiling mechanism; a press; an oscillating carrier, and a pair of coil-gripping jaws forming a part of said carrier and operating to transfer coils from the coiling mechanism to the press.

15. The combination of coiling mechanism having wire-bending means and feed-rolls for forcing the wire through said bending means, said wire-bending means operating to form the coil and project it at right angles to the path of the entering wire; a press having its axis parallel with the coil when formed; and a coil-transferrer provided with coil-gripping means and serving to move the coil to and position the same for the press, for the purpose set forth.

16. The combination of coiling mechanism; a press comprising a pair of presser-heads equipped with fingers for entering the coils and provided with perforations for receiving the opposite fingers, respectively, and means for transferring the coils from the coiling mechanism to the press.

17. The combination of coiling mechanism; a press having a reciprocating member provided with a finger for entering the coil; and a swinging carrier provided with a pair of coil-gripping jaws having a range of movement from the coiling mechanism to the path of the reciprocating member of the press.

18. The combination of coiling mechanism; a press; coil-rotating means coacting with the press; and a carrier serving to transfer coils from the coiling mechanism to the press.

19. The combination of coiling mechanism; a press comprising reciprocating presser-heads; coil-rotating devices coacting with said presser-heads; and a carrier serving to transfer coils from the coiling mechanism to the press.

20. The combination of coiling mechanism; a press comprising reciprocating presser-heads; coil-rotating members having a pivotal movement with relation to said presser-heads and also a movement of reciprocation with the presser-heads; and means for transferring the coils from the coiling mechanism to the press.

21. The combination of coiling mechanism; a press comprising reciprocating presser-heads mounted on guides, one of said guides being rotatable; coil-rotating members rotatably connected with said presser-heads and having a movement of reciprocation therewith; actuating means for said coil-rotating members operated through the medium of said rotatable guide; and coil-transferring means, for the purpose set forth.

22. The combination of coiling mechanism; a press having reciprocating presser-heads equipped with coil-entering fingers; knotting mechanism; and a carrier equipped with a front pair of gripping-jaws and a pair of gripping-jaws in the rear thereof; actuating means for the first-named pair of jaws; and actuating means for the second-named jaws operating to close the same prior to the closure of the first-named pair of jaws, for the purpose set forth.

23. The combination of coiling mechanism; a press comprising reciprocating presser-heads equipped with coil-entering fingers, coil-rotating devices moving reciprocatingly with said heads and rotatably mounted with relation thereto; knotting mechanism; and coil-transferring means, for the purpose set forth.

24. The combination of coiling mechanism; a press comprising reciprocating presser-heads equipped with coil-entering fingers, coil-rotating devices moving reciprocatingly with said heads and rotatably mounted with relation thereto; knotting mechanism; coil-transferring means, comprising a carrier equipped with suitably-spaced pairs of jaws serving to receive intermediate portions of the springs; and actuating means for the jaws.

25. The combination of coiling mechanism; a press; knotting mechanism provided with transversely-reciprocating longitudinally-oscillating gripping devices and knotters located a short distance from the normally advanced positions of the gripping devices, and a carrier provided with means for moving the coils progressively through the machine.

26. The combination of coiling mechanism; a press; knotting mechanism provided with reciprocating swinging gripping devices and with knotters removed somewhat from the paths of reciprocation of the gripping devices, gages coacting with said gripping devices to measure the lengths of the projections employed in making the knots; and a carrier provided with suitable coil-engaging means and operating to move the coils progressively through the machine.

27. The combination of coiling mechanism; a press; knotting mechanism; and an intermittently-actuated carrier provided with a plurality of gripping devices and serving to move the coils step by step through the machine.

28. The combination of coiling mechanism;

a press; knotting mechanism provided with coil-gripping means and with means coacting therewith to measure the length of a projection to be employed in making a knot; and coil-transferring means operating to move the coils progressively through the machine.

29. The combination of coiling mechanism; a press; coil-rotating means coacting with said press; knotting mechanism provided with coil-gripping devices and means coacting therewith for measuring the length of a projection to be employed in making a knot; and coil-transferring means serving to move the coils progressively through the machine.

30. The combination of coiling mechanism; a press; a rotating shaft; a swinging coil-carrier provided with jaws, and cams on said shaft serving to actuate said jaws.

31. The combination of mechanisms for forming and operating upon a coil; and a coil-carrier comprising spring-closed jaws and cams for opening said jaws.

32. The combinations of mechanisms for forming and operating upon coils; a rotating shaft; a coil-carrier swinging thereon; a plurality of pairs of spring-closed jaws forming a part of said carrier and suitably spaced with relation to said mechanisms; and cams on said shaft for opening said jaws.

33. The combination of coiling mechanism; a press; knotting mechanism comprising suitable knotters and reciprocating gripping devices having a movement of rotation, when at the inner ends of their traverses, to carry the coil to and from the knotters; and a carrier serving to move the coils progressively through the machine.

34. In a machine of the character described, the combination of a press; knotting mechanism; and a carrier serving to transfer the coils from the press to the knotting mechanism.

35. In a machine of the character described, the combination of a press; knotting mechanism; and a carrier provided with a plurality of pairs of jaws serving simultaneously to transfer coils to and from the press and the knotting mechanism.

36. In a machine of the character described, the combination of a press having a reciprocating member; knotting mechanism; and an oscillating carrier provided with three pairs of jaws, one pair of jaws serving to transfer the coil to the press, another pair serving to transfer the coil from the press to the knotting mechanism, and the third pair serving to transfer the coil away from the knotting mechanism.

37. In a machine of the character described, the combination of a press provided with reciprocating presser-heads having inward extensions adapted to enter a coil; knotting mechanism comprising suitable knotters and reciprocating gripping devices having an oscillating movement to transfer the coil to and from the knotters; and an oscillating carrier provided with a plurality of pairs of jaws and serving to move the coils progressively through the machine.

38. In a machine of the character described, the combination of a press provided with reciprocating presser-heads; coil-rotating devices rotatively mounted with relation to said presser-heads; a rock-shaft equipped with gear-segments serving to actuate the coil-rotating devices; knotting mechanism equipped with suitable knotters and with gripping devices operating to carry the coil to and from the knotters; and a carrier provided with a plurality of coil-engaging devices and operating to transfer coils to and from the press and to and from the gripping devices of the knotting mechanism.

39. In a machine of the character described, the combination of a press; knotting mechanism provided with suitable knotters and gripping devices; and an oscillating pivoted carrier provided with a plurality of pairs of coil-gripping jaws, for the purpose set forth.

40. In a machine of the character described, the combination of a press; knotting mechanism; nesting mechanism; and a carrier serving to move the coils progressively through the machine.

41. In a machine of the character described, the combination of a press; knotting mechanism equipped with suitable knotters and with gripping devices serving to carry the coil to and from the knotters; nesting mechanism; and an oscillating carrier provided with a plurality of pairs of jaws operating to transfer coils to and from the press, to and from the gripping devices of the knotting mechanism, and to the nesting mechanism.

42. In a machine of the character described, the combination of a press; knotting mechanism; nesting mechanism comprising a receiver and a nester; and a carrier serving to move the coils progressively till they come within the grasp of the nester, for the purpose set forth.

43. In a machine of the character described, the combination of knotting mechanism; nesting mechanism; and means for transferring coils from the knotting mechanism to the nesting mechanism.

44. In a machine of the character described, the combination of knotting mechanism equipped with a suitable knotter and coil-gripping means serving to transfer the coils to and from the knotter; nesting mechanism comprising a suitable receiver and an oscillating nester; and a carrier provided with means for transferring coils to and from the gripping means of the knotting mechanism and to the nester of the nesting mechanism.

45. In a machine of the character described, the combination of knotting mechanism comprising knotting-pinions, gears meshing therewith, shafts for said gears equipped at their lower ends with cam-engaging gears, cam-wheels engaging said last-named gears, and gripping devices serving to carry the coil to and from the knotting-pinions; nesting mechanism; and a carrier serving to transfer coils from the gripping devices of the knotting-mechanism to the nesting mechanism.

46. In a machine of the character described, the combination of knotting mechanism; nesting mechanism comprising a receiver provided with an opening having flaring walls and a nester serving to advance the coils from the contracted portion of the receiver; and a carrier serving to transfer coils from the knotting mechanism into the contracted portion of the receiver.

47. In a machine of the character described, the combination of a press; coil-rotating means operatively connected with said press; knotting mechanism comprising a suitable knotter and gripping means for carrying the coils to and from the knotter, a gage operatively mounted with relation to said gripping means and serving to regulate the length of the projection of the wire to be employed in making the knot; and a carrier serving to move the coils progressively through the machine.

48. In a machine of the character described, the combination of a press; a coil-rotating device operatively mounted with relation thereto; knotting mechanism comprising suitable knotters and reciprocating gripping devices having an oscillating movement at the inner ends of their traverses; and gages operatively mounted with relation to said gripping devices; and a carrier serving to move the coils progressively through the machine.

49. In a machine of the character described, the combination of a press; a coil-rotating device operatively mounted with relation thereto; knotting mechanism comprising suitable knotters; reciprocating gripping devices having an oscillating movement at the inner ends of their traverses; and gages operatively mounted with relation to said gripping devices; nesting mechanism; and a carrier provided with means for transferring coils to and from the press, to and from the gripping devices of the knotting mechanism, and to the nesting mechanism.

50. The combination of mechanisms for coiling, and operating upon springs; nesting mechanism; and means for transferring the coils progressively through the machine.

51. The combination of coiling mechanism; knotting mechanism independent thereof; and means for transferring coils from the coiling mechanism to the knotting mechanism.

52. The combination of coiling mechanism; knotting mechanism; nesting mechanism; and means for transferring coils progressively through the machine.

53. In a machine of the character described, the combination of mechanism for operating upon a coil-spring; nesting mechanism; and an oscillating carrier serving to deliver springs to the nesting mechanism.

54. In a machine of the character described, the combination of mechanism for operating upon coil-springs; nesting mechanism comprising a receiving-chute, and a nester coacting therewith; and means for moving the springs progressively through the machine to a point within reach of the nester.

55. In a machine of the character described, the combination of mechanism for operating upon coil-springs; nesting mechanism comprising a receiving-chute having a contracted portion and a nester operating to move the springs along said chute; and an oscillating carrier serving to move the springs progressively through the machine and deposit them within the contracted portion of said receiving-chute.

56. In a machine of the character described, the combination of mechanism for operating on coil-springs; nesting mechanism comprising a receiving-chute having a flaring opening for admission of springs, and a nester operating to move the springs along said chute; and an oscillating carrier provided with a pair of jaws serving to grasp each spring at an intermediate portion and carry the same into said flaring opening of the receiver and deposit the same within reach of the nester.

57. In a machine of the character described, the combination of mechanism for operating upon coil-springs; nesting mechanism comprising a receiver provided at its receiving end with means for retaining a spring and a nester coacting with said receiver; and an oscillating carrier provided with jaws serving to deposit the springs successively within grasp of the retaining means of said receiver.

58. In a machine of the character described, the combination of mechanism for operating upon coil-springs; means for transferring the springs from said mechanism; and nesting mechanism comprising a receiving-chute and an oscillating nester having a depressible hook serving to engage the springs as they are successively deposited within the receiving end of the receiver and convey the same along the receiver.

59. In a machine of the character described, the combination of mechanism for operating upon coil-springs of a given length; and nesting mechanism comprising a receiving-chute having walls holding the springs compressed and a nester provided with a depressible hook serving to engage the springs at the receiving end of the receiver and transfer them along the receiver.

60. In a machine of the character described, the combination of mechanism for operating upon coil-springs; and nesting mechanism comprising a receiving-chute having a contracted receiving end, an oscillating nester serving to move the springs along the receiver, and projections extending from the contracted portion of the receiver into the adjacent portion of the receiver and serving to direct the end rings of the entering coil-spring into the spaces provided therefor in the nested springs for the purpose set forth.

61. In a machine of the character described, the combination of a swinging coil-carrier provided with a pair of jaws; and nesting mechanism comprising a receiving-chute having a contracted front end provided with flaring downward extensions, the front end of the receiver being open to allow said jaws to swing to their elevated position; and an oscillating nester, for the purpose set forth.

62. In a machine of the character described, the combination of a swinging coil-carrier provided with a pair of jaws; and nesting mechanism comprising a receiving-chute having a contracted front end provided with flaring downward extensions, the front end of the receiver being open to allow said jaws to swing to their elevated position; and an oscillating nester equipped with a depressible hook, for the purpose set forth.

63. In a machine of the character described, the combination of a swinging coil-carrier provided with a pair of jaws; and nesting mechanism comprising a receiving-chute having a contracted front end provided with flaring downward extensions, the front end of the receiver being open to allow said jaws to swing to their elevated position; and an oscillating nester equipped with a depressible hook provided with an actuating-arm, and a friction-rod connected with said arm.

64. In a machine of the character described, the combination of knotting mechanism equipped with a suitable knotter, and provided with a transversely-reciprocating longitudinally-oscillating gripping device, and provided with a gage comprising a transversely-reciprocating slide and a revoluble gage-head connected therewith, the gripping device serving to carry the end ring of the spring to the knotter; nesting mechanism; and means for transferring coils from the knotting mechanism to the nesting mechanism.

65. In a machine of the character described, the combination of knotting mechanism comprising a pair of transversely-reciprocating longitudinally-oscillating gripping devices, a pair of reciprocating revoluble gages coacting with said gripping devices and serving to adjust the positions of the ends of the spring with relation to the adjacent clamping members of the gripping devices, and suitably-actuated knotters into which the end rings of the spring are carried in the oscillation of the gripping devices; nesting mechanism; and a carrier provided with a plurality of pairs of jaws, one pair serving to deliver springs to the gripping devices of the knotting mechanism, and another pair serving to receive springs from said gripping devices and transfer them to the nesting mechanism.

66. The combination of coiling mechanism; knotting mechanism; nesting mechanism; and a carrier serving to transfer the coils parallel with themselves, in a longitudinal plane, progressively, to the nesting mechanism.

67. The combination of coiling mechanism; a press; knotting mechanism; nesting mechanism; and an intermittently-actuated swinging carrier provided with three pairs of jaws arranged in a longitudinal plane and serving to move the coils progressively to the nesting mechanism.

68. The combination of coiling mechanism serving to form a transversely-extending coil, a press located in the rear of and beneath the point of formation of the coils; knotting mechanism provided with transversely-reciprocating longitudinally-oscillating gripping devices located in the rear of and somewhat above the press; nesting mechanism having the receiving end located in the rear of and somewhat above the gripping devices of the knotting mechanism; and an intermittently-actuated swinging carrier provided with a plurality of pairs of jaws arranged on a curve in a longitudinal plane, for the purpose set forth.

69. In a machine of the character described, the combination of coiling mechanism adapted to produce a transversely-extending coil; a press comprising transversely-reciprocating presser-heads adapted to approach near to the longitudinal central plane of the machine; knotting mechanism comprising suitable knotters and transversely-reciprocating longitudinally-oscillating gripping devices adapted to approach near to the longitudinal central plane of the machine before swinging; nesting mechanism having a receiving end located above and in the rear of said gripping devices, assuming the latter to be at the inner ends of their traverses and in their normally advanced position, a rotating shaft located above said press, an intermittently-actuated carrier having its axis concentric with said shaft and provided with a plurality of pairs of jaws, cams on said shaft for actuating the jaws, cams on said shaft for swinging one of said gripping devices of the knotting mechanism, and suitably-actuated cams for swinging the other gripping device of the knotting mechanism.

70. The combination of coiling mechanism for forming a transversely-extending coil; a press comprising reciprocating presser-heads; knotting mechanism comprising suitable knotters and transversely-reciprocating longitudinally-oscillating gripping devices; nesting mechanism provided with an oscillating nester, a rotating shaft in the rear of and below the knotting mechanism and equipped with cams for actuating the knotters, a cam for oscillating the nester, and cams for reciprocating the presser-heads, a rotating shaft located above the press, a swinging carrier mounted thereon and provided with a plurality of pairs of jaws, cams on said last-named shaft for actuating said jaws, cams on said last-named shaft adapted to engage one of said gripping devices when the latter is at the inner end of its traverse, and suitable cams for engaging the other one of said gripping devices when the latter is at the inner end of its traverse, for the purpose set forth.

71. The combination of coiling mechanism for forming transversely-extending coils; a press comprising reciprocating presser-heads; coil-rotating devices connected with said presser-heads; knotting mechanism comprising knotting-pinions, transversely-reciprocating longitudinally-oscillating gripping devices and transversely-reciprocating revoluble gages coacting with said gripping devices; nesting mechanism equipped with an oscillating nester, a rotating shaft below said press equipped with cams for actuating one of the gripping devices of the knotting mechanism when said gripping device is at the inner end of its traverse, with a cam for oscillating a carrier, and with a cam for actuating the coil-rotating devices, a shaft in the rear of said first-named shaft equipped with cams for reciprocating the presser-heads, cams for actuating the knotting-pinions, a cam for actuating the nester, and a cam for reciprocating the gripping devices of the knotting mechanism, a rotating shaft located above said press and equipped with jaw-actuating cams and with cams for oscillating the other gripping device of the knotting mechanism, when the latter is at the inner end of its traverse, and a swinging carrier having its axis coincident with said last-named shaft and provided with actuating means engaging the appropriate cam of said first-named shaft and equipped with a plurality of pairs of jaws.

72. In a machine of the character described, the combination of knotting mechanism comprising knotting-pinions, a pair of transversely-reciprocating plungers, gripping devices rotatable upon said plungers, cams for oscillating said gripping devices when the latter are at the inner ends of their traverses; nesting mechanism; and a coil-carrier.

73. In a machine of the character described, the combination of knotting mechanism comprising a pair of reciprocating plungers, spring-held gripping devices mounted thereon and reciprocated thereby, cams for oscillating said gripping devices when at the inner ends of their traverses; suitably-actuated knotting-pinions; nesting mechanism; and a coil-carrier.

74. In a machine of the character described, the combination of knotting mechanism comprising suitably-actuated knotting-pinions, a pair of reciprocating plungers, spring-held gripping devices mounted on said plungers, cams serving to oscillate said gripping devices when at the inner ends of their traverses, a second pair of transversely-reciprocating plungers, slides in which the inner ends thereof are journaled, gage-heads on the inner end of said last-named plungers, means for rotating the gage-heads through the medium of their plungers; nesting mechanism; and a carrier.

75. In a machine of the character described, the combination of knotting mechanism comprising suitably-actuated knotting-pinions, transversely-reciprocating longitudinally-oscillating gripping devices, a pair of transversely-reciprocating rotatable plungers equipped at their inner ends with gages, rock-arms feathered on said plungers, cams serving to actuate said rock-arms; nesting mechanism; and a carrier.

76. In a machine of the character described, the combination of knotting mechanism comprising transversely-reciprocating longitudinally-oscillating gripping devices, a pair of transversely-reciprocating plungers equipped at their inner ends with gages, rock-arms having feathered connection with said plungers, a pair of knotting-pinions, a rotating shaft equipped with cams serving to actuate said rock-arms and with wheels serving to actuate said knotting-pinions; nesting mechanism comprising a suitable receiver, an oscillating nester, and means connected with said rotating shaft for oscillating said nester; and a carrier.

77. In a machine of the character described, the combination of knotting mechanism provided with suitably-actuated knotters, and shouldering devices for forming shoulders on the spiral adjacent to the knots; nesting mechanism; and a carrier.

78. The combination of coiling mechanism, equipped with suitable feed-rolls and gears, a rotating shaft geared to the coiling mechanism, a swinging carrier having its axis coincident with said shaft and provided with a plurality of pairs of jaws, cams on said shaft for actuating said jaws, cams on said shaft for oscillating a gripping device of the knotting mechanism, a second shaft geared to the coiling mechanism, and equipped with a cam serving to actuate said carrier and with a cam serving to actuate coil-rotating devices; a press comprising transversely-reciprocating presser-heads, coil-rotating devices connected with said presser-heads, a rock-shaft for actuating the last-named devices and in turn actuated from said last-named cam, a third rotating shaft geared to the second-named rotating shaft and equipped with cams serving to reciprocate the presser-heads; knotting-pinions, wheels on said third-named shaft serving to actuate said knotting-pinions, a pair of reciprocating plungers, a wheel on said third-named shaft serving to actuate said plungers; gripping devices carried by said plungers, a cam on said second-named shaft and a cam on said third-named shaft for oscillating one of said gripping devices, a second pair of transversely-reciprocating revoluble plungers, cams on said third-named shaft for reciprocating and rotating said last-named plungers, a receiver, an oscillating nester coacting therewith and a cam on said third-named shaft for actuating said nester.

79. The combination of coiling mechanism, including means for feeding a wire for forming the coils, and severing the coils from the wire; mechanisms for completing the springs; a carrier equipped with a plurality of coil-engaging means and serving to move the springs progressively through the machine; and means for interrupting the feed of the wire to permit severing.

80. In a machine of the character described, the combination of coiling mechanism, including means for feeding the wire, means for severing the wire, and a reciprocating coiling-roll having suitable actuating means provided with adjusting means including a forwardly-extending adjusting-handle; mechanisms for operating upon the spring in the rear of the coiling mechanism; and a carrier serving to move the springs progressively through the machine.

81. The combination of coiling mechanism; a press in the rear of the coiling mechanism; and a carrier in the rear of the coiling mechanism, said coiling mechanism comprising suitable feed-rolls, a shaft geared thereto, a second shaft in front of the first-named shaft and geared thereto and provided with a cam, an arm engaging said cam, a rock-arm adjustably connected with the rear end of said first-named arm and connected with a rock-shaft, and a reciprocating coiling-roll actuated from said rock-shaft.

82. The combination of coiling mechanism; a press in the rear of the coiling mechanism; and a carrier in the rear of the coiling mechanism, said coiling mechanism comprising suitable feed-rolls, a shaft geared thereto, a second shaft in front of the first-named shaft and geared thereto and provided with a cam, an arm engaging said cam, a rock-arm adjustably connected with the rear end of said first-named arm and connected with a rock-shaft, an adjusting-rod extending upwardly and forwardly from the adjusting means of said first-named rock-arm, a second rock-arm on said rock-shaft, and a coiling-roll reciprocated from said last-named rock-arm.

83. The combination of coiling mechanism; mechanisms for completing the spring; a carrier; and means for starting and stopping the machine, including a friction-clutch and a friction-brake connected with the driving-shaft of the coiling mechanism.

84. The combination of coiling mechanism; mechanisms for completing the spring; a carrier; and means for starting and stopping the machine, including a friction-clutch and a friction-brake connected with the driving-shaft of the machine and a hand-lever having a portion located between the clutch and brake, whereby movement of the hand-lever in one direction serves to throw the clutch into operation and movement of the hand-lever in the opposite direction serves to release the clutch and throw the brake into operation.

85. The combination of a suitable frame; coiling mechanism located at the front end of the machine and provided at one side of the machine with driving-gear, a hand-lever mounted adjacent to the driving-gear and having a handle extending from within reach at the opposite side of the machine; mechanisms in the rear of the coiling mechanism for completing the springs; and a carrier serving to move the springs progressively through the machine.

86. In a machine of the character described, the combination of knotting mechanism comprising suitably-actuated knotting-pinions, transversely-reciprocating longitudinally-oscillating gripping devices equipped with shouldering devices; means for actuating said shouldering devices when the knotting operations are completed; nesting mechanism; and a carrier.

87. In a machine of the character described, the reciprocating bending-roll, in combination with a rock-shaft serving to reciprocate the same; a rock-arm fixed to and actuated with said rock-shaft; a cam-arm $D^{29}$; an adjusting-screw joining said cam-arm to said last-named rock-arm; and an adjusting-rod having universal connection with said screw.

88. The combination of coiling mechanism having wire-bending means and feed-rolls for forcing the wire through said bending means, said wire-bending means operating to form the coil and project it at right angles to the path of the entering wire; independent knotting mechanism; and means for moving the formed springs from the place of formation and delivering them to the knotting mechanism, for the purpose set forth.

89. In a machine of the character described, an oscillating coil-carrier equipped with a plurality of pairs of jaws; means for opening and closing the jaws; and means for oscillating the carrier comprising a rock-arm, a rotating cam actuating said rock-arm, and connecting means between said rock-arm and said carrier.

90. In a machine of the character described, an oscillating carrier provided with a plurality of pairs of jaws equipped with pinion-segments; levers pivoted on the carrier and equipped with segments serving to actuate the jaws; and rotating cams serving to actuate said levers.

91. In a machine of the character described, an oscillating carrier provided with a plurality of pairs of jaws equipped with pinion-segments; bell-crank levers pivoted on the carrier and equipped with gear-segments; and rotating cams engaging the free ends of said bell-crank levers.

92. In a machine of the character described, an intermittently-actuated pivoted carrier, including pairs of jaws, each pair of jaws provided with intermeshing pinion-segments; a lever for each pair of jaws equipped with a segment meshing with a pinion-segment; and rotating cams actuating said levers.

93. In a machine of the character described, a press comprising a fixed transverse guide and a revoluble transverse guide; presser-heads reciprocable on said guides; coil-rotating devices rotatable on said presser-heads and equipped with pinion-segments; and gear-segments feathered on said revoluble shaft and having a movement of reciprocation with said presser-heads and serving to actuate the coil-rotating devices through the medium of said pinion-segments.

94. In a machine of the character described, a pair of reciprocating presser-heads connected to permit movement in opposite directions; a flexible connection joined to one of said presser-heads and passing over a pulley; a cam-arm connected with said flexible connection; and a cam actuating said cam-arm.

95. In a machine of the character described, a press comprising reciprocating presser-heads provided with inwardly-projecting coil-entering fingers and with perforations at each presser-head for the fingers of the companion presser-head; coil-rotating disks rotatably mounted with relation to said presser-heads and equipped with radial fingers; and means for actuating the coil-rotating disks when the latter are in engagement with the spring, for the purpose set forth.

96. In a machine of the character described, a pair of reciprocating presser-heads in combination with a pair of coil-rotating disks journaled on trunnions at the inner sides of the presser-heads, for the purpose set forth.

97. In a machine of the character described, a pair of reciprocating presser-heads; a rock-shaft extending through said presser-heads; a pair of coil-rotating disks rotatably mounted at the inner sides of the presser-heads and equipped with pinion-segments; and a pair of gear-segments splined upon the rock-shaft, for the purpose set forth.

98. In a machine of the character described, a pair of reciprocating presser-heads; a rock-shaft extending through said presser-heads; a pair of coil-rotating disks rotatably mounted at the inner sides of the presser-heads and equipped with pinion-segments; and a pair of gear-segments splined upon the rock-shaft, one of said gear-segments being internally toothed and the other externally toothed, for the purpose set forth.

99. In a machine of the character described, a pair of plungers; a rock-lever connected therewith; a rock-arm serving to actuate said rock-lever; a cam-wheel, serving to actuate said arm; gripping devices mounted upon said plungers; means for rotating the gripping devices on the plungers; and knotting-pinions.

100. In a machine of the character described, the combination of transversely-reciprocating longitudinally-oscillating gripping devices; a pair of reciprocating gages coacting therewith; means on the gripping devices for clamping the spiral near the extremities of the wire after the operation of the gages; means on the gripping devices for clamping the end rings of the spring; a frame member provided with means for engaging the ends of the wire and bending them across the end rings of the spring; and suitably-actuated knotters, for the purpose set forth.

101. In a machine of the character described, the combination of suitably-reciprocated plungers; gripping devices mounted thereon and equipped with gripper-slides; cams mounted on the plungers and connected with said gripper-slides; and means for yieldingly holding said cams when the gripping devices are rotated to carry the spring to the knotter.

102. In a machine of the character described, the combination of reciprocating plungers; gripping devices pivoted thereon; cams for oscillating the gripping devices on the plungers when the gripping devices are at the inner ends of their traverses; gripper-slides connected with the gripping devices; cams rotatably mounted with relation to said gripping devices and equipped with arms moving on yieldingly-held guides; and knotters to which the spring is carried when the gripping devices are oscillated on their plungers.

103. In a machine of the character described, a gripping device for the knotting mechanism, comprising a member pivotally supported on a plunger; a finger projecting from said member; a clamping finger coacting with said first-named finger and pivoted on said first-named member; and a plunger serving to move the pivoted finger.

104. In a machine of the character described, a gripping device for the knotting mechanism, comprising an oscillating member mounted on a plunger; a fixed gripping member carried by said oscillating member; a gripper-slide coacting with said gripping member; a cam rotatable with relation to said oscillating member and connected with said gripper-slide; means for yieldingly holding said cam when the oscillating member is swung upon its plunger, thereby to actuate the gripper-slide; a pin for engaging the coil near one end of the wire; a pivoted finger coacting with said pin; and means for closing the pivoted finger.

105. In a machine of the character described, a suitably-actuated plunger; an oscillating member mounted thereon and reciprocated thereby; a frame member provided with a guide for said member, permitting said member to be swung in one direction; a spring hold ing said member normally in engagement with its guide; a cam for swinging the oscillating member on its plunger; and means carried by the oscillating member for clamping a spring.

106. In a machine of the character described, a pair of suitably-actuated plungers; a pair of oscillating members mounted to swing on said plungers; transverse guides for said oscillating members permitting the latter to be swung in one direction; means for yieldingly holding said oscillating members normally in engagement with their guides; cams serving to swing said oscillating members on their plungers; gripping members fixed on said oscillating members; gripper-slides coacting therewith; cams serving to actuate the gripper-slides during oscillation of said first-named members on their plungers; clamps for engaging the spiral near the ends of the wire; means for actuating said clamps before the gripping devices have completed their rearward swing; a frame member provided with means for engaging and bending the ends of the wire and suitably-actuated knotting-pinions, for the purpose set forth.

107. In a machine of the character described, the combination with the pivoted clamping member of a gripping device; of a plunger equipped with a spring serving to actuate said pivoted member, said spring yielding to permit the gripping device to be swung rearwardly.

108. In a machine of the character described, the combination with the member $E^6$ of a gripping device; of a gripper-slide; a cam $E^8$ connected with said gripper-slide; and a yielding guide-rod $E^{10}$ through the medium of which the cam $E^8$ is yieldingly held when the member $E^6$ is swung rearwardly, for the purpose set forth.

109. In a machine of the character described, the combination of a pair of transversely-reciprocating longitudinally-oscillating gripping devices equipped with pivoted clamping-fingers; and a pair of suitably-actuated plungers serving to actuate said clamping-fingers when the gripping devices are at the inner ends of their traverses.

110. The combination with the transversely-reciprocating rearwardly-swinging member $E^6$ of knotting mechanism; of a forked rotatable shouldering-stud $e^{31}$; and means for rotating said shouldering-stud while the member $E^6$ is at the rearward end of its swing.

111. In a machine of the character described, the combination of a pair of transversely-reciprocating longitudinally-oscillating gripping devices; a frame member provided with guides extending transversely of the machine; a pair of reciprocating slides connected with said guides; gages rotatably connected with said slides; pins carried by said gripping devices; clamping members coacting with said pins, the gages serving to properly locate the ends of the wire with relation to said pins; means on said frame member for engaging the ends of the wire and bending them about said pins as the gripping devices are swung rearwardly; and knotters; for the purpose set forth.

112. In a gripping device for knotting mechanism a member $E^6$ equipped with a member $e^{22}$; and a gripper-slide $e^{26}$ coacting therewith.

113. In a gripping device for knotting mechanism, a member $E^6$ equipped with a member $e^{22}$; and a gripper-slide $e^{26}$ coacting therewith, and equipped with a central projection $e^{45}$, for the purpose set forth.

114. In a gripping device for knotting mechanism, the combination with a swinging member $E^6$, of a forked pin $e^{31}$ equipped with an actuating-arm $E^{58}$.

115. In a gripping device for knotting mechanism, the combination with a member $E^6$, of a forked pin $e^{31}$ equipped with an actuating-arm $E^{58}$ and a pivoted clamping member $e^{33}$ coacting with said pin.

116. A gage device comprising a slide $E^{21}$ and a gage-head $E^{24}$ rotatably connected therewith and equipped with a finger $e$ moving over the face of the slide.

117. In mechanism of the character described, the combination of a member $E^6$; a forked pin $e^{31}$ journaled therein and provided with an actuating-arm $E^{58}$; and a rock-shaft journaled on the frame of the machine and provided with an arm adapted to engage the arm $E^{58}$ when the spring is in engagement with the knotter.

118. In a machine of the character described, the combination with a pair of reciprocating slides, of rock-shafts equipped with gages at their inner ends and rotatably connected with said slides; rock-arms splined on the shafts; and cams actuating said rock-arms.

119. The combination of coiling mechanism having wire-bending means and feed-rolls for forcing the wire through said bending means, said wire-bending means operating to form the coil and project it at right angles to the path of the entering wire; knotting mechanism located in alinement with the coil when formed; and means for moving the coil in a path between the planes of the ends of the formed spring to bring the coil into the grasp of the knotting mechanism.

120. Knotting mechanism comprising knotters; and means for gripping a coil at its two ends and transferring the same to the knotters.

121. Knotting mechanism comprising oppositely-turned properly-spaced knotting-pinions; and means for gripping a coil at its two ends and transferring the same to the knotting-pinions.

122. Knotting mechanism comprising oppositely-turned properly-spaced knotting-pinions; means for gripping a coil at its two ends and transferring the same to the knotting-pinions; and gages operating to measure the lengths of the knot-forming portions of the wire preparatory to the knotting operation, for the purpose set forth.

123. Knotting mechanism, comprising knotters; swinging gripping devices serving to grip the coil at its ends and transfer the same to the knotters; gages serving to adjust the ends of the coil; and shoulders for bending the ends of the spring during the swinging movement of the gripping devices.

124. In a machine of the character described, nesting mechanism comprising a receiving-chute equipped at its front end with means for retaining a spring; and an oscillating arm equipped with a suitably-controlled depressible hook, for the purpose set forth.

125. In nesting mechanism, the combination of a curved receiving-chute; an oscillating arm; a hook pivoted thereon having an actuating-arm; a rod connected with said last-named arm; and a stationary friction device connected with said rod.

126. In nesting mechanism, the combination of a curved receiving-chute provided at its front end with spring-retaining means; an oscillating arm; a hook pivotally connected therewith and provided with an actuating-arm; a rod connected with said last-named arm and provided with a stop for the hook and a friction device engaging said rod.

127. The combination of a receiving-chute $F'$; a pair of oscillating arms embracing the front portion of said chute; a hook pivotally supported on said arms and provided with an actuating-arm; a rod pivotally connected with said last-named arm; and a pair of spring-held friction-blocks engaging said rod.

128. In nesting mechanism, the combination of a coil-receiving chute provided at its front end with a contracted portion $f^{18}$ and depending flaring guides $f^{21}$ and with rearwardly-extending springs $f^{20}$; and means for withdrawing the coiled springs from the contracted portion of the receiving-chute.

129. Nesting mechanism, comprising a curved receiving-chute having a contracted front end and rearwardly-extending springs projecting from the contracted portion of the chute into the adjacent portion thereof; a pair of arms $f$ supported by a rock-shaft $f'$, a depending cam-actuated rock-arm $f^3$; a coil-engaging hook $f^4$; and a friction-held actuating-rod for said hook, for the purpose set forth.

130. Nesting mechanism comprising a receiver; and means for delivering a spring thereinto transversely of the receiver and flexing the spring to permit the succeeding coil to enter in nesting.

131. Nesting mechanism comprising a receiving-chute; means for nesting coils and moving the same along the chute; and means for delivering coils to the chute transversely thereof.

132. In combination with mechanism for forming coil-springs, a carrier, comprising a pivoted jaw-support; a pair of jaws pivoted thereon; a rotating cam; and jaw-actuating means operated by said cam.

133. The combination of coiling mechanism; nesting mechanism; and means for advancing coils from the coiling mechanism to the nesting mechanism.

134. The combination of coiling mechanism having wire-bending means and feed-rolls for forcing the wire through said bending means, said wire-bending means operating to form the coil and project it at right angles to the path of the entering wire; mechanism equipped with coil-grippers serving to grasp the coils and convey them from the coiling mechanism, and mechanisms coöperating with said grippers and serving to perform the operations of pressing and knotting the spring, for the purpose set forth.

135. The combination of coiling mechanism; independent knotting mechanism; and a suitably-actuated carrier provided with coil-engaging means and serving to transfer coils from the coiling mechanism to the knotting mechanism.

136. In a machine of the character described, the combination of mechanism for operating upon a coil-spring; nesting mechanism; and means for automatically advancing the coils to the nesting mechanism.

137. The combination of coiling mechanism having wire-bending means and feed-rolls for forcing the wire therethrough, said wire-bending means constructed and operating to form the coil and project it at substantially right angles to the path of the entering wire; and automatic means for performing the knotting operation and advancing the coils, for the purpose set forth.

138. The combination of coiling mechanism having wire-bending means and feed-rolls for forcing the wire therethrough, said wire-bending means constructed and operating to form the coil and project it at substantially right angles to the path of the entering wire; knotting mechanism actuated and timed to coöperate therewith; and automatic means serving to bring the coil and knotting mechanism into operative engagement, for the purpose set forth.

JOHN F. GAIL.

In presence of—
F. M. WIRTZ,
WALTER N. WINBERG.